United States Patent [19]
Nunokawa et al.

[11] Patent Number: 5,982,877
[45] Date of Patent: Nov. 9, 1999

[54] COMMUNICATIONS SYSTEM USING PORTABLE RECORDING MEDIUM

[75] Inventors: Ryozo Nunokawa; Hiroyuki Matsui, both of Yokohama; Satoru Abe, Yokosuka; Yutaka Nishino, Miura, all of Japan

[73] Assignee: Nippon Telegraph and Telephone Corporation, Tokyo, Japan

[21] Appl. No.: 08/665,634

[22] Filed: Jun. 18, 1996

[30] Foreign Application Priority Data

Jun. 19, 1995 [JP] Japan ................................... 7-151865
Sep. 26, 1995 [JP] Japan ................................... 7-248038
Sep. 26, 1995 [JP] Japan ................................... 7-248047

[51] Int. Cl.$^6$ .................................................. H04M 3/42
[52] U.S. Cl. ...................... 379/357; 379/93.03; 379/212
[58] Field of Search .................................... 379/355, 356, 379/357, 201, 210, 211, 212, 213, 214, 67, 88, 89, 90.01, 91.01, 91.02, 93.01, 93.02, 387, 93.03, 110.01

[56] References Cited

U.S. PATENT DOCUMENTS

| | | | |
|---|---|---|---|
| 5,153,906 | 10/1992 | Akiyama | 379/112 |
| 5,197,092 | 3/1993 | Bamburak | 379/59 |
| 5,251,248 | 10/1993 | Tokunaga et al. | 379/58 |
| 5,257,414 | 10/1993 | Trahan et al. | 455/90 |
| 5,266,782 | 11/1993 | Alanara et al. | 235/380 |
| 5,479,496 | 12/1995 | Endo et al. | 379/212 |
| 5,497,411 | 3/1996 | Pellerin | 379/59 |
| 5,519,758 | 5/1996 | Tabbane | 379/59 |
| 5,668,875 | 9/1997 | Brown et al. | 380/23 |

OTHER PUBLICATIONS

Nunokawa et al., "A Personal Handyphone System with an IC Card Interface", IEEE, International Conference on Consumer Electronics, 1996 digest of technical papers, Jun. 5–7, 1996.

Murase et al., "Personal Multimedia Communications Services Experiments", NTT Review, vol. 7, No. 6, 1995.

*Primary Examiner*—Scott Weaver
*Attorney, Agent, or Firm*—Finnegan, Henderson, Farabow, Garrett & Dunner, L.L.P.

[57] ABSTRACT

By using an external portable recording medium (for instance, IC card) that stores a personal ID, a communications apparatus automatically transmits the personal ID and its own terminal identification information to a center apparatus. The center apparatus manages the personal ID and the terminal identification information so that they are correlated with each other. For example, the terminal identification information includes a called-party address, a communication mode, and a position ID. Further, the center apparatus manages a present/absent mode for each personal ID. During the present mode, the center apparatus forwards a call using a personal telecommunication number, such as a UPT (universal personal telecommunication) number, which corresponds to a certain personal ID to a communications apparatus that corresponds to the personal ID. During the absent mode, the center apparatus automatically records a message. Further, the communications apparatus reads a card ID, which may be composed of a personal ID, a personal telecommunication number, from the IC card, and compares it with a card ID that is stored in a card ID storing section. If identical, the communications apparatus judges that the IC card is not a new one and skips a center authentication operation. If not identical, the communications apparatus judges that the IC card is a new one and effects the center authentication operation.

15 Claims, 47 Drawing Sheets

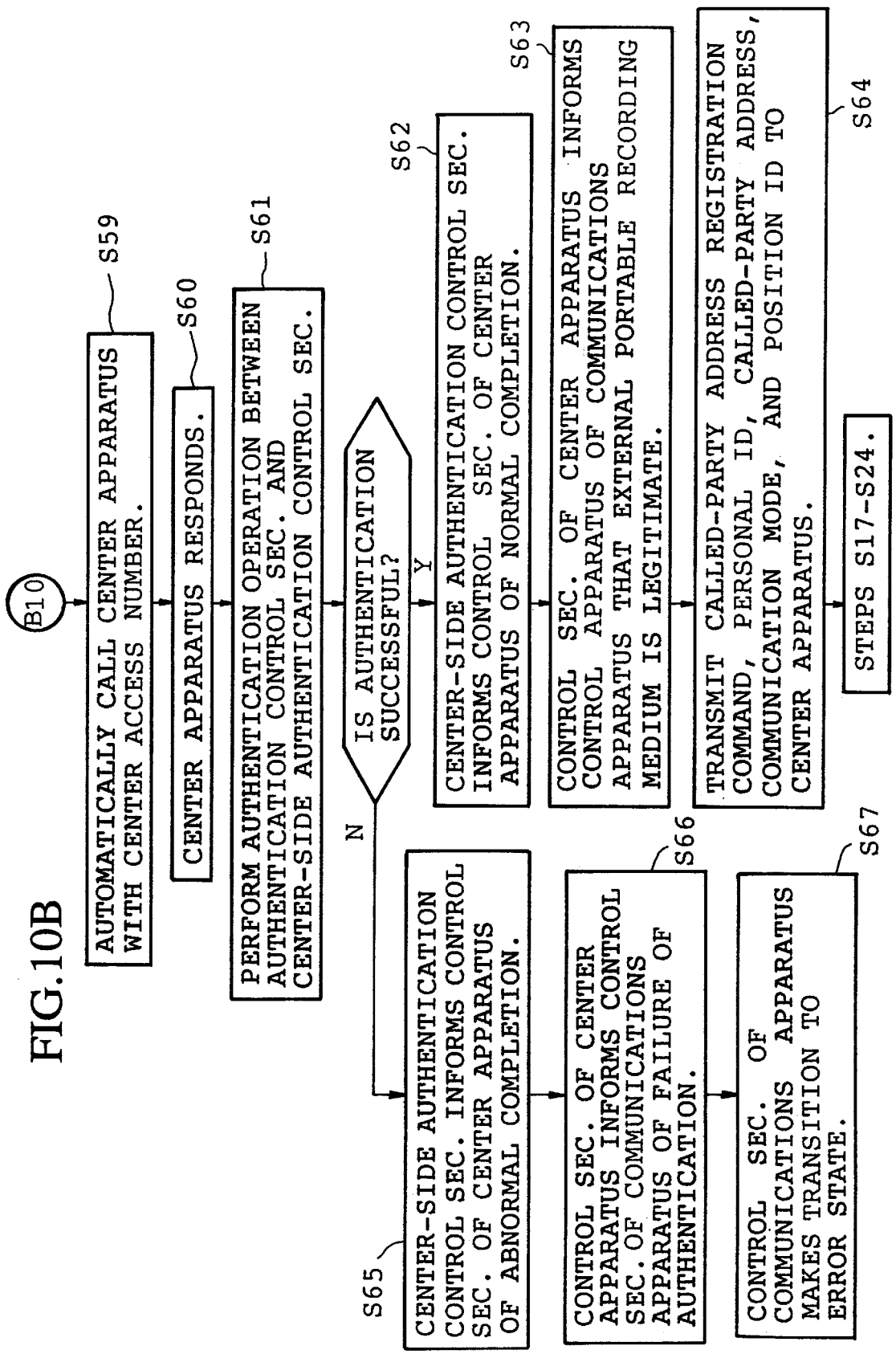

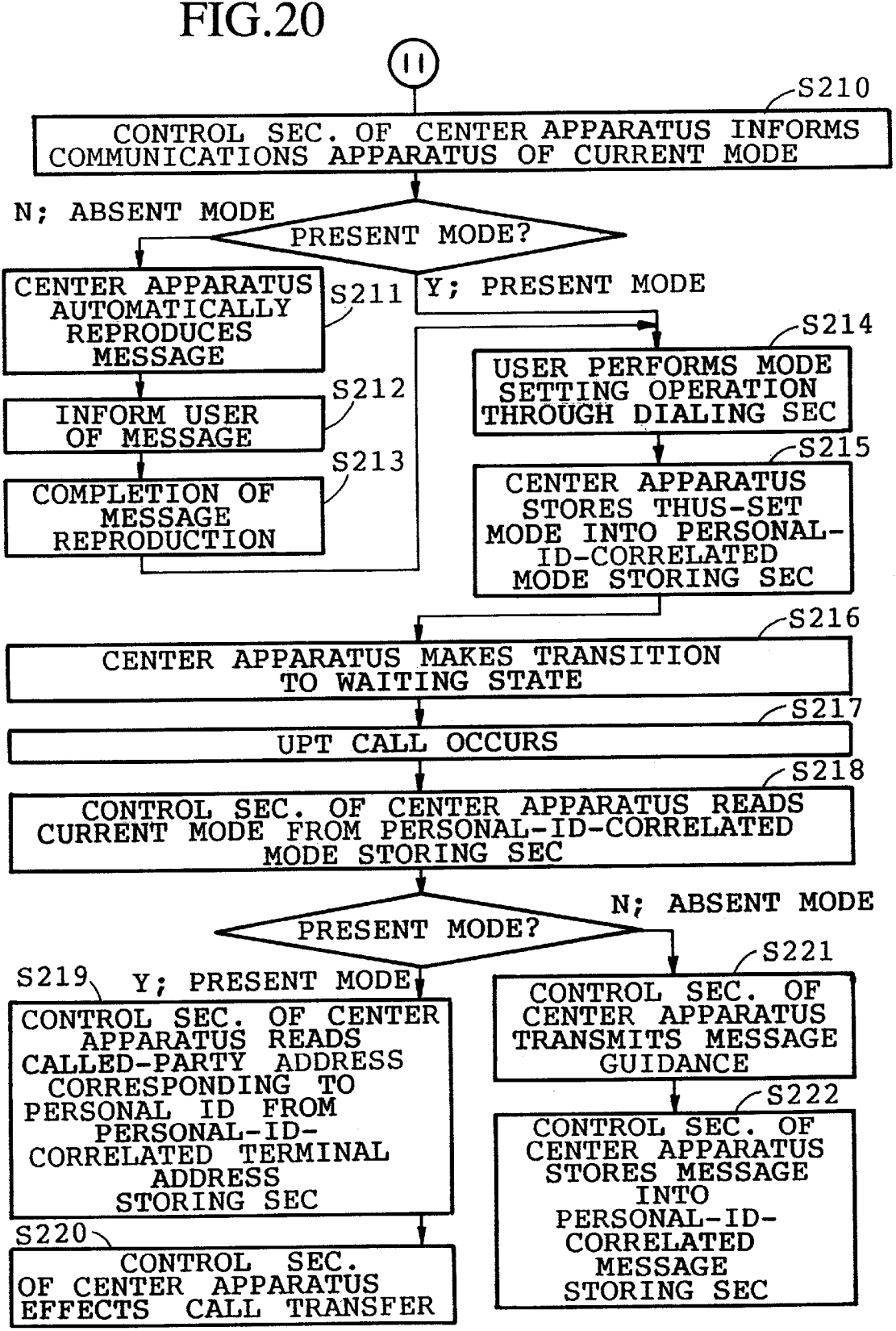

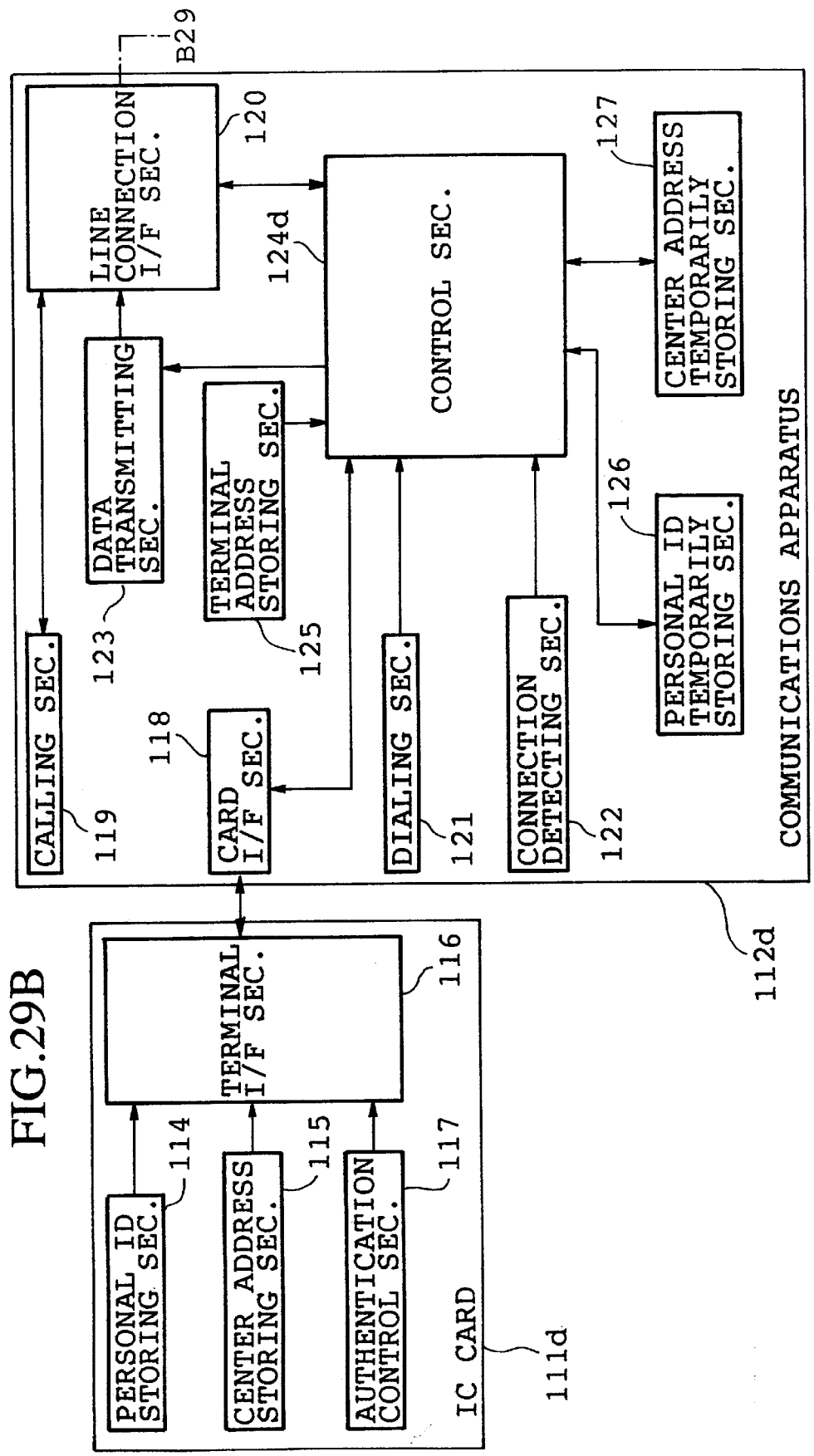

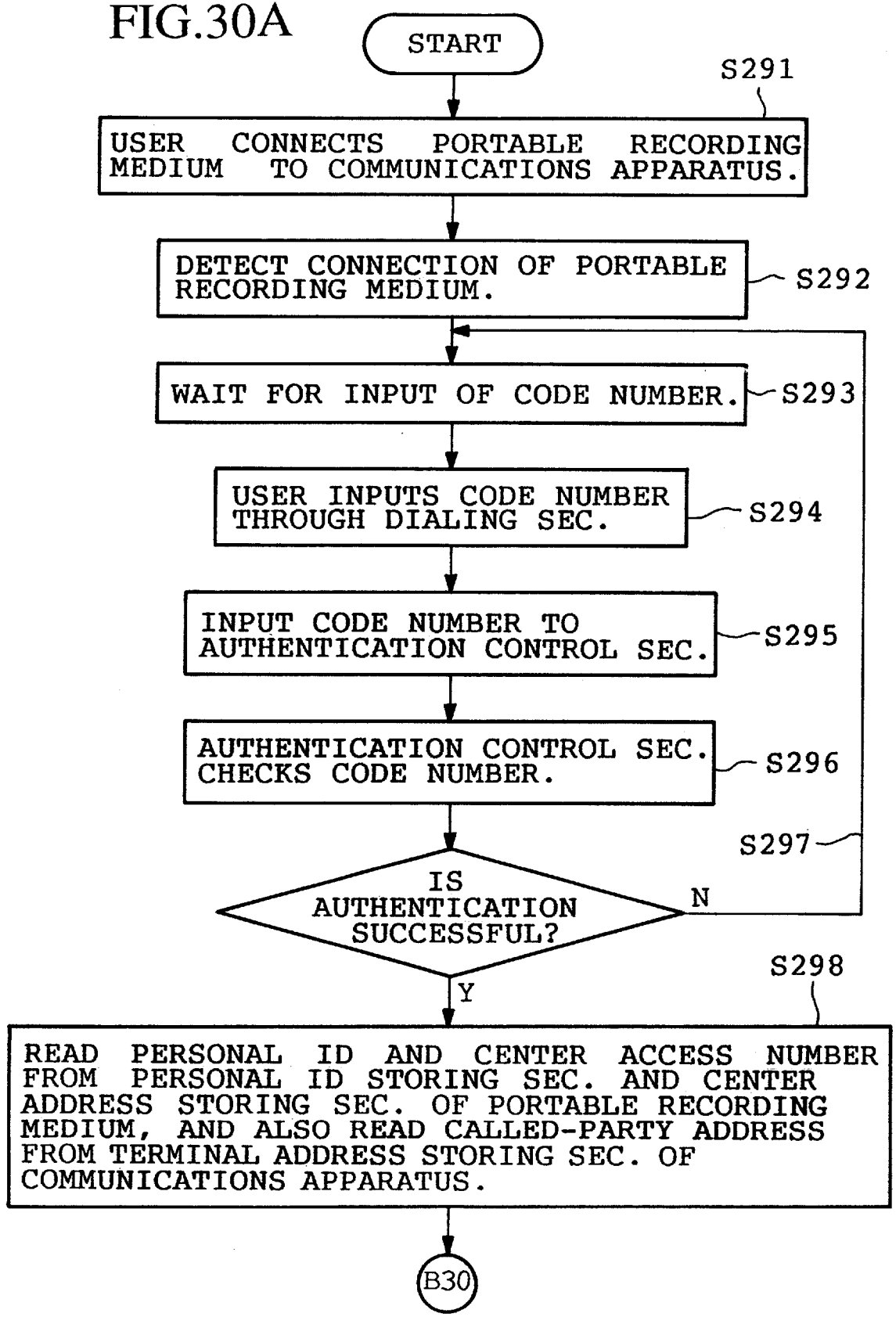

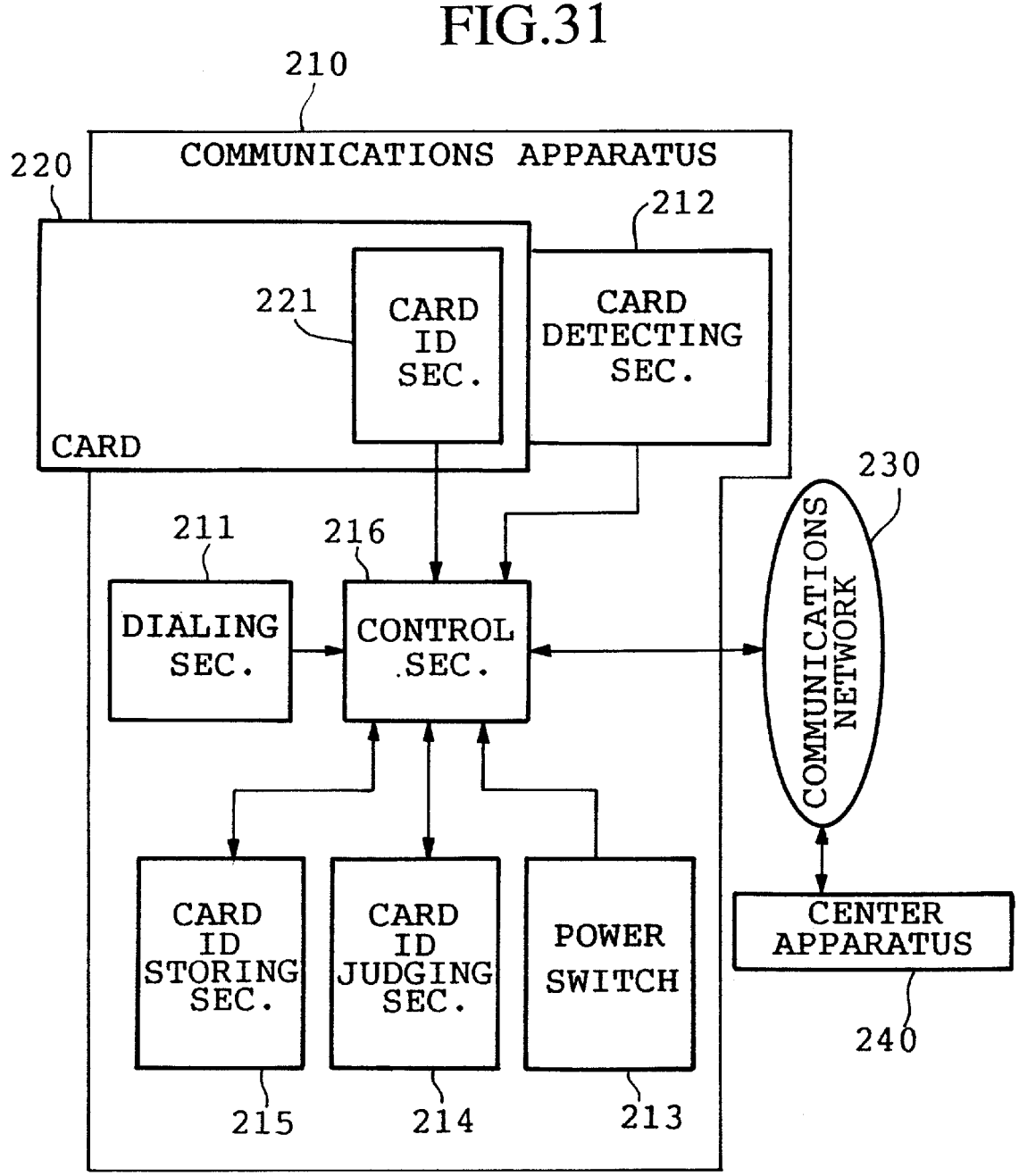

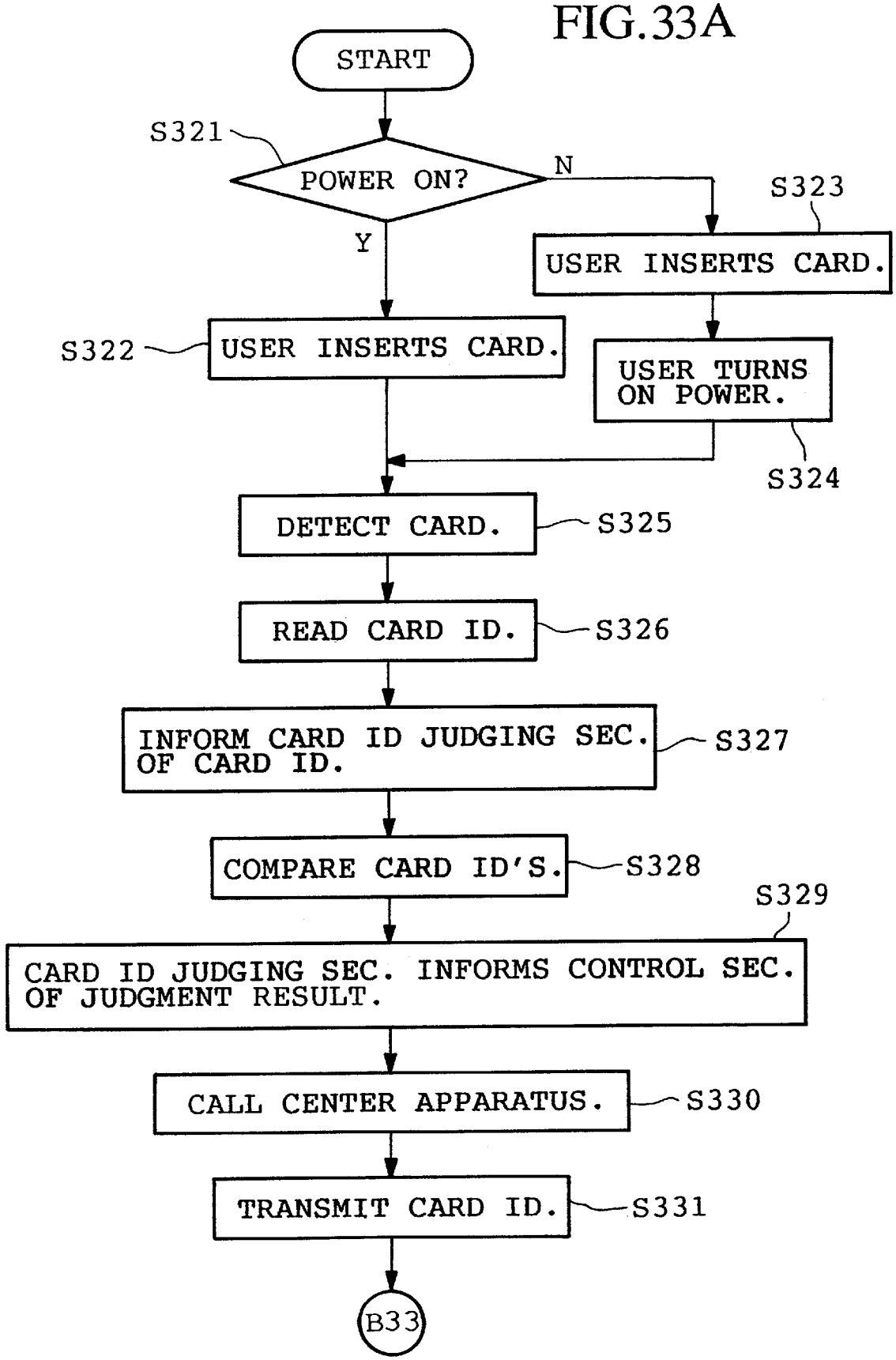

//5,982,877

COMMUNICATIONS SYSTEM USING PORTABLE RECORDING MEDIUM

BACKGROUND OF THE INVENTION

1. Field of the Invention

The present invention relates to a personal communications service. In particular, the invention relates to a communications technique using a personal telecommunication number, such as a UPT (universal personal telecommunication) number, etc., which is allocated to an individual rather than an apparatus, for instance, a technique of forwarding a call to a communications apparatus that an individual is using at that time.

The invention also relates to a communications apparatus with a card in a communications system in which a user uses a service by accessing a center apparatus that is connected to a communications network, and in which user authentication is performed by collation of an identification number and center authentication for judging of permission of a service access right is performed by signal exchange between the communications apparatus and the center apparatus.

2. Description of the Prior Art

A conventional example of a personal communications service is a call transfer service in which a call directed to a certain communications apparatus is forwarded to another, pre-registered communication apparatus. FIG. 36 shows a conventional communications system which performs a call transfer service by means of a communications service of an exchange.

The conventional communications system of FIG. 36 has a communications apparatus 200 (only one apparatus is shown in FIG. 36) for using a call transfer service and an exchange 400 for providing the call transfer service. The communications apparatus 200 and the exchange 400 are to be connected to each other via a communications network 3. The communication apparatus is equipped with a calling section 202 for allowing a user to conduct a call, a dialing section 203 for enabling dial input, a control section 204 for performing control at the time of calling, ringing, or dial input, and a line interface section 205 that is to be connected to the communications network 3. The exchange 400 is equipped with a transfer mode storing section 401 for storing a registration/cancel mode of a call transfer service in response to a manipulation of the communications apparatus 200, a transfer destination storing section 402 for storing a telephone number of a transfer destination in response to a manipulation of the communications apparatus 200, a line interface 403 that is to be connected to the communications network 3, and control section 404 that forwards a call directed to the communications apparatus 200 to the transfer destination having the telephone number that is stored in the transfer destination storing section 402, and allows a call to be processed ordinarily when the call transfer service is canceled.

When a service user (hereinafter referred to as "user") at the communications apparatus 200 wants to use a call transfer service, it is necessary for him to register a telephone number of his intended transfer destination in the exchange 400 by a dial manipulation. To this end, the user inputs a transfer destination setting special number plus a transfer destination telephone number by using the dialing section 203, to thereby register the telephone number in the transfer destination storing section 402 of the exchange 400 via the control section 204 and the line interface section 205. A similar operation is performed in changing the transfer destination telephone number. Then, to start the call transfer service, the user inputs a call transfer service start special number by using the dialing section 203, to thereby register, in the transfer mode storing section 401 of the exchange 400, information indicating that the call transfer service is currently available via the control section 204 and the line interface section 205. The call transfer service is canceled in a similar manner: the user inputs a call transfer service cancel special number. With the above settings, when there occurs a call from, for instance, a caller apparatus 31 to the communications apparatus 200, the control section 404 of the exchange 400 reads the current status (the call transfer service is available/canceled) of the communications apparatus 200 from the transfer mode storing section 401. If the call transfer service is available, the control section 404 reads the transfer destination telephone number from the transfer destination storing section 402, and forwards the call to the transfer destination via the line interface section 403. If the call transfer service is canceled, the control section 404 causes the call to be processed ordinarily.

However, the call transfer service of the conventional system requires cumbersome manipulations, because dial input needs to be performed on each occasion of registering or changing a transfer destination telephone number, or registering or canceling a call transfer service. Further, since manipulations of registering/changing a transfer destination telephone number and starting/canceling a call transfer service can be performed only at a transfer origination communications apparatus, a user cannot recognize a call that occurs while he is moving toward a transfer destination after he has effected transfer registration, in which case a caller is obliged to hear ringing tones for a long time if the transfer destination is absent. Since the caller does not know that the user is moving, he is obliged to spend an unduly long ringing time. When a person at the transfer destination other than the user responds, he will inform the caller of absence of the user. In this case, even if that person writes a message on a sheet, for instance, the information intended by the caller may not be supplied to the user due to missing of the message sheet, an incorrect message content, or the like. Therefore, the caller cannot know whether his intended information has been correctly supplied to the user.

Further, the caller hears busy tones when the transfer destination telephone is used by the user or some other person, when the transfer destination communications apparatus is located out of a service area (depending on the type of communications apparatus), or when the battery of the transfer destination communications apparatus has been used up or the power of the transfer destination communications apparatus is in an off state. Further, when the user fails to cancel a call transfer service, ranging continues to be forwarded to the transfer destination communications apparatus. In addition, the user cannot recognize a call when the user is moving toward the transfer destination, the user is absent at the transfer destination, or the transfer destination communications apparatus is incapable of communication because it is busy, it is located out of a service area, its battery is used up, or its power is in an off state. This may cause a trouble with the user.

SUMMARY OF THE INVENTION

An object of the present invention is to provide a more effective personal communications service.

Another object of the invention is to provide a communications system which allows a user to use a call transfer service by simple manipulations.

A further object of the invention is to provide a communications apparatus which can provide a user with a better call transfer service.

According to the invention, there is provided a communications system comprising a communications apparatus connected to a communications network, comprising interface means into which an external portable recording medium storing personal identification information is to be inserted; and means for informing, when the external portable recording medium is inserted into the interface means, a center apparatus of the personal identification information stored in the inserted external portable recording medium and terminal identification information of the associated communications apparatus; and the center apparatus for managing communication with the communications apparatus, comprising means for managing personal identification information and terminal identification information of a communications apparatus that is used by a user who is represented by the personal identification information such that they are correlated with each other.

That is, by using the external portable recording medium storing personal identification information (hereinafter referred to as "personal ID"), the communications apparatus transmits the personal ID and its own terminal identification information to the center apparatus. The center apparatus stores the personal ID and the terminal identification information such that they are correlated with each other.

With this configuration, the center apparatus can manage the position of a user (i.e., the position of the communications apparatus in which the external portable recording medium is inserted) and the terminal identification information of the communications apparatus being used by the user. Therefore, there can be realized a personal call transfer service, personal call-charge management and call-records management with respect to a call from a communications apparatus in which an external portable recording medium is inserted, connection permission judgment using the terminal identification information of a communications apparatus, and other services. Thus, there can be realized more effective personal services and personal use of a communications apparatus in which an external portable recording medium is inserted.

It is preferred that the terminal identification information include a called-party address of call transfer, and that the center apparatus comprise means for forwarding a call using a number that is allocated to a user to a communications apparatus in which an external portable recording medium storing personal identification information of the user is inserted. That is, when the communications apparatus calls the center apparatus by using the center access number in a state that the external portable recording medium is inserted therein and the center apparatus responds, the center apparatus transmits, to the center apparatus, a registration command, a personal ID th at is store d in the external portable recording medium, and a called-party address, a communication mode, or a position ID that is stored in a terminal identification information storing section. Thus, the registration of the personal ID, and the called-party address, communication mode, or position ID can be performed simply by insertion of the external portable recording medium into the transfer destination communications apparatus and input of the center access number.

The center apparatus has a personal-ID-correlated terminal identification storing section for storing a personal telecommunication number, such as a UPT number, which is a called-party number of a user (the UPT number is used as a representative example of personal telecommunication numbers in the following description), a personal ID received from the communications apparatus, and a called-party address, communication mode, or position ID that is also received from the communications apparatus such that they are correlated with each other. When the center apparatus has received a call with a UPT number that is a called-party number of a user, it searches the personal-ID-correlated terminal identification storing section for a personal ID corresponding to the received UPT number and a caller-party address, a communication mode, or a position ID. Thus, the center apparatus can forward the call to a communications apparatus in which the external portable recording medium of the user concerned is inserted.

It is preferred that the terminal identification information include a communication mode of the communications apparatus, and that the center apparatus comprise means for informing a caller of a call with a different communication mode that the communication mode of the call is different from that of the communications apparatus. With this configuration, where communication cannot be performed between the caller apparatus and the called-party apparatus because of a difference in communication mode as between such modes as telephone voice, facsimile data, and personal computer data, the center apparatus informs the caller of the mode difference before a call transfer, to thereby avoid unnecessary operations of an exchange and a communications apparatus. It is also preferred that the center apparatus comprise means for informing both a caller and a called party of a communication mode that enables mutual communication when a communication mode of a call from the caller is compatible with that of the communications apparatus. With this configuration, where the communication modes are compatible with each other, the center apparatus can inform both parties of the communication mode that enables communication between the caller apparatus and the called-party apparatus.

The terminal identification information may include position information representing a position of the communications apparatus, and the center apparatus may comprise means for managing the position of the communications apparatus.

Further, the communications systems may be so constructed that the external portable recording medium stores a center access number, and the communications apparatus automatically accesses the center apparatus by reading the center access number and automatically accesses the center apparatus.

That is, when the external portable recording medium is inserted into the communications apparatus, the communications apparatus automatically accesses the center apparatus. When the center apparatus has responded, the communications apparatus transmits, to the center apparatus, a registration command, a personal ID that is stored in the inserted external portable recording medium, and an apparatus type, a called-party address, a communication mode, or a position ID of the communications apparatus. Thus, the registration of the personal ID, and the called-party address, communication mode, or position ID can be performed simply by insertion of the external portable recording medium into the transfer destination communications apparatus.

It is preferred that the communications apparatus comprise means for judging of legitimacy of a user through processing with the external portable recording medium being inserted in the interface means based on user judgment data that is stored in advance in the external portable recording medium and a code number that is inputted by the user. Independently of this configuration, it is also preferred that the communications apparatus comprises means for automatically accessing the center apparatus by reading a center access number from the external portable recording medium being inserted in the interface means, and that the center apparatus comprise means for judging of legitimacy of the external portable recording medium being inserted in the accessing communications apparatus by performing processing with the external portable recording medium.

It is preferred that the communications apparatus comprise means for transmitting, to the center apparatus, called-party information of a transfer destination together with a transfer call command and the personal identification information, and that the center apparatus comprise means for effecting a transfer call based on the transfer call command and the called-party information that have been received from the communications apparatus, and a call-charge management section for performing call-charge management by storing call records such that they are correlated with the personal identification information.

Specifically, the communications apparatus may comprise means for storing dial information that is input in a state that the external portable recording medium is inserted in the interface means; means for automatically accessing the center apparatus by reading a center access number from the external portable recording medium being inserted in the interface means when an off-hook operation is performed after the input of the dial information; and means for transmitting, to the center apparatus, the dial information that is stored in the dial information storing means as the called-party information.

Further, the communications apparatus may comprise means for automatically accessing the center apparatus by reading a center access number from the external portable recording medium being inserted in the interface means when an off-hook operation is performed without any dial input operation in a state that the external portable recording medium is inserted in the interface means; and means for transmitting, to the center apparatus, an information access number that is read from the external portable recording medium being inserted in the interface means as the called-party information. This configuration allows access to an information guidance via the center apparatus merely by an off-hook operation. In this case, it is preferred that the communications apparatus comprise means for judging whether the external portable recording medium being inserted in the interface means is for information access.

According to another aspect of the invention, there is provided a communications system comprising a communications apparatus connected to a communications network, comprising interface means into which a portable recording medium storing a personal ID and a center access number to be used for accessing a center apparatus is to be inserted; and means for automatically calling the center apparatus by using the center access number stored in the portable recording medium when the portable recording medium is inserted into the interface means, to thereby inform the center apparatus of the personal ID stored in the inserted portable recording medium and terminal identification information of the associated communications apparatus; and means for registering a present or absent mode in the center apparatus; and the center apparatus for managing communication with the communications apparatus, comprising means for managing a personal ID and terminal identification information of a communications apparatus that is used by a user who is represented by the personal ID such that they are correlated with each other; and means for managing, for each personal ID, the present or absent mode that has been registered by the mode registering means, and for forwarding, during the present mode, a call received by the center apparatus with a telephone number corresponding to a personal ID to a communications apparatus corresponding to the personal ID, and automatically recording a message during the absent mode. It is preferred that the center apparatus comprise means for automatically reproducing the message, recorded in the recording means, corresponding to the personal ID of which the center apparatus has been informed by the informing means, when the informing accesses the center apparatus.

That is, in this aspect of the invention, the portable recording medium is used, and the communications apparatus automatically accesses the center apparatus upon insertion of the portable recording medium to transmit a personal ID as well as a called-party address, which are managed by the center apparatus. Thus, the center apparatus can recognize the states of a user and a communications apparatus, and deal with more detailed personal information. Further, a present/absent mode can be set for each user through key manipulation on the communications apparatus. Call transfer is effected during a present mode, and a message is automatically recorded during an absent mode.

With the above configuration, a present/absent mode can be set for each personal ID in a simplified manner. By automatically recording a message during the absent mode, there can be avoided such events as missing of a message sheet and transmission of an incorrect message content: a message can be transmitted correctly.

It is possible that the mode registering means comprise means for automatically registering the present mode when the portable recording medium is inserted into the interface means, and the absent mode when the portable recording medium is removed from the interface means. That is, a present mode is automatically set when the portable recording medium is inserted, and an absent mode is automatically set when the portable recording medium is removed. This simplifies the setting operation.

In this case, in setting an absent mode, it is necessary to access the center apparatus after the removal of the portable recording medium. To this end, it is preferred that the automatically registering means comprise temporarily storing means for reading the personal ID and the center access number from the portable recording medium and temporarily storing those when the portable recording medium is inserted into the interface means; means for registering the absent mode by automatically accessing the center apparatus by using the personal ID information and the center access number stored in the temporarily storing means when the portable recording medium is removed from the interface means; and means for erasing stored contents of the temporarily storing means when the registration of the absent mode has been completed.

It is preferred that the center apparatus comprise means for setting, in forwarding the call received by the center apparatus with the telephone number corresponding to the personal ID to the communications apparatus corresponding to the personal ID, the absent mode for the personal ID when a predetermined time has elapsed from a start of transfer calling without reception of a response from the communications apparatus, or when a calling line connected to the communications apparatus is busy.

With this configuration, when the called-party apparatus is in a state being incapable of receiving a transfer call, or when it is in a state capable of receiving it but does not respond even during long-time calling, an absent mode is automatically set and a message of a caller can be recorded automatically. Therefore, when the transfer destination communications apparatus is used by a user or some other person, or it is located out of reach of radio waves (in the case of certain types of communications apparatus), its battery is used up, its power is in an off state, or it does not respond even during long-time calling, an absent mode is automatically set, whereby a message guidance is transmitted to a caller and a message can be automatically recorded so as to be correlated with the personal ID. As a result, the caller can transmit his message without calling the user again. Since a message can be recorded in the center apparatus even if the called-party communications apparatus in a state of being incapable of communication, the message can be transmitted in a reliable manner.

Further, the system may be so constructed that in recording a message of a caller a message date and time and his UPT number are also recorded, and that when accessed by a user the center apparatus transmits not only the existence of messages and the number of messages but also each message date and time and the caller UPT numbers. If the user wants to contact a caller after listening to the messages, he can access the caller by using his UPT number, thus eliminating the need of dialing again.

That is, it is preferred that the center apparatus comprise message information storing means for storing, for each personal ID, message information including existence of messages for a user who is represented by the personal ID, each message date and time, the number of messages, and telephone numbers corresponding to a personal ID of persons who left the messages; and means for transmitting, when the center apparatus was informed of the personal ID and the called-party address in response to insertion of the portable recording medium into the interface means, the message information to the communications apparatus that is represented by the called-party address. In this case, it is preferred that the communications apparatus comprise means for calling a person having a telephone number included in message information after the user acknowledges the message information and the message that have been transmitted from the center apparatus.

Further, the security can be improved by providing authenticating means that allows an authentication operation to be performed between the portable recording medium and the communications apparatus or between the portable recording medium and the center apparatus.

According to a further aspect of the invention, there is provided a communications apparatus which is used in a state that a card is inserted therein, comprising a card in which a card ID is stored; a card detecting section for detecting insertion of the card; a power switch for turning on/off the power; a card ID storing section for storing a card ID even while the power switch in an off state; a card ID judging section for comparing the card ID stored in the card and the card ID stored in the card ID storing section, to judge whether they are identical; a dialing section for allowing dial input; and a control section for reading the card ID from the card when the card is inserted during an on state of the power switch or when the power switch is turned on after the card is inserted during an off state of the power switch, causing the card judging section to compare the readout card ID and the card ID stored in the card ID storing section, judging that the card is not a new one if they are identical and skipping an authentication operation to be performed with a center apparatus connected via a communications network, judging that the card is a new one if they are not identical and performing the authentication operation with the center apparatus, and storing the card ID of the inserted card into the card ID storing section when the authentication operation has ended normally.

With the above configuration, the card ID is read from the card when the card is inserted during an on state of the power switch or when the power switch is turned on after the card is inserted during an off state of the power switch, and is compared with the card ID stored in the card ID storing section. If they are identical, it is judged that the card is the same as a previously inserted card, i.e., it is not a new card, in which case the authentication operation to be performed with the center apparatus connected via the communications network is skipped and a transition to a service access permitted state is made. If they are not identical, it is judged that the card is a new one, in which case the center authentication operation to judge whether a service access right should be granted is performed with the center apparatus with dial input. If the authentication operation has ended normally, the card ID of the inserted card is stored into the card ID storing section and a transition to the service access permitted state is made.

In addition to the above configuration, there may be provided configuration including a local authenticating section provided in the card, for collating a code number that is input through the dialing section and a code number stored in the card; a center authenticating section provided in the card, for performing a center authentication operation with a center apparatus connected via a communications network; and a control section for reading the card ID from the card when the card is inserted during an on state of the power switch or when the power switch is turned on after the card is inserted during an off state of the power switch, causing the card judging section to compare the readout card ID and the card ID stored in the card ID storing section, judging that the card is not a new one if they are identical and skipping the center authentication operation to be performed after a local authentication operation with input of the code number, judging that the card is a new one if they are not identical and performing the center authentication operation after the local authentication operation, and storing the card ID of the inserted card into the card ID storing section when the center authentication operation has ended normally.

With the above configuration, the authentication function can be realized by processing between the communications apparatus and the card rather than between the communications apparatus and the center apparatus. This contributes to shortening of a manipulation time. Further, by performing the center authentication operation between the card and the center apparatus rather than between the communications apparatus and the center apparatus, no dial manipulation is needed during the center authentication operation. In operation, when the card is inserted during an on state of the power switch or when the power switch is turned on after the card is inserted during an off state of the power switch, the individual authentication operation is performed within the communications apparatus with input of a code number through the dialing section. Then, the card ID is read from the card, and compared with the card ID stored in the card ID storing section. If they are identical, it is judged that the card is the same as a previously inserted card, that is, it is not a new one, in which case the center authentication operation to be performed between the card and the center apparatus connected via the communications network to judge whether a service access right should be granted is skipped. If they are not identical, it is judged that the card is a new one, in which case the center authentication operation is performed. If the authentication operation has ended normally, the card ID of the inserted card is stored into the card ID storing section and a transition to the service access permitted state is made.

According to another aspect of the invention, there is provided a communications apparatus connected to a communications network, comprising interface means into which an external portable recording medium storing personal identification information is to be inserted; and control means for transmitting, when the external portable recording medium is inserted into the interface means, the personal identification information stored in the external portable recording medium and terminal identification information of the communications apparatus to one of a center apparatus connected to the communications network and a center function processing section provided in an exchange that belongs to the communications network which serve to manage communication of the communications apparatus.

According to still another aspect of the invention, there is provided a center apparatus connected to a communications network, comprising storing means for storing personal identification information and terminal identification information of a communications apparatus which are transmitted from the communications apparatus via the communications network; and control means for managing the personal identification information and the terminal identification information of the communications apparatus to be used by a user who is represented by the personal identification information.

According to another aspect of the invention, there is provided a portable recording medium to be inserted into a communications apparatus connected to a communications network, comprising personal identification information storing means for storing personal identification information; and center access number storing means for storing an access number to be used for accessing one of a center apparatus connected to the communications network and a center function processing section provided in an exchange that belongs to the communications network which serve to manage communication of the communications apparatus.

According to another aspect of the invention, there is provided a communications system comprising a communications apparatus connected to a communications network, comprising interface means into which an external portable recording medium storing personal identification information is to be inserted; and means for transmitting, when the external portable recording medium is inserted into the interface means, the personal identification information stored in the external portable recording medium and terminal identification information of the communications apparatus to a center function processing section; and an exchange provided in the communications network, comprising the center function processing section for managing communication of the communications apparatus so as to manage personal identification information and terminal identification information of a communications apparatus to be used by a user who is represented by the personal identification information.

According to a further aspect of the invention, there is provided a communications system comprising a communications apparatus connected to a communications network, comprising interface means into which a portable recording medium storing personal identification information and a center access number to be used for accessing a center function processing section is to be inserted; and means for transmitting, when the portable recording medium is inserted into the interface means, the personal identification information stored in the portable recording medium and a called-party address of the communications apparatus to the center function processing section by automatically calling the center function processing section by using the center access number stored in the portable recording medium; and means for registering a present or absent mode in the center function processing section; and an exchange provided in the communications network, comprising the center function processing section for managing communication of the communications apparatus, the center function processing section comprising means for managing personal identification information and terminal identification information of a communications apparatus to be used by a user who is represented by the personal identification information; and means for managing, for each personal identification information, the present or absent mode that has been registered by the mode registering means, and for forwarding, during the present mode, a call received by the center function processing section with a telephone number corresponding to personal identification information to a communications apparatus corresponding to the personal identification information, and automatically recording a message during the absent mode.

BRIEF DESCRIPTION OF THE DRAWINGS

FIGS. 10A and 10B show an operation flow of the communications system of FIG. 9;

FIGS. 19 and 20 show an operation flow of the communications system of FIGS. 18A and 18B;

FIGS. 29A and 29B illustrate a block diagram showing the configuration of a communications system according to a thirteenth embodiment of the invention (FIG. 29B is connected to FIG. 29A through line B29);

FIGS. 30A and 30B show an operation flow of the communications system of FIGS. 29A and 29B;

FIG. 31 is a block diagram showing the configuration of a communications apparatus according to a fourteenth embodiment of the invention;

FIGS. 33A and 33B show an operation flow of the communications apparatus of FIG. 31;

DESCRIPTION OF THE PREFERRED EMBODIMENTS

Figure 1:
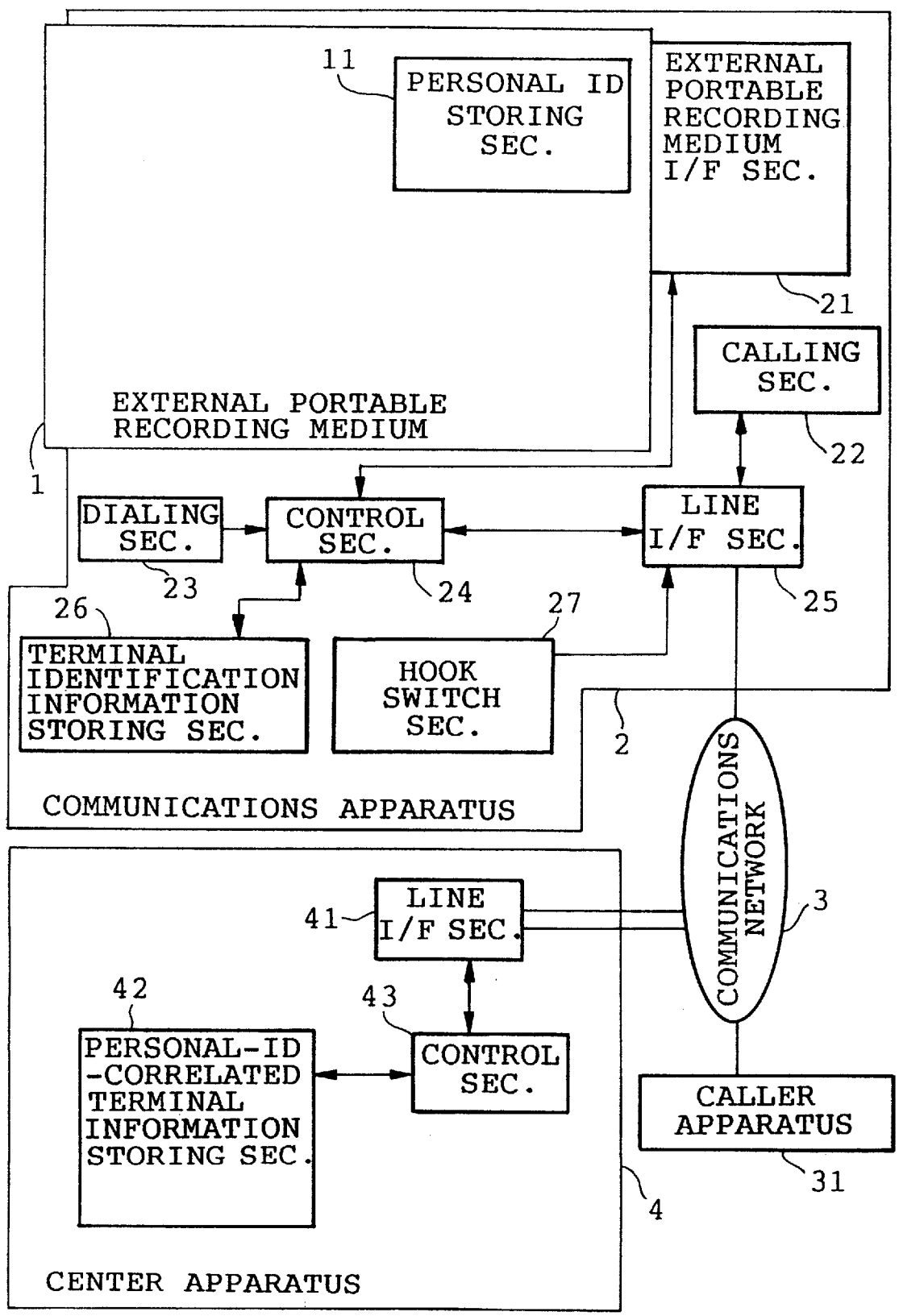
FIG. 1 is a block diagram showing the configuration of a communications system according to a first embodiment of the present invention.

FIG. 1 is a block diagram showing the configuration of communications system according to a first embodiment of the present invention. This communications system includes a communications apparatus 2 which is to be connected to a communications network 3 and into which an external portable recording medium 1 is to be inserted, and a center apparatus 4 for managing communication of the communications apparatus 2. For example, the external portable recording medium 1 is an IC card which has a personal ID storing section 11 for storing personal identification information (hereinafter referred to as "personal ID"). The communications apparatus 2 is equipped with an external portable recording medium interface section 21 into which the external portable recording medium 1 is to be inserted, a calling section 22 for allowing a user to conduct a call, a dialing section 23 for enabling dial input, a control section 24, a line interface section 25 that is to be connected to the communications network 3, a terminal identification information storing section 26 for storing terminal identification information of the communications apparatus 2, and a hook switch section 27. When an external portable recording medium 1 is inserted into the external portable recording medium interface section 21, the control section 24 performs control of informing the center apparatus 4 of a personal ID stored in the external portable recording medium 1 and the terminal identification information of the communication apparatus 2 to which the control section 24 belongs. The center apparatus 4 is equipped with a line interface section 41 that is to be connected to the communications network 3, a personal-ID-correlated terminal identification information storing section 42 for managing a personal ID and a communications apparatus to be used by a user who is represented by the personal ID such that they are correlated with each other, and a control section 43.

Figure 2:
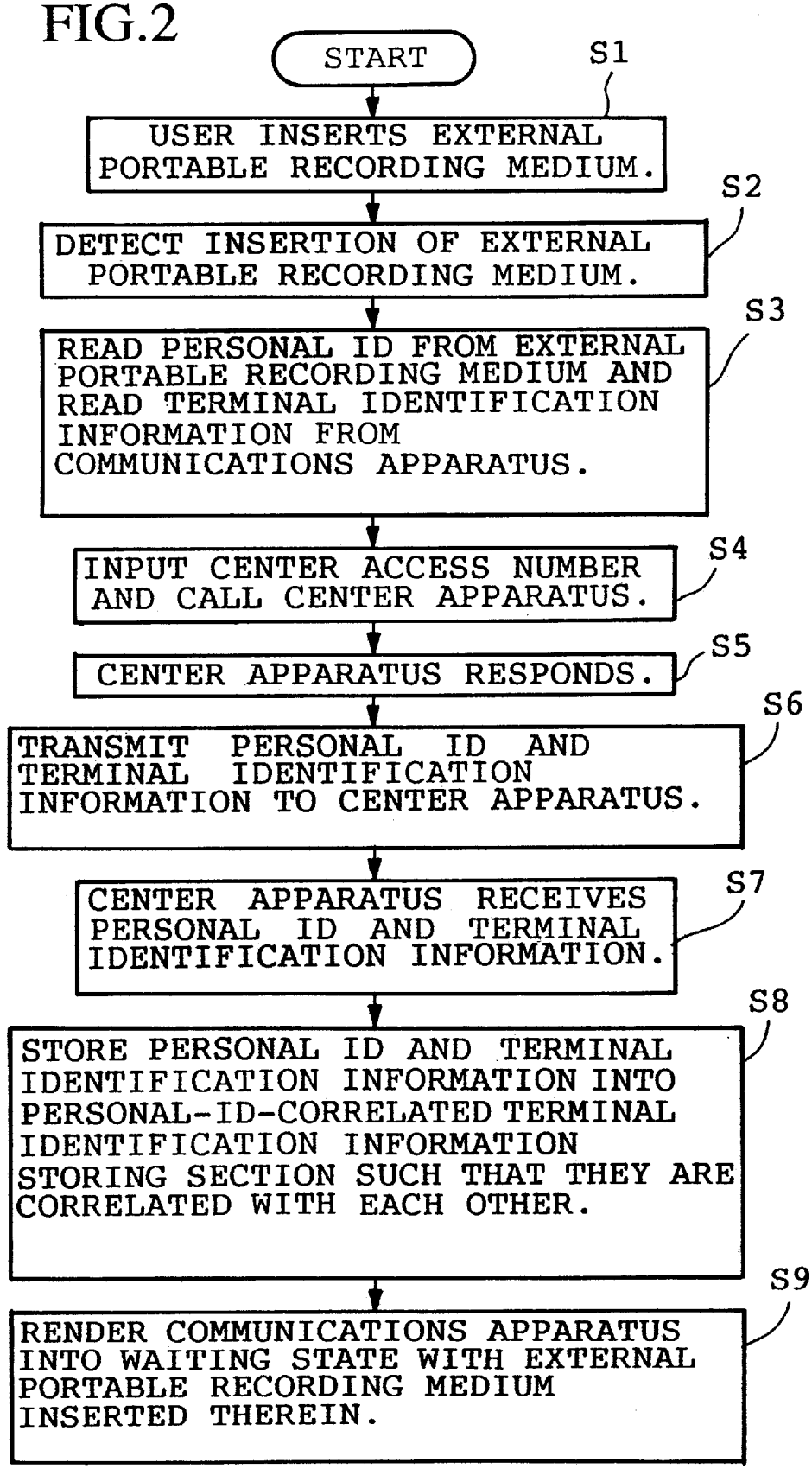
FIG. 2 shows an operation flow of the communications system of FIG. 2.

FIG. 2 shows an operation flow of the above communications system.

A user inserts the external portable recording medium 1 that stores a personal ID into the communications apparatus 2 (step S1). Upon the insertion of the external portable recording medium 1, in the communications apparatus 2 the external portable recording medium interface section 21 detects it and informs the control section 24 of the detection (step S2). Upon the detection of the insertion, the control section 24 reads the personal ID from the personal ID storing section 11 of the external portable recording medium 1, and also reads terminal identification information from the terminal identification information storing section 26 of the communications apparatus 2 (step S3). Subsequently, the user inputs an access number of the center apparatus 4 through the dialing section 23. When the user performs an off-hook operation on the hook switch section 27, the control section 24 calls the center apparatus 4 via the line interface section 25 (step S4). In the center apparatus 4, the control section 43 responds to the access from the communications apparatus 2 via the line interface section 41 (step S5). In response, the control section 24 of the communications apparatus 2 transmits the personal ID and the terminal identification information to the center apparatus 4 via the line interface section 25 (step S6). In the center apparatus 4, the line interface section 41 receives the personal ID and the terminal identification information (step S7) and the control section 43 stores the personal ID and the terminal identification information into the personal-ID-correlated terminal identification information storing section 42 such that they are correlated with each other (step S8). Thereafter, the control section 43 disconnects the communications apparatus 2, which makes a transition to a waiting state with the external portable recording medium 1 inserted therein (step S9).

With the above constitution, since the center apparatus 4 stores the personal ID and the terminal identification information such that they are correlated with each other, it can manage the position of the user (i.e., the position of the communications apparatus 2 in which the external portable recording medium 1 is inserted) and the terminal identification information of the communications apparatus 2 being used by the user. Therefore, there can be realized a personal call transfer service, call-charge management and past-call-records management for each user for calls from communications apparatuses in which the external portable recording medium 1 is inserted, and connection permission judgment etc. using the terminal identification information of the communications apparatus 2. Thus, not only a personal service can be realized but also the communications apparatus 2 in which the external portable recording medium 1 is inserted can be used as a personal communications apparatus.

Figure 3:
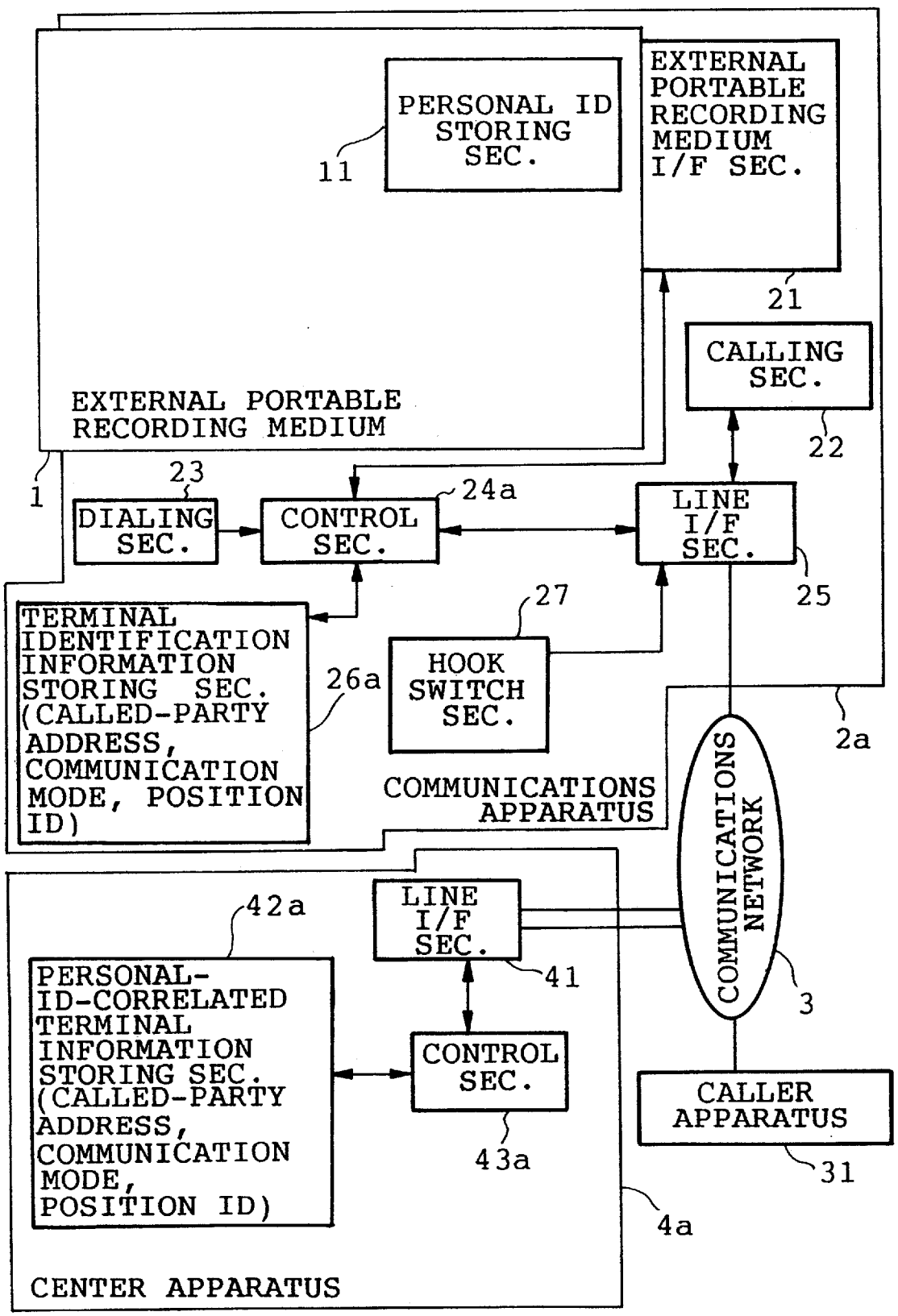
FIG. 3 is a block diagram showing the configuration of a communications system according to a second embodiment of the invention.

FIG. 3 is a block diagram showing a communications system according to a second embodiment of the invention. This embodiment is different from the first embodiment in the following points. The terminal identification information includes a call transfer called-party address, a communication mode of the communication apparatus 2a, and a position ID that represents the position of the communications apparatus 2. When receiving a call with a number that is allocated to a user, a center apparatus 4a forwards the call to the communication apparatus 2a in which an external portable recording medium 1 that stores a personal ID of the user is inserted. If the call is of a communication mode different from that of the communications apparatus 2a, the center apparatus 4a informs the caller of the difference of the communication mode. If the call is of a communication mode that is compatible with the communication mode of the communications apparatus 2a, the center apparatus 4a informs both of the called party and the caller of a communication mode that enables mutual communication. Further, the center apparatus 4a manages the position of the communications apparatus 2a.

Figure 4A:
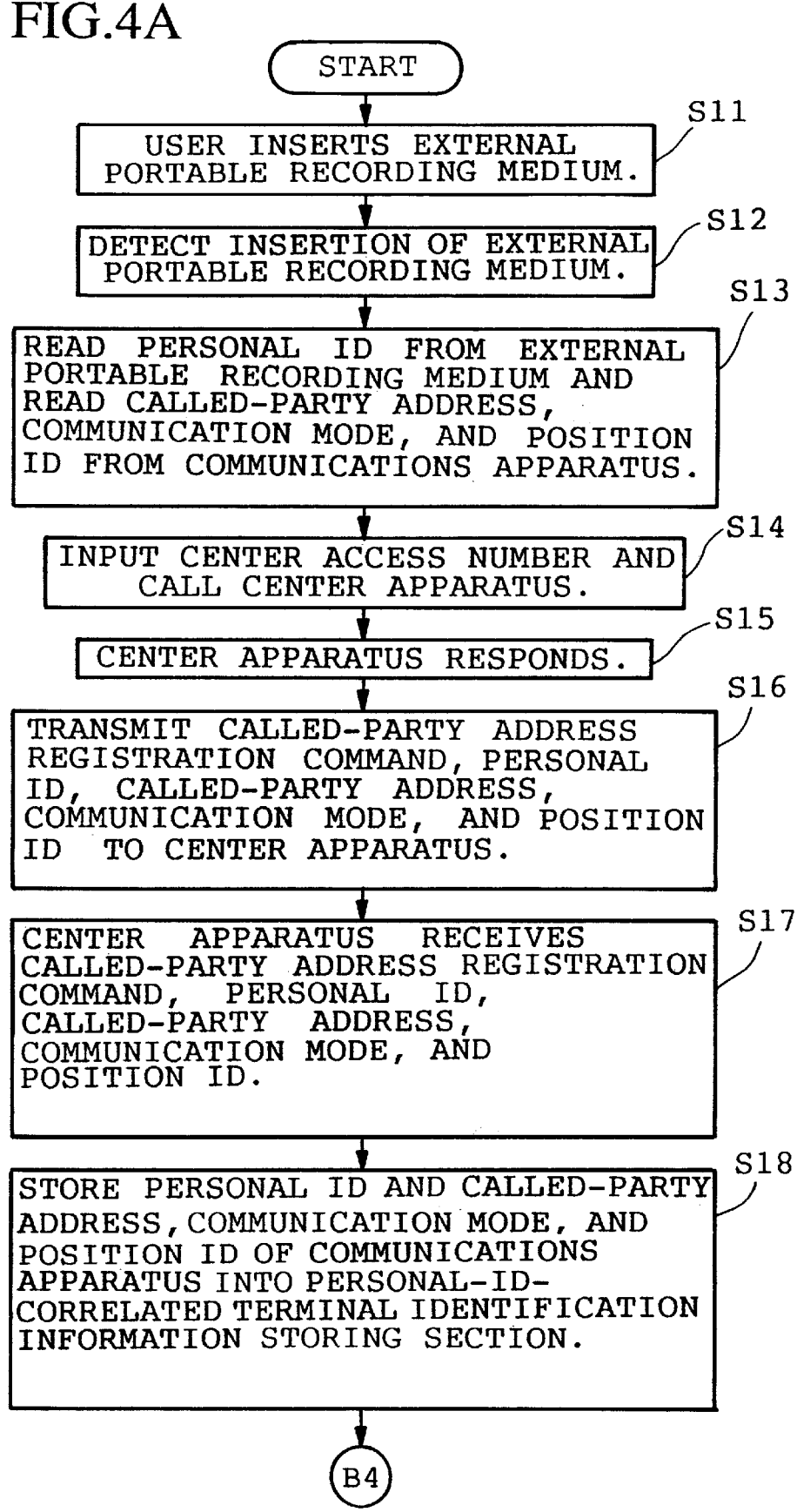
FIGS. 4A and 4B show an operation flow of the communications system of FIG. 3.
Figure 4B:
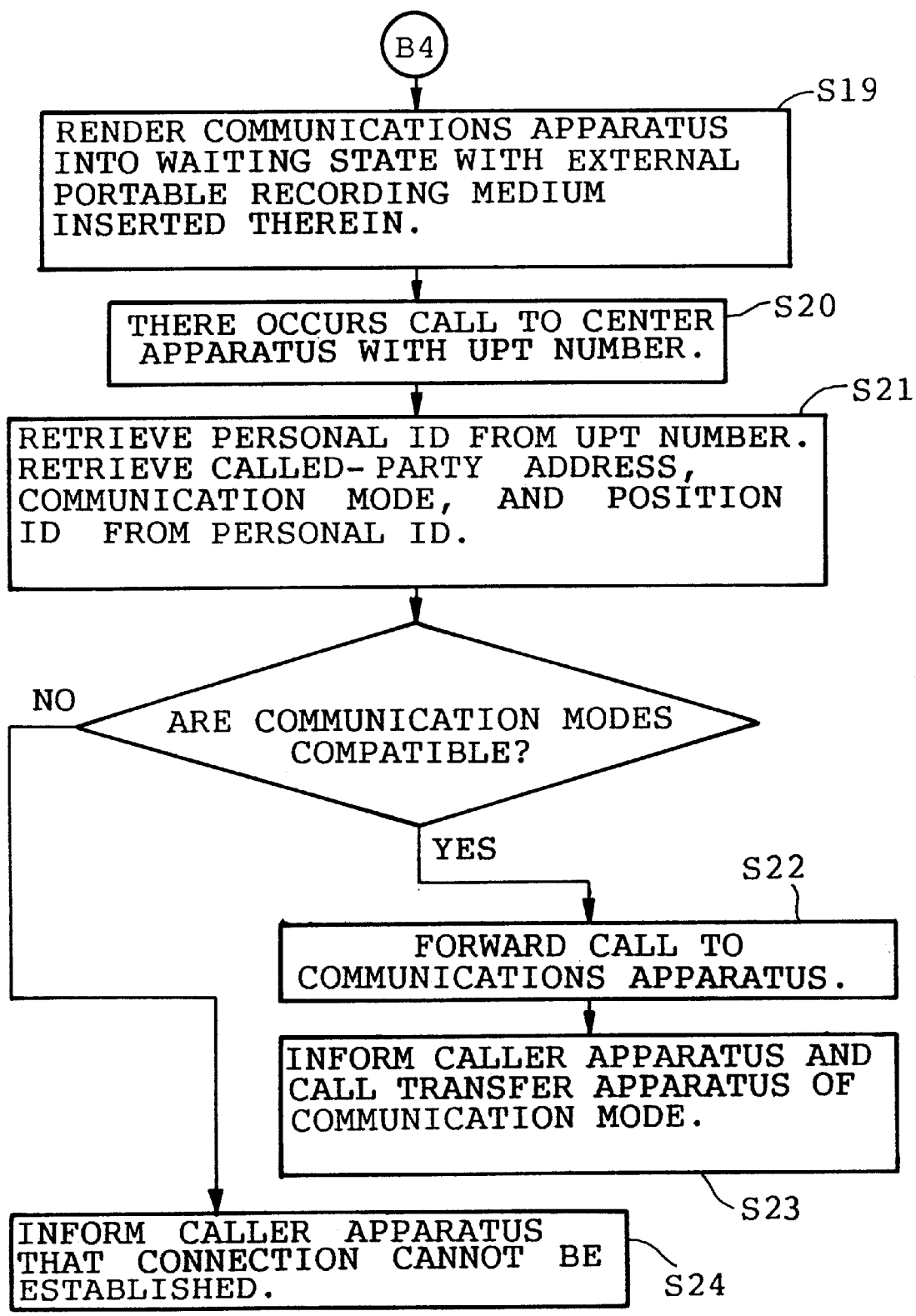

FIGS. 4A and 4B show an operation flow of this communications system.

A user inserts the external portable recording medium 1 that stores a personal ID into the communications apparatus 2a (step S11). Upon the insertion of the external portable recording medium 1, in the communications apparatus 2a the external portable recording medium interface section 21 detects it and informs the control section 24a of the detection (step S12). Upon the detection of the insertion, the control section 24a reads the personal ID from the personal ID storing section 11 of the external portable recording medium 1, and also reads a called-party address, a communication mode, and a position ID from the terminal identification information storing section 26a of the communications apparatus 2a (step S13). Subsequently, the user inputs an access number of the center apparatus 4a through the dialing section 23. When the user performs an off-hook operation on the hook switch section 27, the control section 24a calls the center apparatus 4a via the line interface section 25 (step S14) When the center apparatus 4a has responded (step S15), the control section 24a transmits a called-party address registration command, the personal ID, the called-party address, the communication mode, and the position ID to the center apparatus 4a via the line interface section 25 (step S16). In the center apparatus 4a, the line interface section 41 receives the called-party address registration command, the personal ID, the called-party address, the communication mode, and the position ID (step S17), and the control section 43a stores the apparatus type, the called-party address, the communication mode, and the position ID of the communications apparatus 2a into the personal-ID-correlated terminal identification information storing section 42a that stores a UPT number, which is one of personal telecommunication numbers (in this case, called-party number of the user), such that they are correlated with the personal ID (step S18). Thereafter, the control section 43a disconnects the communications apparatus 2a, which makes a transition to a waiting state with the external portable recording medium 1 inserted therein (step S19).

Thereafter, when a call from the caller apparatus 31 is received by the center apparatus 4a with the UPT number of the user (step S20), the control section 43a searches the personal-ID-correlated terminal identification information storing section 42 for the personal ID corresponding to the called-party UPT number, the apparatus type of the call transfer destination, the called-party address, the communication mode, and the position ID (step S21). If the communication modes of the caller apparatus 31 and the call transfer apparatus (communications apparatus 2a) are compatible with each other, the control section 43a forwards, with the called-party address, the call to the call transfer apparatus (step S22), and informs the caller apparatus 31 of the communication mode in which the caller apparatus 31 and the call transfer apparatus communicate with each other (step S23). If the communication modes are not compatible, the control section 43a does not forward the call and informs the caller apparatus 31 that connection cannot be established (step S24).

The communication mode as mentioned above includes the apparatus type such as a telephone, a facsimile machine, or the like, the G3 or G4 protocol of facsimile communication, and a communication protocol of personal computer communication.

The position ID received by the center apparatus 4a can be used for the position management of the communications apparatus 2a in the center apparatus 4a, for instance, for a service of displaying a location where the communications apparatus 2a exists. Although the above description is directed to the case where the communications apparatus is a fixed one, the invention can also be applied to a case of a mobile communications apparatus. In the latter case, the position ID is updated in accordance with a based station being used.

Although the above description is directed to the case where the terminal identification information includes the call transfer called-party address, the communication mode of the call transfer apparatus, and the position ID indicating its position, the invention can also be applied to a case where the terminal identification information includes only one of those and control is performed accordingly.

Figure 5:
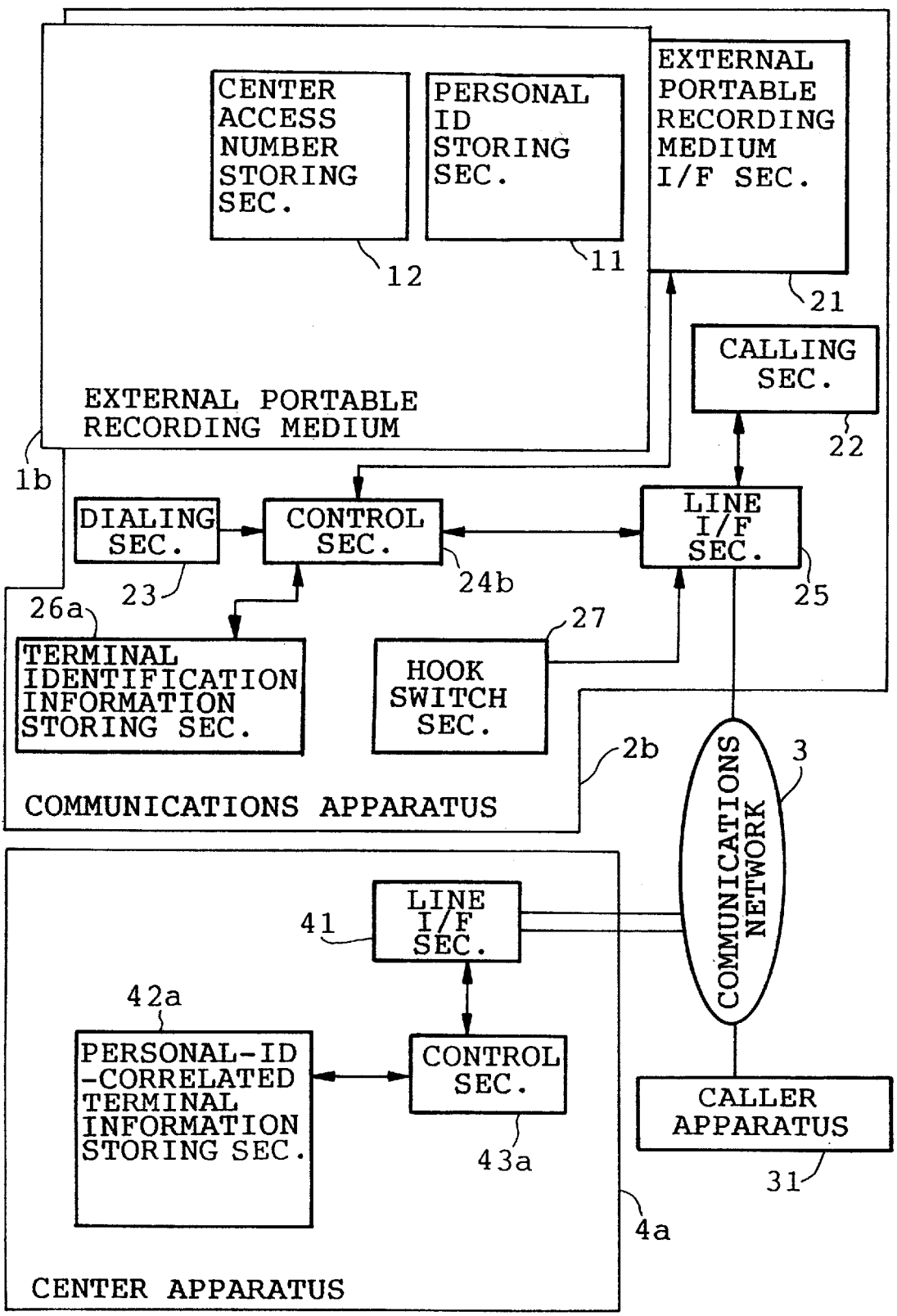
FIG. 5 is a block diagram showing the configuration of a communications system according to a third embodiment of the invention.

FIG. 5 is a block diagram showing the configuration of a third embodiment of the invention. This embodiment is different from the second embodiment in that a communications apparatus 2b reads a center access number from an external portable recording medium 1b that is inserted in an external portable recording medium interface section 21, and automatically accesses a center apparatus 4a. That is, the external portable recording medium 1b has a center access number storing section 12 for storing an access number to be used for accessing the center apparatus 4a via a communications network 3. When detecting insertion of the external portable recording medium 1b, a control section 24b of the communications apparatus 2b automatically calls the center apparatus 4a with the center access number that is stored in the center access number storing section 12 of the external portable recording medium 1b. When the center apparatus 4a has responded, the control section 24b transmits, to the center apparatus 4a, a registration command, a personal ID that is stored in the personal ID storing section 11 of the inserted external portable recording medium 1b, and a terminal identification number that is stored in a terminal identification information storing section 26a of the communications apparatus 2b.

Figure 6:
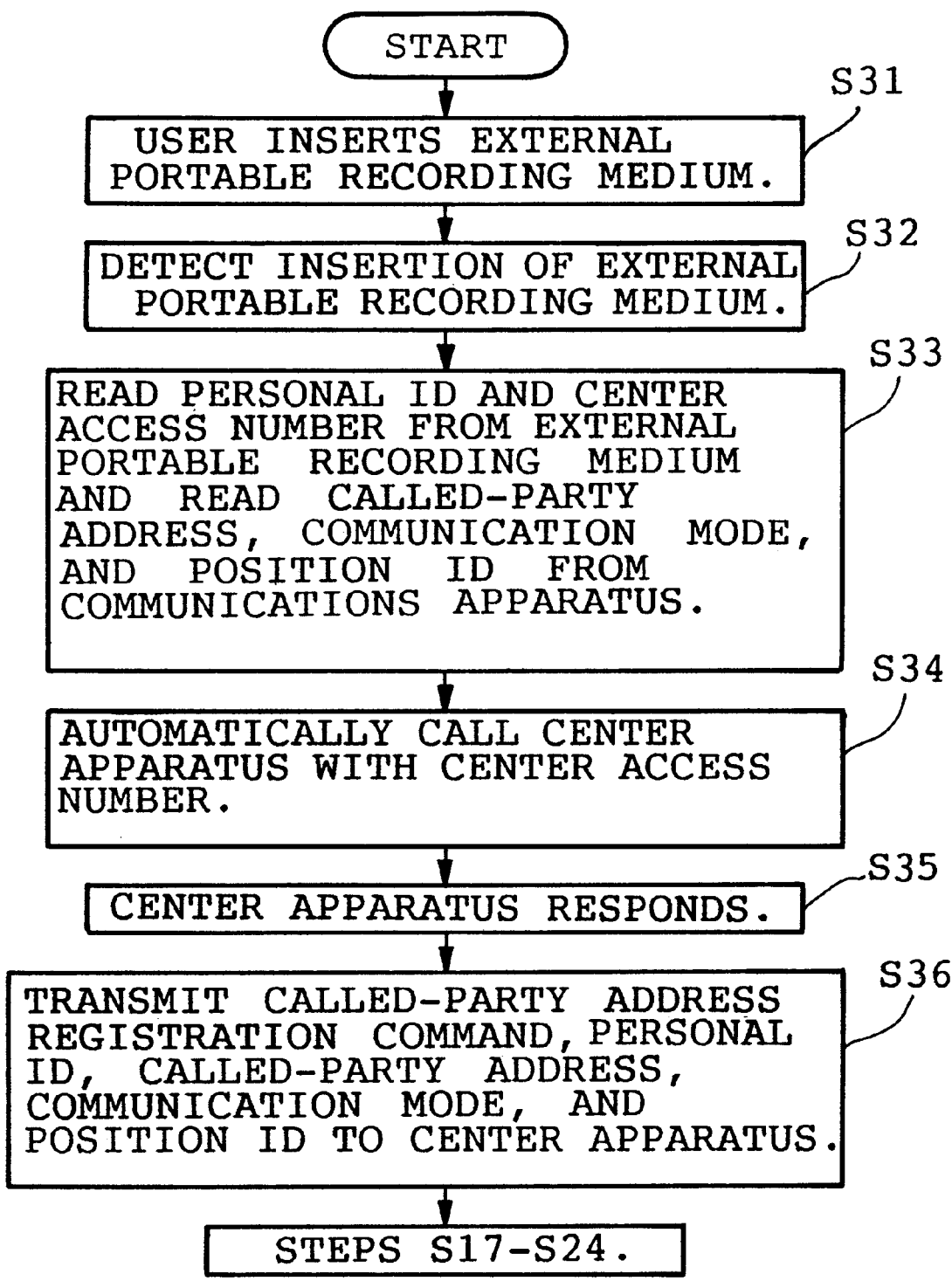
FIG. 6 shows an operation flow of the communications system of FIG. 5.

FIG. 6 shows an operation flow of this communications system. A user inserts the external portable recording medium 1b that stores a personal ID and a center access number into the communications apparatus 2b (step S31). Upon the insertion of the external portable recording medium 1b, in the communications apparatus 2b the external portable recording medium interface section 21 detects it and informs the control section 24b of the detection (step S32). Upon the detection of the insertion, the control section 24b reads the personal ID from the personal ID storing section 11 of the external portable recording medium 1, and also reads the center access number from its center access number storing section 12. The control section 24b also reads a called-party address, a communication mode, and a position ID from the terminal identification information storing section 26a of the communications apparatus 2b (step S33). Subsequently, the control section 24b automatically calls the center apparatus 4a with the readout center access number via the line interface section 25 (step S34). When the center apparatus 4a has responded, the control section 24b transmits a called-party address registration command, the personal ID, the called-party address, the communication mode, and the position ID to the center apparatus 4a via the line interface section 25 (step S36). Subsequently, operations equivalent to steps S17 onward (see FIGS. 4A and 4B) are performed.

Figure 7:
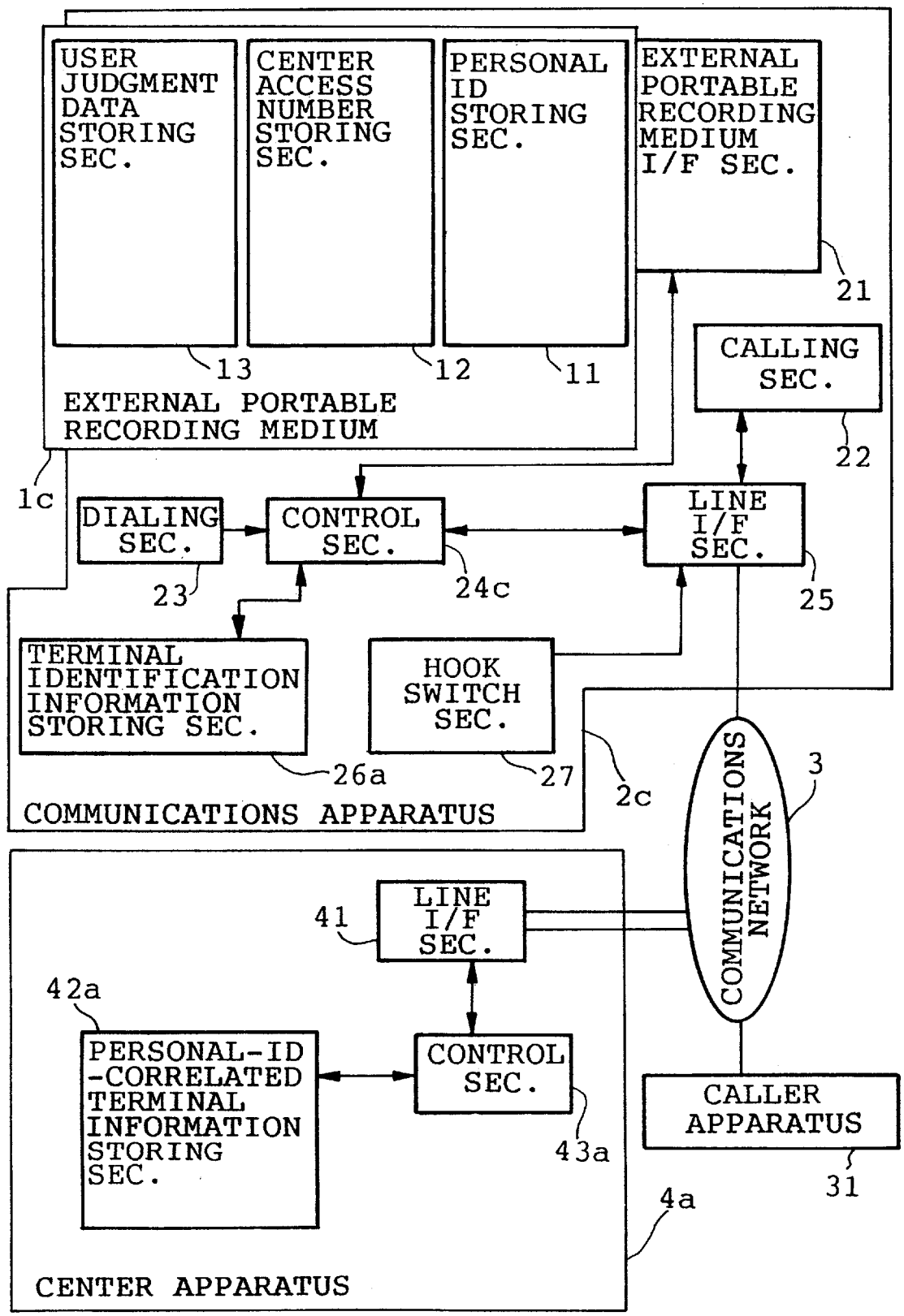
FIG. 7 is a block diagram showing the configuration of a communications system according to a fourth embodiment of the invention.

FIG. 7 is a block diagram showing the configuration of a fourth embodiment of the invention. This embodiment is different from the third embodiment in that a communications apparatus 2c judges of the legitimacy of a user through processing with an external portable recording medium 1c that is inserted in an external portable recording medium interface section 21 by using user judgment data that is stored in the external portable recording medium 1c and a code number that is input by the user. That is, the external portable recording medium 1c has a user judgment data storing section 13 for storing a code number to be used for judging of a user. The control section 24c of communications apparatus 2c sends a code number that is input through a dialing section 23 to the user judgment data storing section 13, and judges of the legitimacy of the user by judging the correctness of the input code number based on information that is returned from the user judgment data storing section 13.

Figure 8:
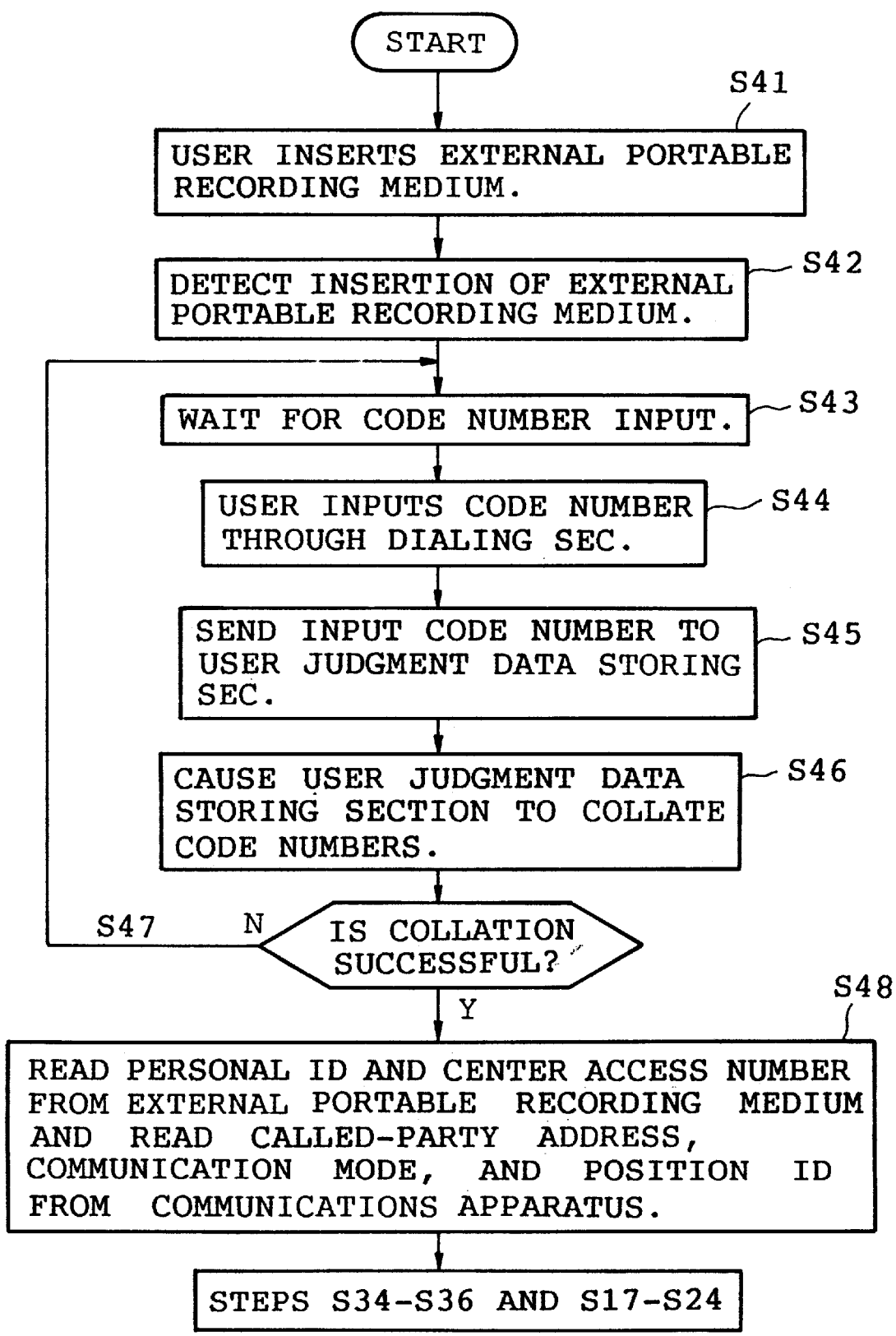
FIG. 8 shows an operation flow of the communications system of FIG. 7.

FIG. 8 shows an operation flow of this communications system. A user inserts the external portable recording medium 1c that has the personal ID storing section 11, the center access number storing section 12, and the user judgment data storing section 13 into the communications apparatus 2c (step S41). Upon the insertion of the external portable recording medium 1c, in the communications apparatus 2c the external portable recording medium interface section 21 detects it and informs the control section 24c of the detection (step S42). Upon the detection of the insertion, the control section 24c makes a transition to a state of waiting for code number input (step S43). When the user inputs a code number through the dialing section 23 (step S44), the input code number is sent to the user judgment data storing section 13 of the external portable recording medium 1c through the control section 24c (step S45). The user judgment data storing section 13 collates the stored code number with the input code number (step S46). If they do not coincide with each other, the user judgment data storing section 13 sends non-coincidence-indicative information to the control section 24c, which again makes a transition to a state of waiting for code number input (step S47). If they coincide with each other, the user judgment data storing section 13 sends coincidence-indicative information to the control section 24c. Then, the control section 24c reads a personal ID from the personal ID storing section 11 of the external portable recording medium 1c, and also reads a center access number from its center access number storing section 12. The control section 24c also reads a called-party address, a communication mode, and a position ID from the terminal identification information storing section 26a of the communications apparatus 2c (step S48). Subsequently, operations equivalent to steps S34 onward (see FIG. 6) are performed.

Figure 9:
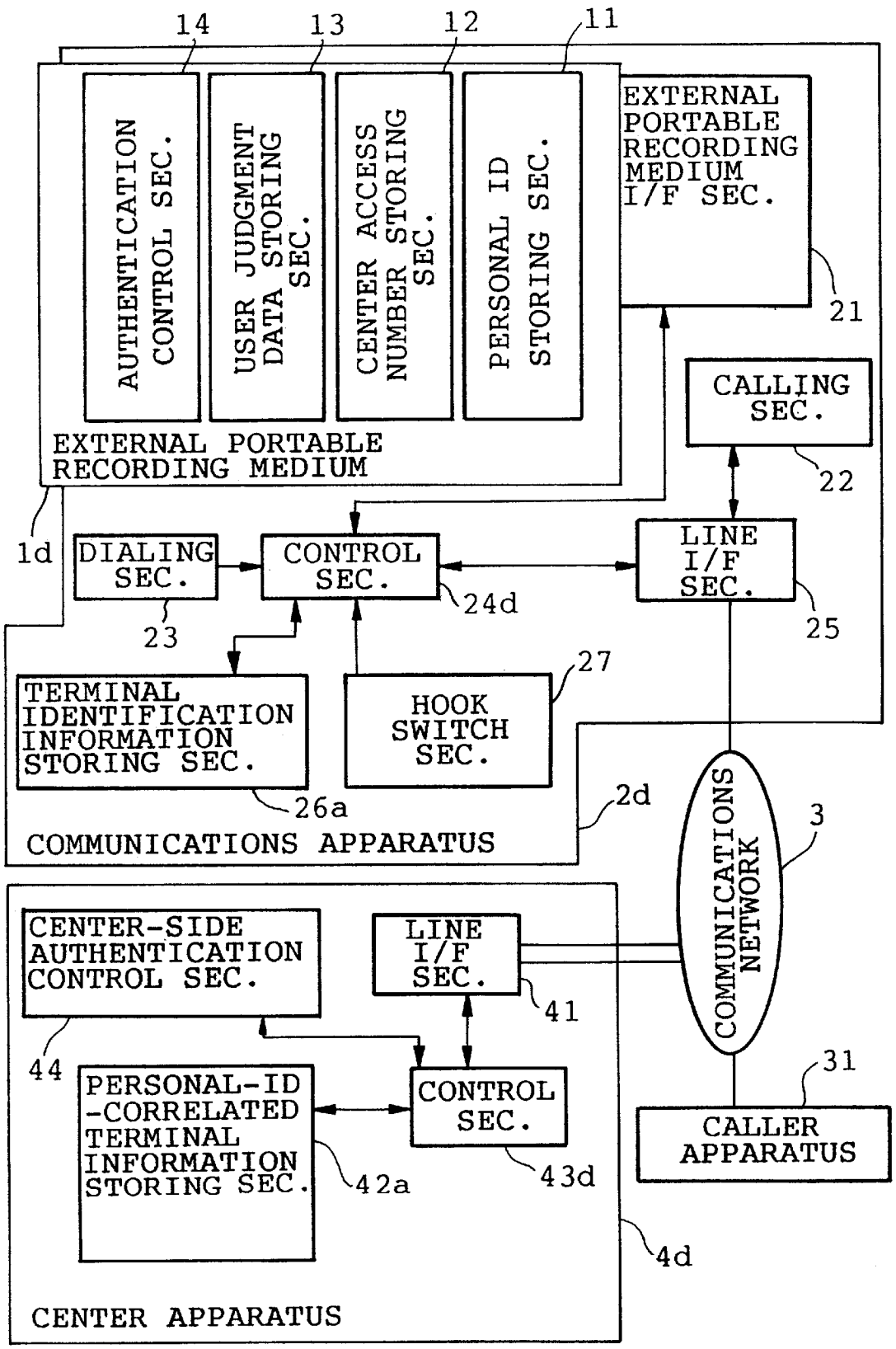
FIG. 9 is a block diagram showing the configuration of a communications system according to a fifth embodiment of the invention.

FIG. 9 is a block diagram showing the configuration of a fifth embodiment of the invention. This embodiment is different from the fourth embodiment in that when a communications apparatus 2d reads a center access number from an external portable recording medium 1d that is inserted in its external portable recording medium interface section 21 and automatically accesses a center apparatus 4d, the center apparatus 4d judges of the legitimacy of the external portable recording medium 1d through processing with the external portable recording medium 1c that is inserted in the accessing communications apparatus 2d. That is, the external portable communications apparatus 1d has an authentication control section 14, and the center apparatus 4d has a center-side authentication control section 44. The authentication control sections 14 and 44 cooperatively performs authentication. The control section 43d of the center apparatus 4d performs control to inform the communications apparatus 2d of a result of authentication performed by the center-side authentication control section 44. When code number collation has ended legitimately at the time of insertion of the external portable recording medium 4d, the control section 24d of the communications apparatus 2d automatically calls the center apparatus 4d by using a center access number that is read from the center access number storing section 12 of the external portable recording medium 1d, and controls signal exchange that is performed for judgment of the legitimacy of the external portable recording medium 1d between the authentication control section 14 of the external portable recording medium 1d and the center-side authentication control section 44 of the center apparatus 4d.

Figure 10A:
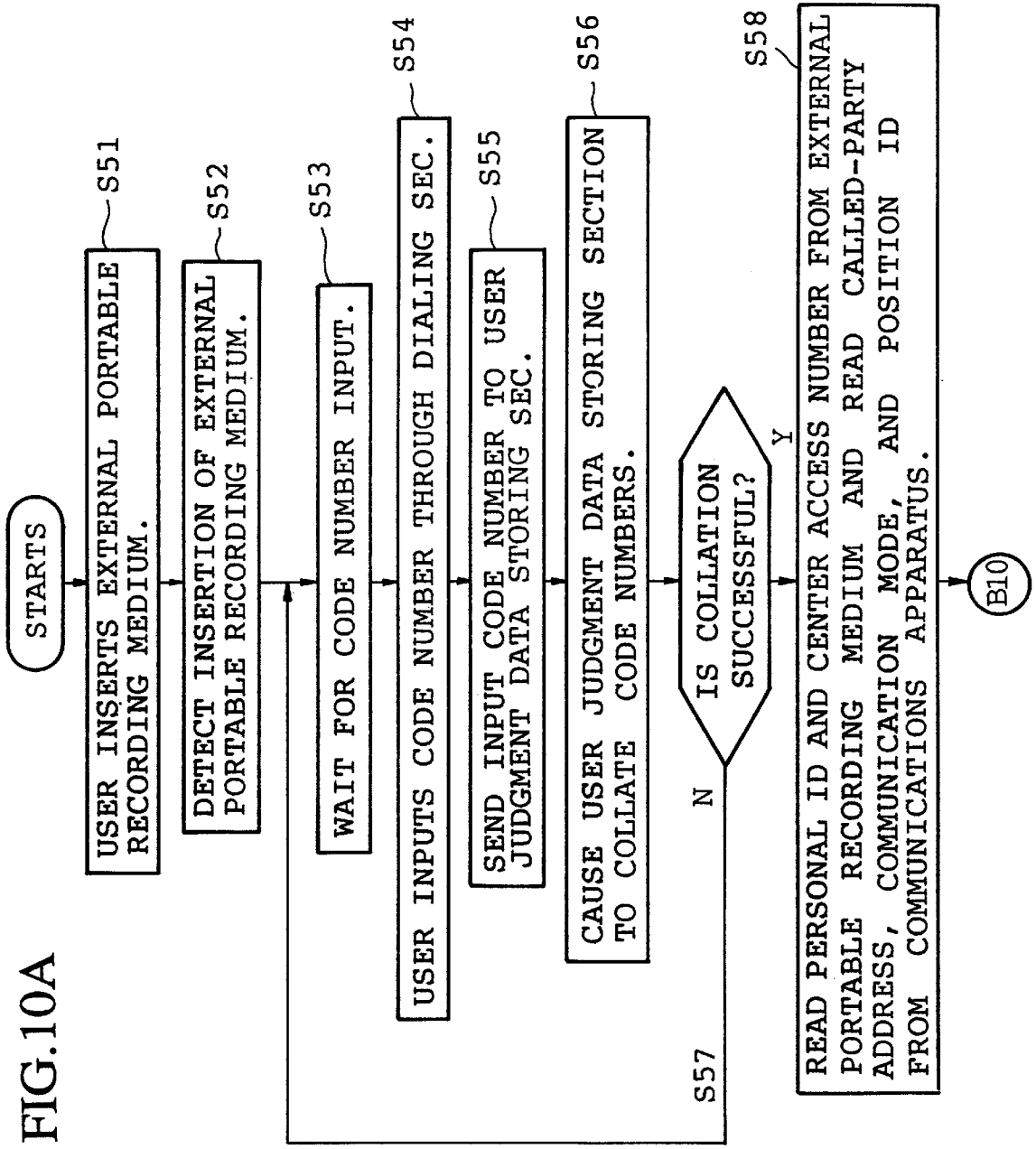

FIGS. 10A and 10B show an operation flow of this communications system. A user inserts the external portable recording medium 1d that has the personal ID storing section 11, the center access number storing section 12, the user judgment data storing section 13, and the authentication control section 14 into the communications apparatus 2c (step S51). Upon the insertion of the external portable recording medium 1d, in the communications apparatus 2d the external portable recording medium interface section 21 detects it and informs the control section 24d of the detection (step S52). Upon the detection of the insertion, the control section 24d makes a transition to a state of waiting for code number input (step S53). When the user inputs a code number through the dialing section 23 (step S54), the input code number is sent to the user judgment data storing section 13 of the external portable recording medium 1d through the control section 24d (step S55). The user judgment data storing section 13 collates the stored code number with the input code number (step S56). If they do not coincide with each other, the user judgment data storing section 13 sends non-coincidence-indicative information to the control section 24d, which again makes a transition to a state of waiting for code number input (step S57). If they coincide with each other, the user judgment data storing section 13 sends coincidence-indicative information to the control section 24d. Then, the control section 24d reads a personal ID from the personal ID storing section 11 of the external portable recording medium 1d, and also reads a center access number from its center access number storing section 12. The control section 24d also reads a called-party address, a communication mode, and a position ID from the terminal identification information storing section 26a of the communications apparatus 2d (step S58). The control section 24d automatically calls the center apparatus 4d via the line interface section 25 by using the readout center access number (step S59). When the center apparatus 4d has responded (step S60), the control section 24d causes the authentication control section 14 of the external portable recording medium 1d and the center-side authentication control section 44 of the center apparatus 4d to perform an authentication operation (step S61).

When the authentication operation has ended normally, the center-side authentication control section 44 informs the control section 43d of the normal completion of the authentication operation (step S62). The control section 43d informs the control section 24d of the communications apparatus 2d that the external portable recording medium 1d is legitimate (step S63). In response, the control section 24d transmits a called-party address registration command, the personal ID, the called-party address, the apparatus type, the communication mode, and the position ID to the center apparatus 4d via the line interface section 25 (step S64). Subsequently, operations equivalent to steps S17 onward (see FIGS. 4A and 4B) are performed.

When the authentication operation has not ended normally, the center-side authentication control section 44 informs the control section 43d of abnormal completion of the authentication operation (step S65). The control section 43d informs the control section 24d of the communications apparatus 2d of a failure of authentication (step S66). In response, the control section 24d makes a transition to an error state (step S67).

Figure 11:
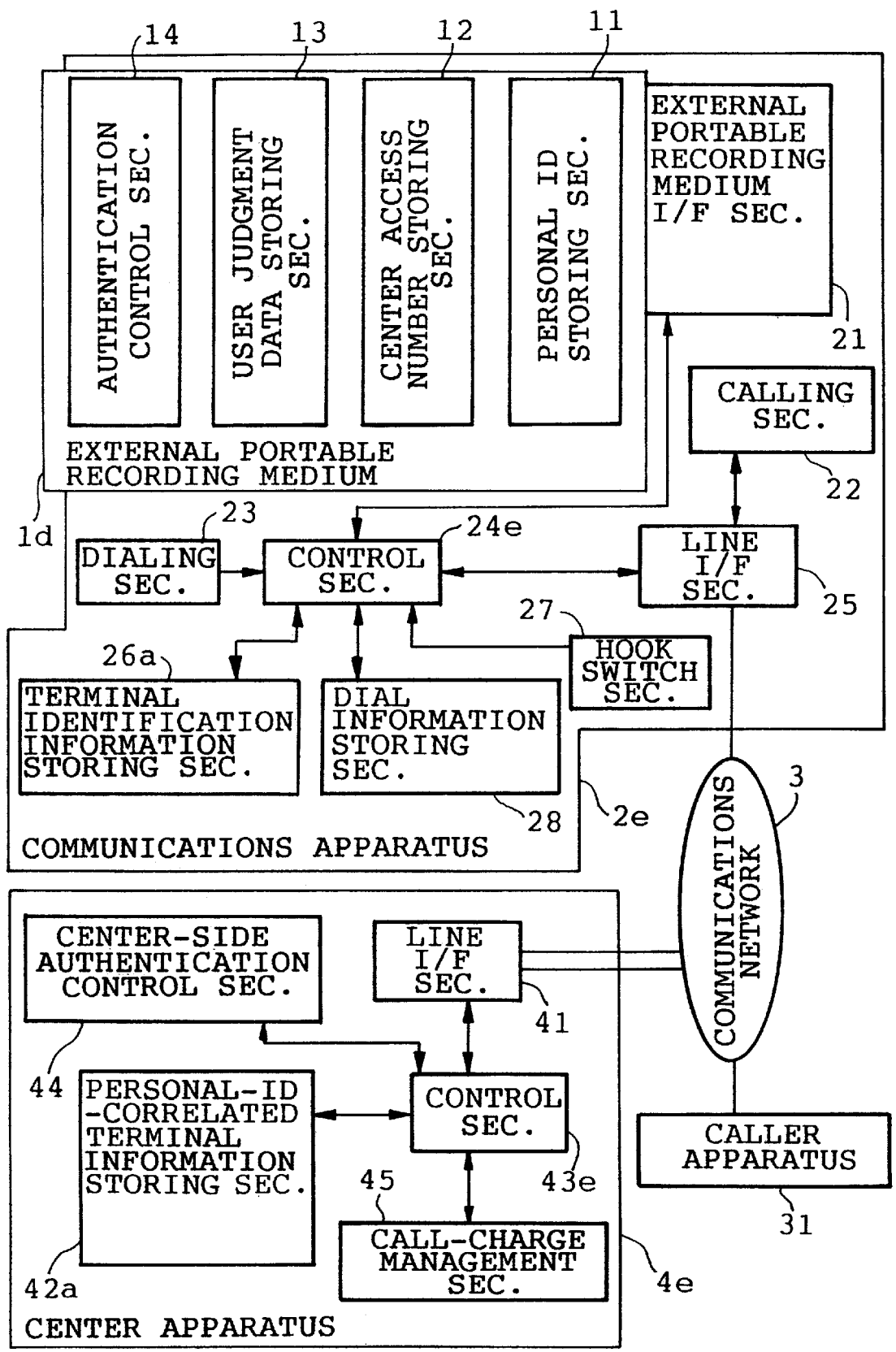
FIG. 11 is a block diagram showing the configuration of a communications system according to a sixth embodiment of the invention.

FIG. 11 is a block diagram showing a sixth embodiment of the invention. This embodiment is different from the fifth embodiment in that a communications apparatus 2e transmits, to a center apparatus 4e, information of a party whom a user wants to call, together with a transfer call command and a personal ID, and that effects a transfer call based on the received transfer call command and the called-party information and conducts call-charge management by storing call records so that they are correlated with the personal ID. In this embodiment, dial information that is input in a state that an external portable recording medium 1d is inserted in the external portable recording medium interface section 21 is made called-party information. That is, the communications apparatus 2e has a dial information storing section 28 for storing input dial information. When an off-hook operation is performed after the input of dial information, the control section 24e reads a center access number from the external portable recording medium 1d being inserted in the external portable medium interface section 21 and automatically accesses the center apparatus 4e.

The dial information storing section 28 stores dial information that is input in a waiting state with the external portable recording medium 1d inserted therein. When an off-hook operation is performed after the above input of the dial information, the control section 24e automatically calls the center apparatus 4e by using a center access number stored in the center access number storing section 12 of the external portable recording medium 1d. When the center apparatus 4e has responded, the control section 24e transmits, to the center apparatus 4e, a transfer call command, a personal ID that is stored in the personal ID storing section 11 of the inserted external portable recording medium 1d, and the dial information stored in the dial information storing section 28. The call-charge management section 45 of the center apparatus 4e conducts call-charge management by storing call records so that they are correlated with the personal ID. The control section 43e effects transfer calling with the received dial information based on the transfer call command, the personal ID, and the dial information which have been received from the communications apparatus 2e, and controls, for the received personal ID, the call records management and the call-charge management of transfer calls.

Figure 12:
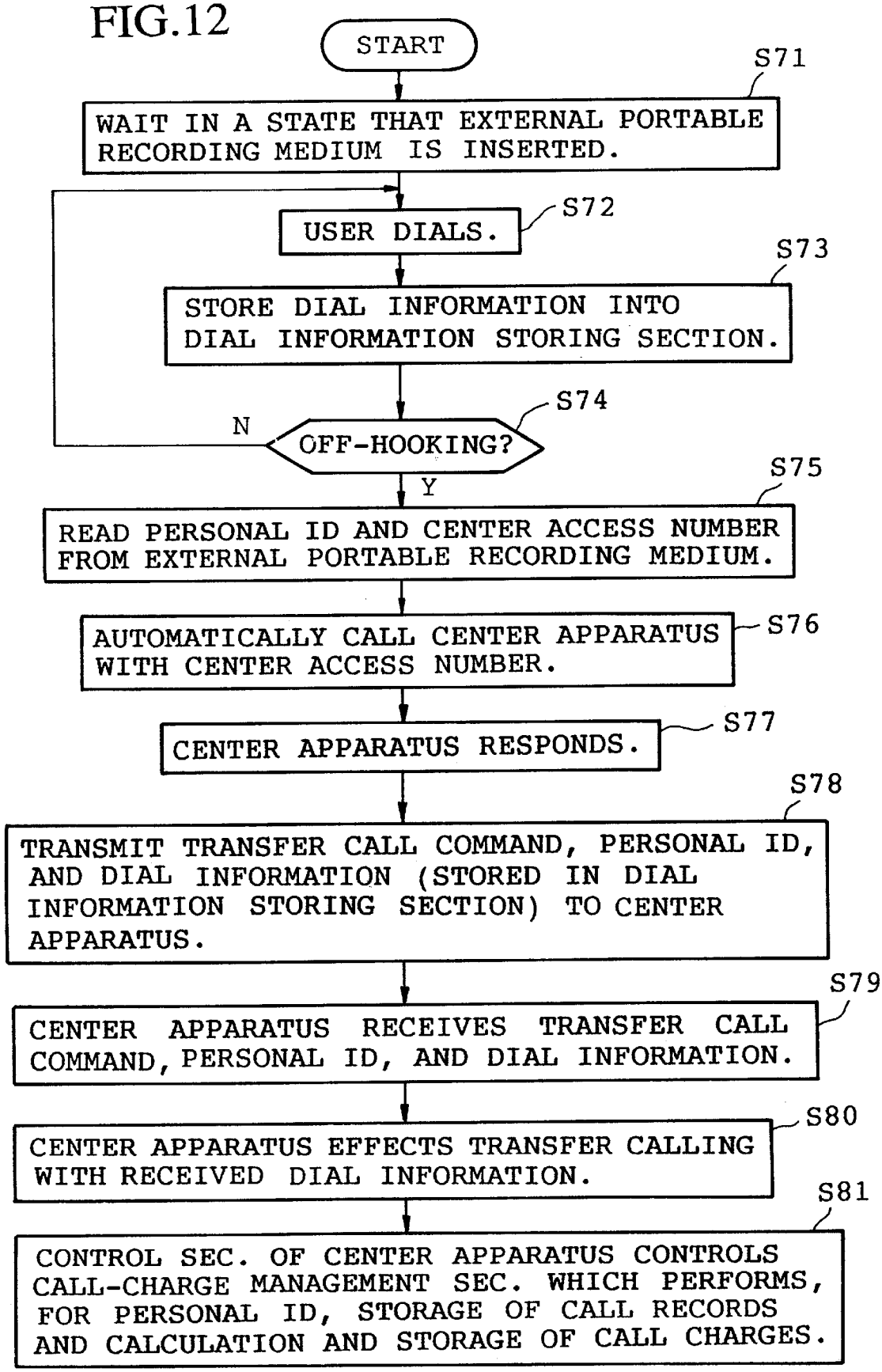
FIG. 12 shows an operation flow of the communications system of FIG. 11.

FIG. 12 shows an operation flow of this communications system. In a state that the communications apparatus 2e is in a waiting state with the external portable recording medium 1d inserted therein (step S71), when a user inputs a number of a transfer call destination through the dialing section 23 (step S72), the control section 24e stores the input dial information into the dial information storing section 28 (step S73). After completion of the dial input, the user performs an off-hook operation on the off-hook section 27 (step S74). When detecting the off-hook operation, the control section 24e reads a personal ID from the personal ID storing section 11 of the external portable recording medium 1d and also reads a center access number from its center access number storing section 12 (step S75). The control section 24e then automatically calls the center apparatus 4e via the line interface section 25 by using the readout center access number (step S76). When the center apparatus 4e has responded (step S77), the control section 24e transmits a transfer call command for initiating a transfer call, the personal ID, and the dial information that is stored in the dial information storing section 28 to the center apparatus 4e via the line interface section 25 (step S78). The control section 43e of the center apparatus 4e effects transfer calling via the line interface section 41 by using the received dial information (step S80). Further, the control section 43e controls the call-charge management section 45 to manage, for the personal ID, call records that include a date, a destination, and a period of the transfer call and calculation of a call charge (step S81).

Figure 13:
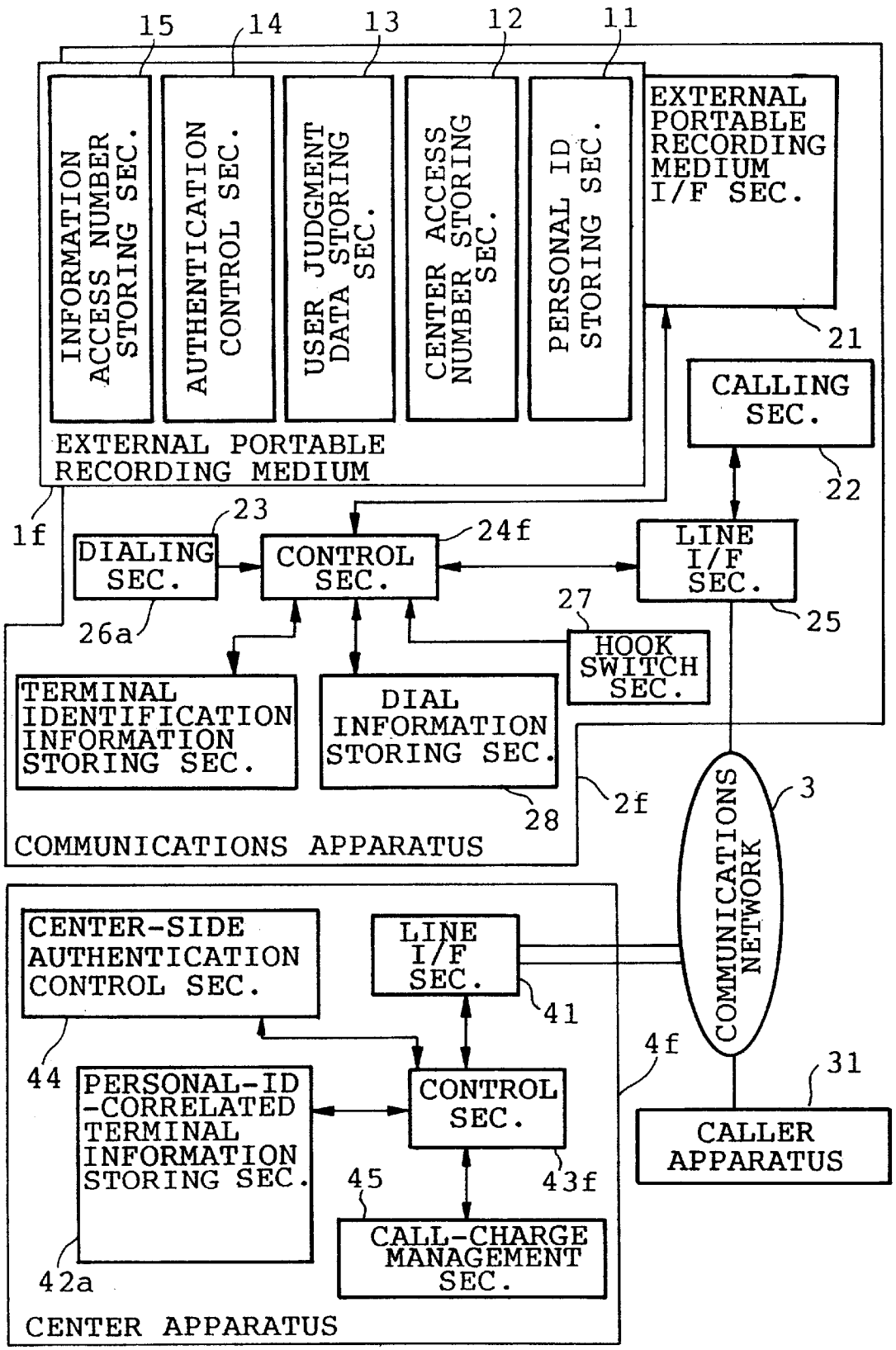
FIG. 13 is a block diagram showing the configuration of a communications system according to a seventh embodiment of the invention.

FIG. 13 is a block diagram showing the configuration of a seventh embodiment of the invention. This embodiment is different from the sixth embodiment in that a communications apparatus 2f automatically accesses a center apparatus 4f by reading a center access number from an external portable recording medium 1f being inserted in an external portable recording medium recording medium interface section 21 in response to an off-hook operation that is performed without any preceding dial input operation in a state that the external portable recording medium 1f is inserted in the external portable recording medium interface section 21, and that the communications apparatus 2f transmits, to the center apparatus 4f, an information access number that is read from the external portable recording medium 1f as called-party information. For example, the information access number of a number of an information center, which is different from the center apparatus 4f.

That is, the external portable recording medium 1f has an information access number storing section 15 for storing an information access number. When an off-hook operation is performed without any preceding dial input operation in the communications apparatus 2f that is in a waiting state with the external portable recording medium 1f inserted therein, a control section 24f of the communications apparatus 2f automatically calls the center apparatus 4f with a center access number stored in the center access number storing section 12 of the external portable recording medium 1f. When the center apparatus 4f has responded, the control section 24f transmits, to the center apparatus 4f, a transfer call command, a personal ID that is stored in the personal ID storing section 11 of the inserted external portable recording medium 1f, and an information access number that is stored in the information access number storing section 15 of the external portable recording medium 1f. A control section 43f of the center apparatus 4f effects transfer calling with the received information access number based on the received transfer call command, personal ID, and information access number, and controls, for the received personal ID, call records and call-charge management of the transfer call.

Figure 14:
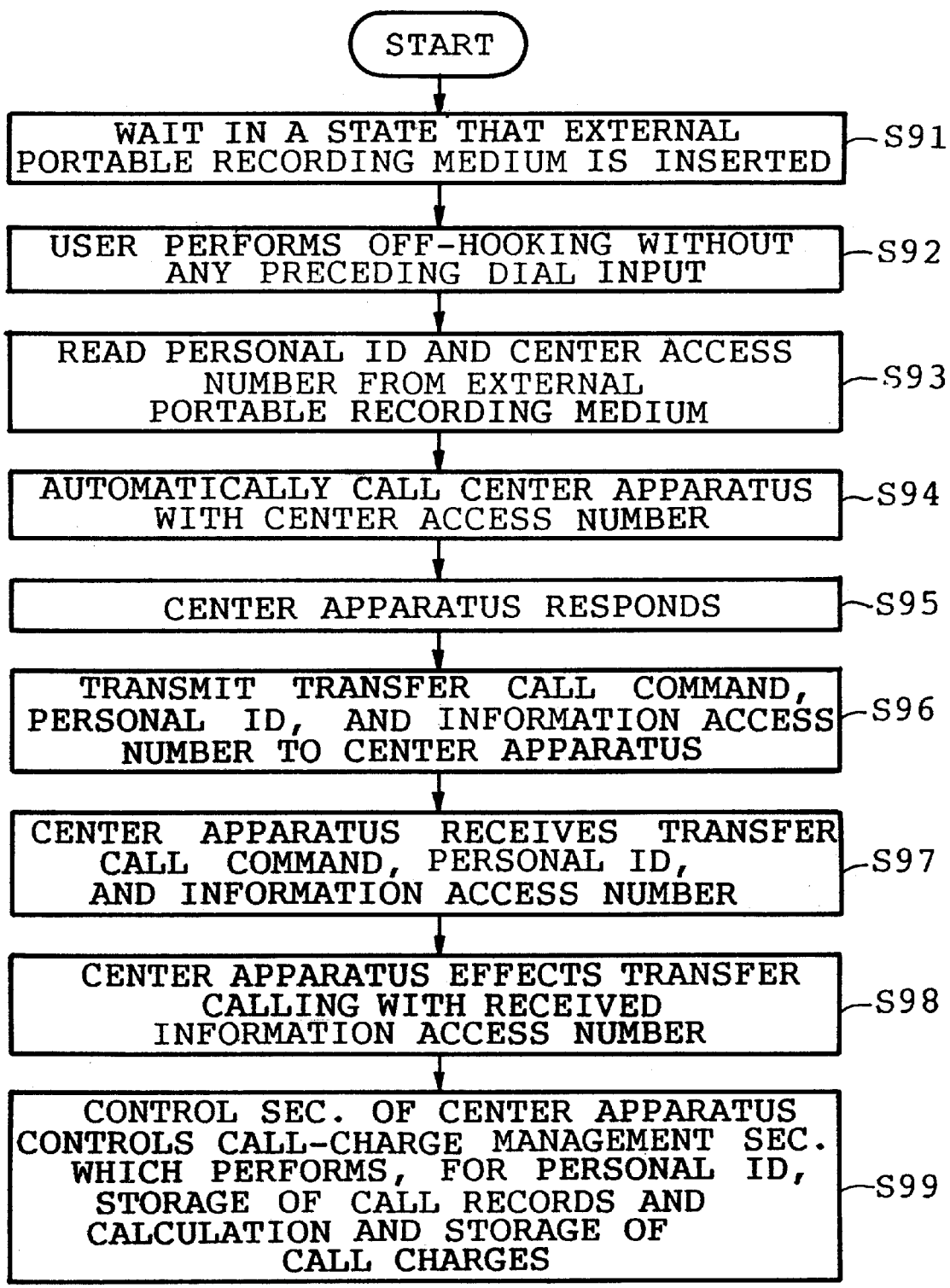
FIG. 14 shows an operation flow of the communications system of FIG. 13.

FIG. 14 shows an operation flow of this communications system. In a state that the communications apparatus 2f is in a waiting state with the external portable recording medium 1f inserted therein (step S91), when a user performs an off-hook operation on the off-hook section 27 without any preceding dial input (step S92), the control section 24f detects the off-hooking operation and reads a personal ID from the personal ID storing section 11 of the external portable recording medium 1f and also reads a center access number from its center access number storing section 12 (step 893). The control section 24f then automatically calls the center apparatus 4f via the line interface section 25 by using the readout center access number (step S94). When the center apparatus 4f has responded (step S95), the control section 24f transmits a transfer call command for initiating a transfer call, the personal ID, and the information access number to the center apparatus 4f via the line interface section 25 (step S96). The center apparatus 4f receives the transfer call command, the personal ID, and the information access number via the line interface section 41 (step S97). The control section 43f of the center apparatus 4f effects transfer calling via the line interface section 41 by using the received dial information (step S98). Further, the control section 43f controls the call-charge management section 45 to manage, for the personal ID, call records that include a date, a destination, and a period of the transfer call and calculation of a call charge (step S99).

Figure 15:
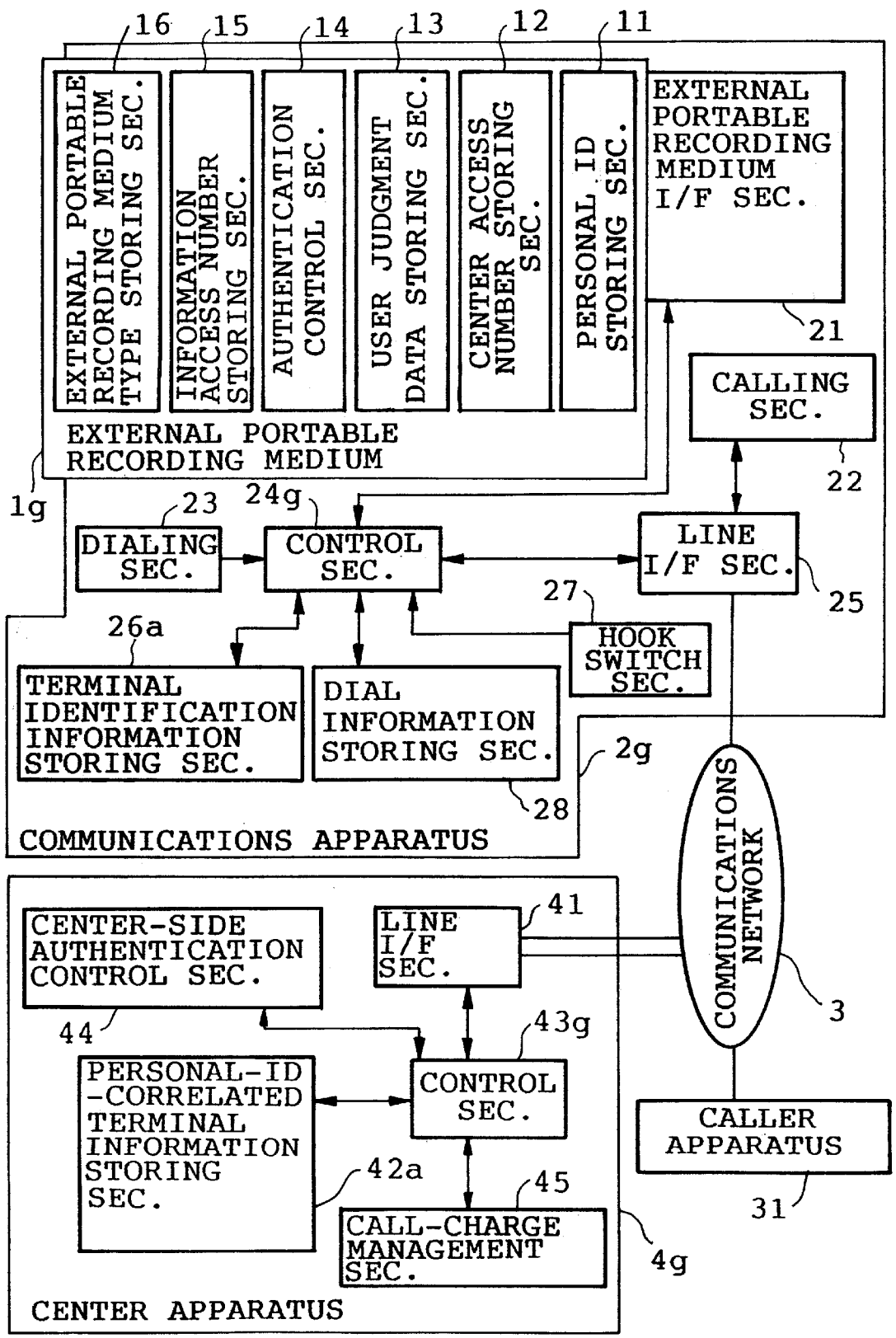
FIG. 15 is a block diagram showing the configuration of a communications system according to an eighth embodiment of the invention.

FIG. 15 is a block diagram showing the configuration of an eighth embodiment of the invention. This embodiment is different from the seventh embodiment in that a communications apparatus 2g judges whether an external portable recording medium 1g is one for information access. That is, the external portable recording medium 1g has an external portable recording medium type storing section 16. When the external portable recording medium 1g is inserted, a control section 24g of the communications apparatus 2g reads an external portable recording medium type from the external portable recording medium type storing section 16. If the external portable recording medium 1g is one for information access, the control section 24g automatically calls the center apparatus 4g by using a center access number stored in the center access number storing section 12 of the external portable recording medium 1g. When the center apparatus 4g has responded, the control section 24g transmits, to the center apparatus 4g, a transfer call command, a personal ID that is stored in the personal ID storing section 11 of the inserted external portable recording medium 1g, and the information access number stored in the information access number storing section 15.

Figure 16:
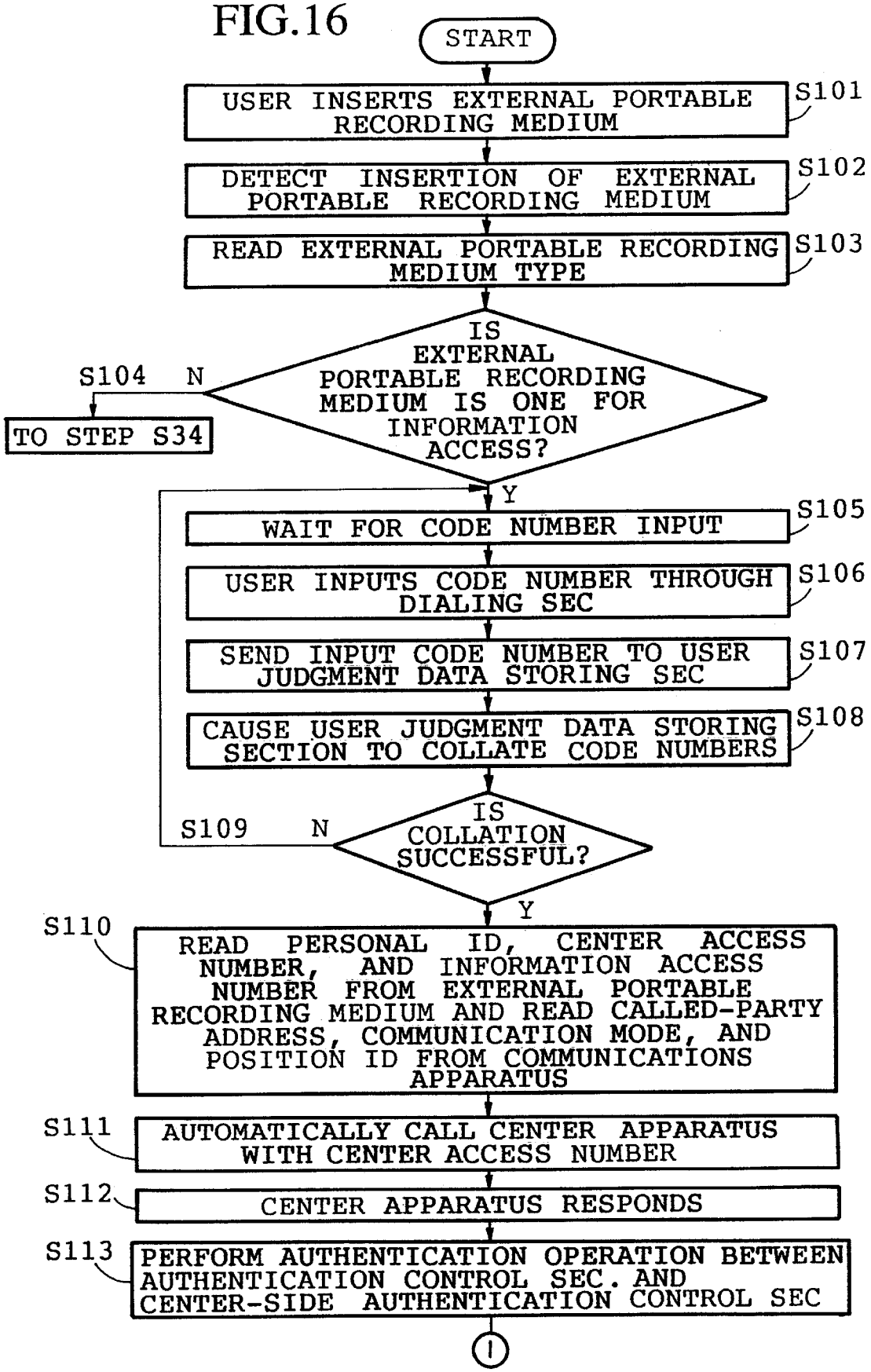
FIGS. 16 and 17 show an operation flow of the communications system of FIG. 15.
Figure 17:
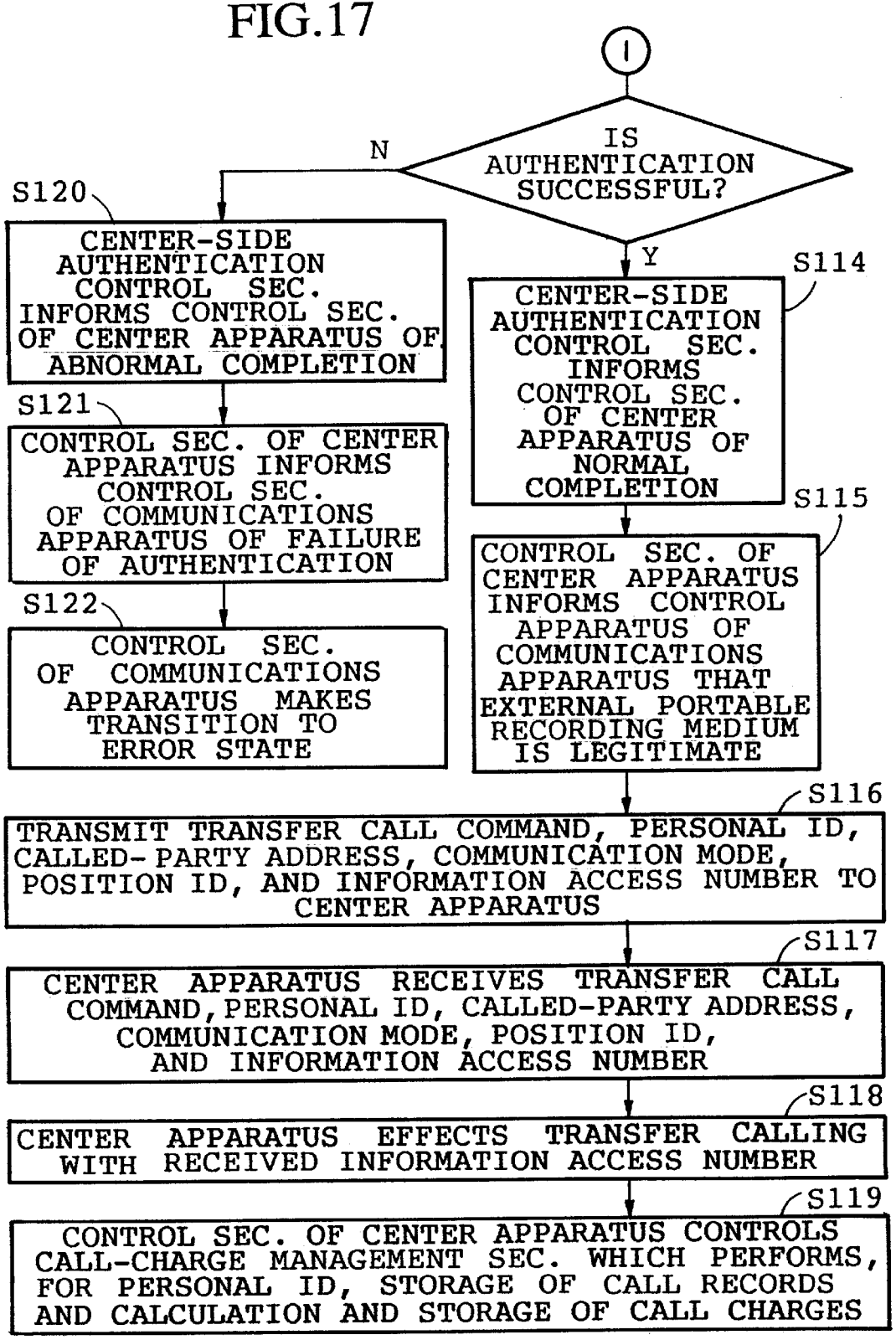

FIGS. 16 and 17 show an operation flow of this communications system.

A user inserts the external portable recording medium 1g that has the personal ID storing section 11, the center access number storing section 12, the user judgment data storing section 13, the authentication control section 14, and the information access number storing section 15 into the communications apparatus 2g (step S101). Upon the insertion of the external portable recording medium 1g, in the communications apparatus 2g the external portable recording medium interface section 21 detects it and informs the control section 24g of the detection (step S102). Upon the detection of the insertion, the control section 24g reads an external portable recording medium type from the external portable recording medium type storing section 16 of the external portable recording section 1g (step S103) If the external portable recording medium type indicates that the external portable recording medium 1g is not one for information access, the control operation of the control section 24g goes to step S34 onward (step S104). If the external portable recording medium type indicates that the external portable recording medium is for information access, the control section 24g makes a transition to a state of waiting for code number input (step S105). When the user inputs a code number through the dialing section 23 (step S106), the input code number is sent to the user judgment data storing section 13 of the external portable recording medium 1g through the control section 24g (step S107). The user judgment data storing section 13 collates the stored code number with the input code number (step S108). If they do not coincide with each other, the user judgment data storing section 13 sends non-coincidence-indicative information to the control section 24g, which again makes a transition to a state of waiting for code number input (step S109). If they coincide with each other, the user judgment data storing section 13 sends coincidence-indicative information to the control section 24g. Then, the control section 24g reads a personal ID from the personal ID storing section 11 of the external portable recording medium 1g, and also reads a center access number from its center access number storing section 12. The control section 24g also reads a called-party address, a communication mode, and a position ID from the terminal identification information storing section 26a of the communications apparatus 2g (step S110). The control section 24g automatically calls the center apparatus 4g via the line interface section 25 by using the readout center access number (step S111). When the center apparatus 4g has responded (step S112), the control section 24g causes the authentication control section 14 of the external portable recording medium 1g and the center-side authentication control section 44 of the center apparatus 4g to perform an authentication operation (step S113).

When the authentication operation has ended normally, the center-side authentication control section 44 informs the control section 43g of the normal completion of the authentication operation (step S114). The control section 43g informs the control section 24g of the communications apparatus 2g that the external portable recording medium 1g is legitimate (step S115). In response, the control section 24g transmits a transfer call command for initiating a transfer call, the personal ID, the called-party address, the communication mode, the position ID, and the information access number to the center apparatus 4g via the line interface section 25 (step S116). The center apparatus 4g receives the transfer call command, the personal ID, the called-party address, the communication mode, the position ID, and the information access number via the line interface section 41 (step S117). The control section 43g effects transfer calling via the line interface section 41 by using the received information access number (step S118). Further, the control section 43g controls the call-charge management section 45 to manage, for the personal ID, call records that include a date, a destination, and a period of the transfer call and calculation of a call charge (step S119).

When the authentication operation has not ended normally, the center-side authentication control section 44 informs the control section 43g of abnormal completion of the authentication operation (step S120). The control section 43g informs the control section 24g of the communications apparatus 2d of a failure of authentication (step S121). In response, the control section 24g makes a transition to an error state (step S112).

As described above, in the communications systems according to the first to eighth embodiments, the terminal identification information is stored in the center apparatus so as to be correlated with the personal ID, the center apparatus can manage the position of a user and the terminal identification information of a terminal apparatus being used by the user. Therefore, there can be realized a personal call transfer service, a personal position management service, personal call-charge management and call-records management with respect to a call from a communications apparatus in which an external portable recording medium is inserted, connection permission judgment using the terminal identification information of a communications apparatus, and other services. Thus, there can be realized more effective personal services and personal use of a communications apparatus in which an external portable recording medium is inserted.

Further, when the center apparatus has responded, a personal ID of the inserted external portable recording medium, a called-party address of the communications apparatus, or its position ID can be registered simply by insertion of the external portable recording medium into the transfer destination communications apparatus and input of a center access number. This eliminates the conventionally needed cumbersome manipulations of registering/canceling a call transfer service and registering/changing a transfer destination telephone number.

Further, unnecessary operations of an exchange and a communications apparatus can be avoided by informing, before a call transfer, a caller side that communication modes are different from each other. Where communication modes are compatible, mutual communication can be effected by informing the caller side of a mutual communication enabling communication mode.

The communication system is provided in which when the external portable recording medium is inserted in the communications apparatus, the communications apparatus automatically accesses the center apparatus, and when the center apparatus has responded, the communications apparatus transmits, to the center apparatus, a personal ID of the inserted external portable recording medium, and a called-party address, a communication mode, or a position ID of the communications apparatus which is stored in its terminal identification information storing section. In this case, a call transfer service can be registered simply by inserting the external portable recording medium into the transfer destination communications apparatus, thereby eliminating the conventionally needed cumbersome manipulations of registering/canceling a call transfer service and registering/changing a transfer destination telephone number.

Improved security can be obtained by judging the legitimacy of a user by processing that is performed between the external portable recording medium and the communications apparatus with the user's input of a code number at the time of insertion of the external portable recording medium.

In addition, a transfer calling service via the center apparatus can be registered from the communications apparatus, in which case call-records management and call-charge management for transfer calls can be controlled for each personal ID. In this case, it is also possible to allow access to an information guidance only by an off-hook operation during insertion of the external portable recording medium. By storing, in the external portable recording medium, information indicating whether it is for information access, it becomes possible to allow access to an information guidance via the center apparatus only by insertion of the external portable recording medium.

Figure 18A:
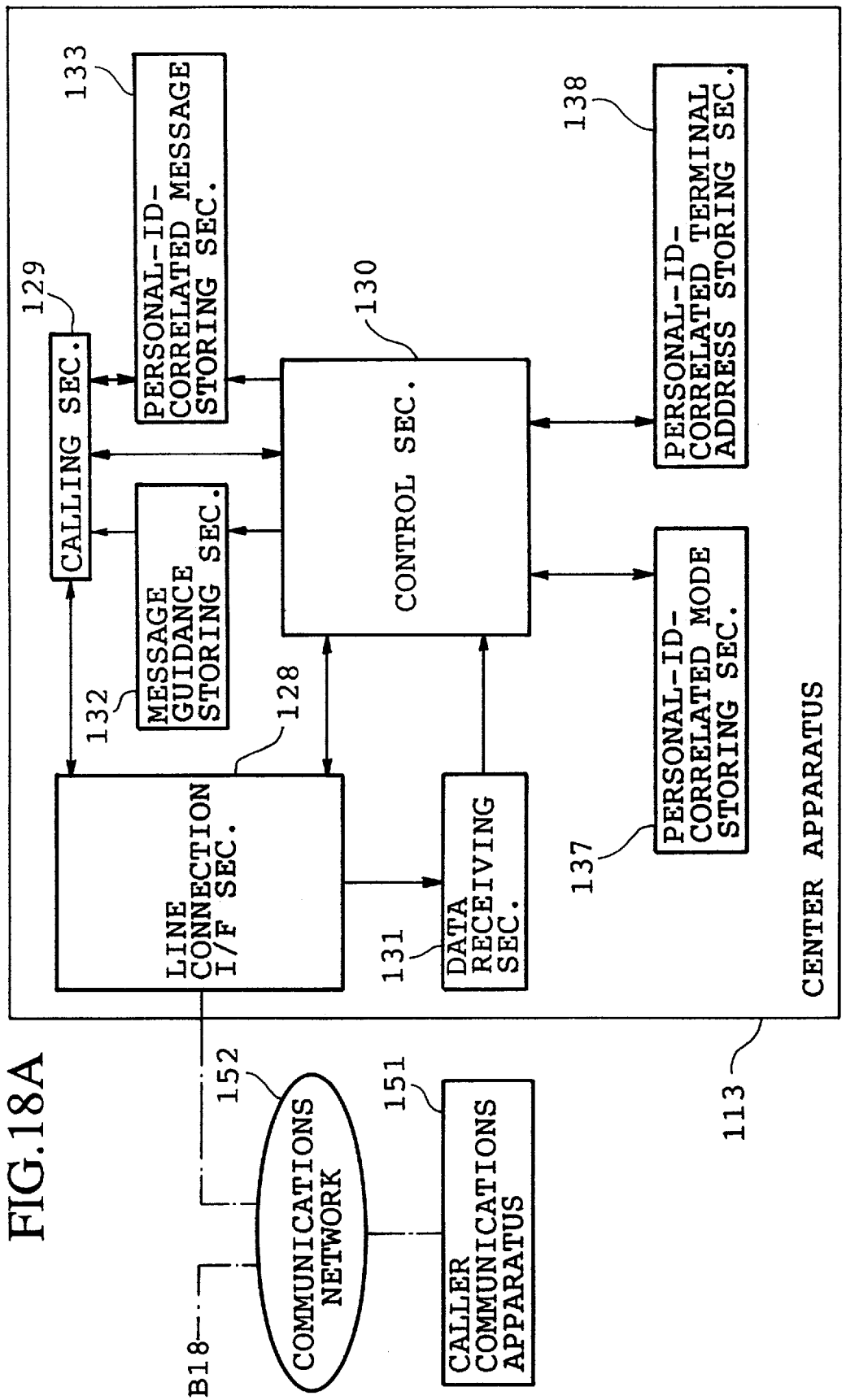
FIGS. 18A and 18B illustrate a block diagram showing the configuration of a communications system according to a ninth embodiment of the invention (FIG. 18B is connected to FIG. 18A through line B18)
Figure 18B:
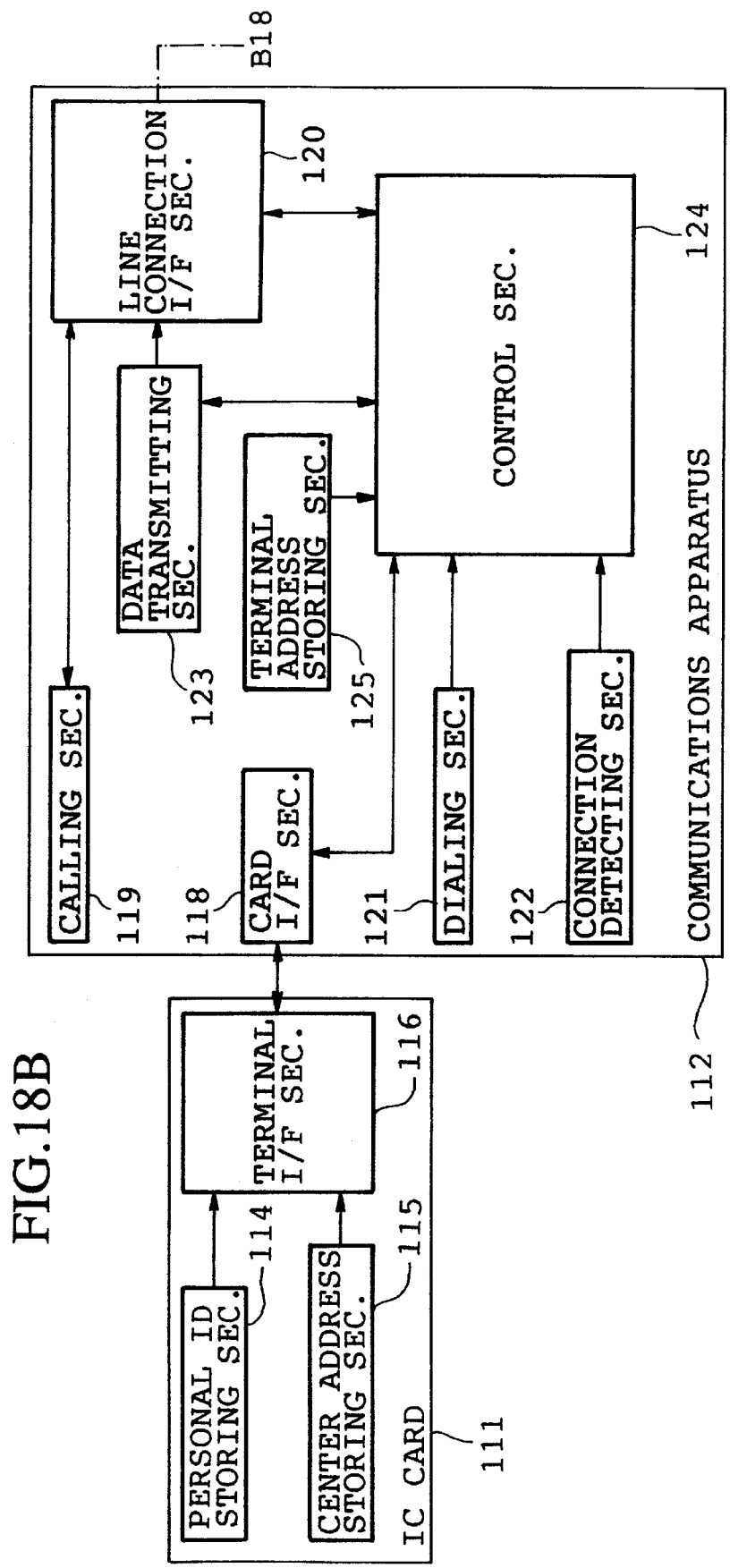

FIGS. 18A and 18B illustrate a block diagram showing a ninth embodiment of the invention. This communications system includes a communications apparatus 112 that is to be connected to a communications network 152, and a center apparatus 113 for managing communication of the communications apparatus 112. The communications apparatus 112 is so configured that a portable recording medium 111 can be inserted therein.

For example, the portable recording medium 111 is an IC card which has a personal ID storing section 114 for storing a personal ID, a center address storing section for storing a center access number of the center apparatus 113, and a terminal interface section 116 that is to be connected to the communications apparatus 112.

The communications apparatus 112 is equipped with a card interface section 118 to which the portable recording medium 111 is to be inserted, a calling section 119 for allowing a user to conduct a call, a line connection interface section 120 that is to be connected to the communications network 152, a dialing section 121 on which the user performs key input or dialing, a connection detecting section 122 for detecting connection of the portable recording medium 111, a data transmitting section 123 for transmitting data to the center apparatus 113, a control section 124 for controlling the communications apparatus 112, and a terminal address storing section 125 for storing a called-party address of the communications apparatus 112. When detecting connection of the portable recording medium 111, the control section 124 reads a center access number from the center address storing section 115, and automatically calls the center apparatus 113. When the center apparatus 113 has responded, the control section 124 activates the data transmitting section 123, and transmits, to the center apparatus 113, a personal ID that is stored in the personal ID storing section 114 of the portable recording medium 111, and a called-party address that is stored in the terminal address storing section 125 of the communications apparatus 112.

The center apparatus 113 is equipped with a line connection interface section 128 that is to be connected to the communications network 152, a calling section 129 for performing message guidance, and reception and reproduction of a message, a control section 130, a data receiving section 131 for receiving data that is transmitted from the communications apparatus 112, a message guidance storing section 132 for storing a message guidance that is to be transmitted to a caller in an absent mode, a personal-ID-correlated message storing section for storing, for each personal ID, a message that is input by a caller in an absent mode, a personal-ID-correlated mode storing section 137 for storing, for each personal ID, a current mode (present/absent) that is set by a mode switching operation at the communications apparatus 112, and a personal-ID-correlated terminal address storing section 138 for storing a personal ID and a called-party address of the communications apparatus 112 which are received by the data receiving section 131. When the center apparatus 118 receives a call directed to a telephone number that corresponds to a certain personal ID, the control section 130 reads a mode of that personal ID from the personal-ID-correlated mode storing section 137. If the readout mode is a present mode, the control section 130 reads a called-party address from the personal-ID-correlated terminal address storing section 138, forwards the call to the corresponding communications apparatus. If the readout mode is an absent mode, the control section 130 reads a message guidance from the message guidance storing section 132. The control section 130 transmits the message guidance to the caller, and records a message that has been input by the caller into the personal-ID-correlated message storing section 133. Further, when the portable recording medium 111 is connected to the communications apparatus and the center apparatus 113 is automatically called, the control section 130 automatically reproduces, based on the received personal ID, the message that is recorded in the personal-ID-correlated message storing section 133.

Figure 19:
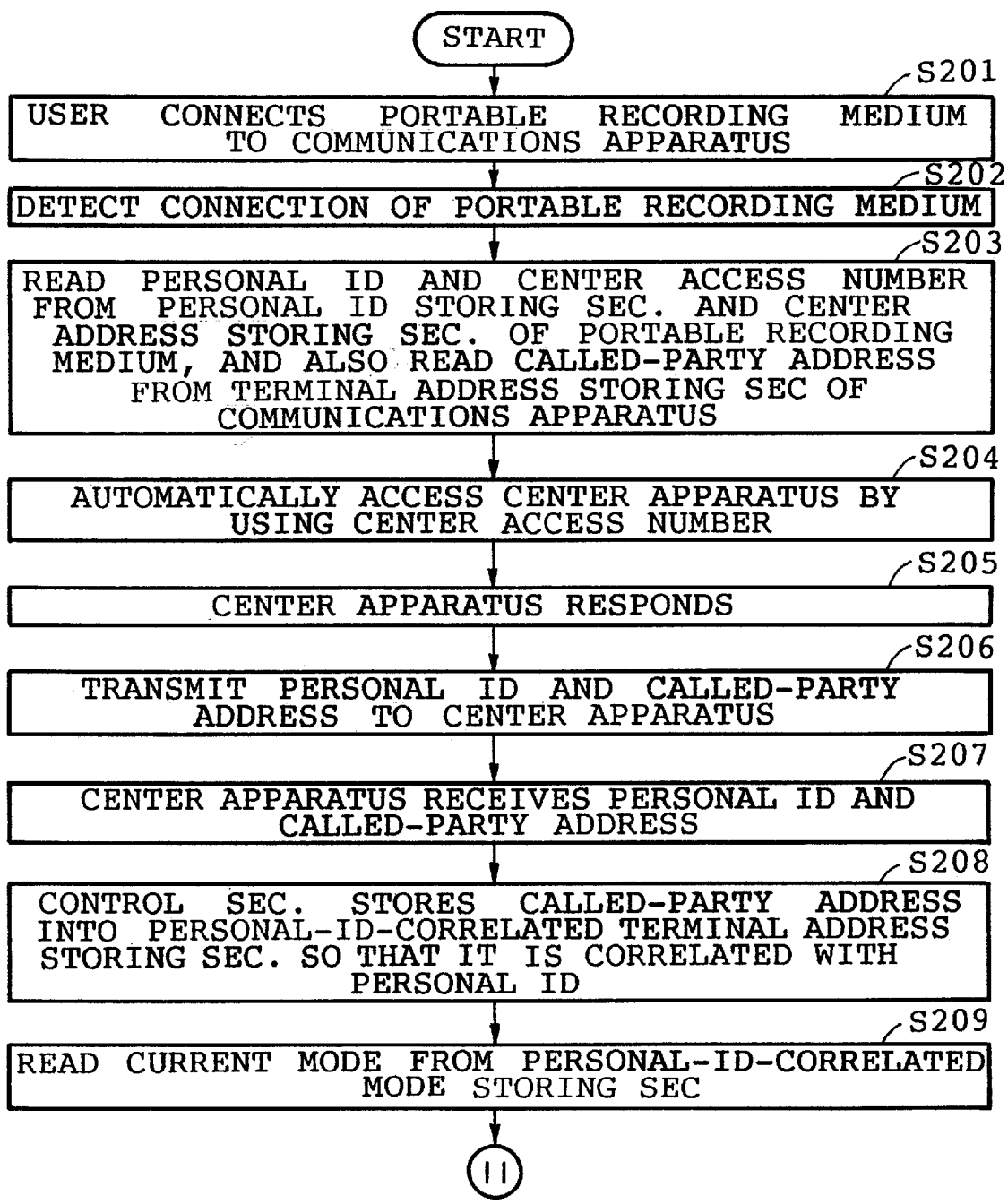

FIGS. 19 and 20 show an operation flow of the communications system of FIGS. 18A and 18B.

First, a user connects the portable recording medium 111 that stores a personal ID and a center access number to the communications apparatus 112 (step S201). In response, in the communications apparatus 112, the connection detecting section 122 detects the connection and informs the control section 124 of the detection (step S202). Upon the detection of the connection, the control section 124 reads the personal ID and the center access number from the personal ID storing section 114 and the center address storing section 115 of the portable recording medium 111. The control section 124 also reads a called-party address from the terminal address storing section 125 of the communications apparatus 112 (step S203). And the control section 124 automatically accesses the center apparatus 113 via the line connection interface section 120 by using the readout center access number (step S204). In the center apparatus 113, the control section 130 responds, via the line connection interface section 128, to the access from the communications apparatus 112 (S205). When the center apparatus 113 has responded, the communications apparatus 112 transmits the personal ID and the called-party address to the center apparatus 113 via the data transmitting section 23 and the line connection interface section 20 (step S206). In the center apparatus 113, the data receiving section 131 receives the personal ID and the called-party address via the line connection interface section 128 (step S207), and the control section 130 stores the called-party address into the personal-ID-correlated terminal address storing section 138 so that it is correlated with the personal ID (step S208). Further, the control section 130 reads a current mode from the personal-ID-correlated mode storing section 138 (step S209), and informs the communications apparatus 112 whether the current mode is a present or absent mode via the calling section 129 and the line connection interface section 128 (step S210).

If the current mode is a present mode, the user performs a mode setting operation through the dialing section 121 (step S114), and the control section 124 transmits a content of the setting to the center apparatus 113 via the data transmitting section 123 and the line connection interface section 120. The center apparatus 113 stores the thus-set mode into the personal-ID-correlated mode storing section 137 (step S215), and makes a transition to a waiting state (step S216).

If the current mode as read out from the personal-ID-correlated mode storing section 138 is an absent mode, the center apparatus 113 automatically reproduces the message stored in the personal-ID-correlated message storing section 133 (step S211), and transmits it to the communication apparatus 112 via the calling section 129 and the line connection interface section 128. In the communications apparatus 112, the calling section 119 informs the user of the received message (step 212). After completion of the message reproduction (step S213), the same processing as in the case where the current mode as read out from the personal-ID-correlated mode storing section 138 is a present mode is performed.

When a call is effected from the caller communications apparatus 151 to the center apparatus 113 with the UPT number of the user (step S217) in the waiting state (step S216), the control section 130 reads a current mode corresponding to the personal ID that in turn corresponds to the UPT number of the call from the personal-ID-correlated mode storing section 137 (step S218). If the current mode is a present mode, the control section 130 reads a called-party address corresponding to the personal ID from the personal-ID-correlated terminal address storing section (step S219) and effects call transfer (step S220). On the other hand, if the current mode is an absent mode, the control section 130 transmits the message guidance that is recorded in the message guidance storing section 132 via the calling section 129 (step S221), and records a message of the caller into the personal-ID-correlated message storing section 133 (step S222).

Although the above description is directed to the case where the mode setting is effected through the dialing section 121, a user's manipulations can be simplified if the communications apparatus 112 is adapted to operate to automatically establish a present mode when the portable recording medium 111 is connected thereto.

Figure 21A:
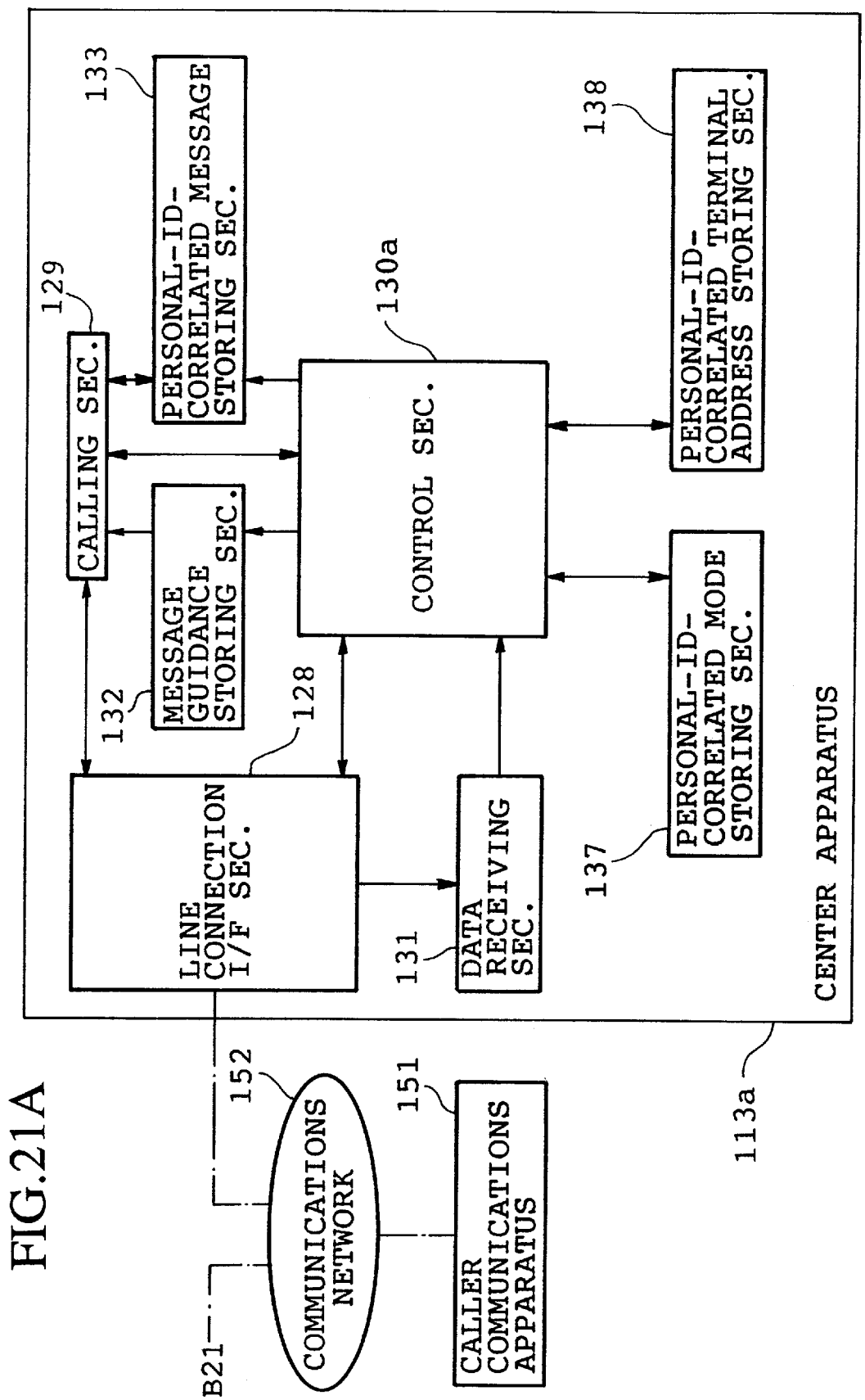
FIGS. 21A and 21B illustrate a block diagram showing the configuration of a communications system according to a tenth embodiment of the invention (FIG. 21B is connected to FIG. 21A through line B21)
Figure 21B:
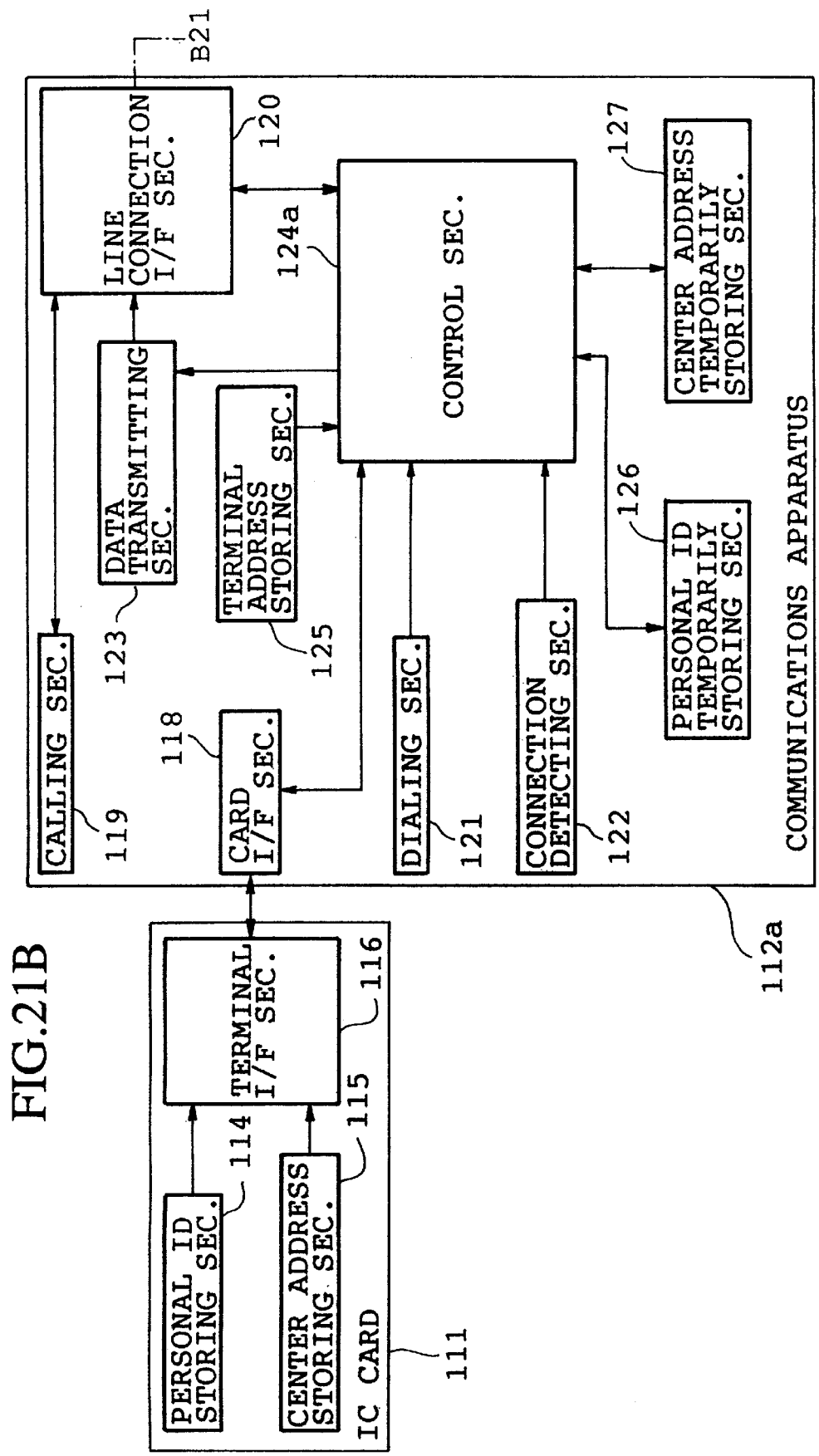

FIGS. 21A and 21B illustrate a block diagram showing the configuration of a communications system according to a tenth embodiment of the invention, which is so configured as to automatically establish a present mode when a portable recording medium 111 is inserted into a communications apparatus 112a, and establish an absent mode when the former is removed from the latter. That is, this embodiment is different from the ninth embodiment in the following points. The communications apparatus 112a has a personal ID temporarily storing section 126 and a center access number temporarily storing section 127 for respectively reading and temporarily storing a personal ID and a center access number from the portable recording medium 111 upon its insertion into a card interface section 118. When the portable recording medium 111 is removed from the card interface section 118, the control section 124a registers an absent mode by automatically accesses the center apparatus 113a by using the personal ID and the center access number that are stored in the personal ID temporarily storing section 126 and the center address temporarily storing section 127. After completion of the registration of an absent mode, the control section 124a erases the storage contents of the personal ID temporarily storing section 126 and the center address temporarily storing section 127.

More specifically, the personal ID temporarily storing section 126 is to temporarily store the personal ID that is stored in the personal ID storing section 114 of the portable recording medium 111, and the center address temporarily storing section 127 is to temporarily store the center access number that is stored in the center address storing section 115 of the portable recording medium 111. Upon connection of the portable recording medium 111, the control section 124a reads the personal ID and the center access number from the portable recording medium 111 and temporarily stores those in the communications apparatus 112a, and also automatically calls the center apparatus 113a to automatically set the mode corresponding to the personal ID of the personal-ID-correlated mode storing section 137 to a present mode. When the portable recording medium 111 is removed, the control section 124a automatically calls the center apparatus 113a based on the center access number that is stored in the center address temporarily storing section 127, to automatically set the mode corresponding to the personal ID of the personal-ID-correlated mode storing section 137 to an absent mode. Thereafter, the control apparatus 124a erases the storage contents of the personal ID temporarily storing section 126 and the center address temporarily storing section 127.

Figure 22:
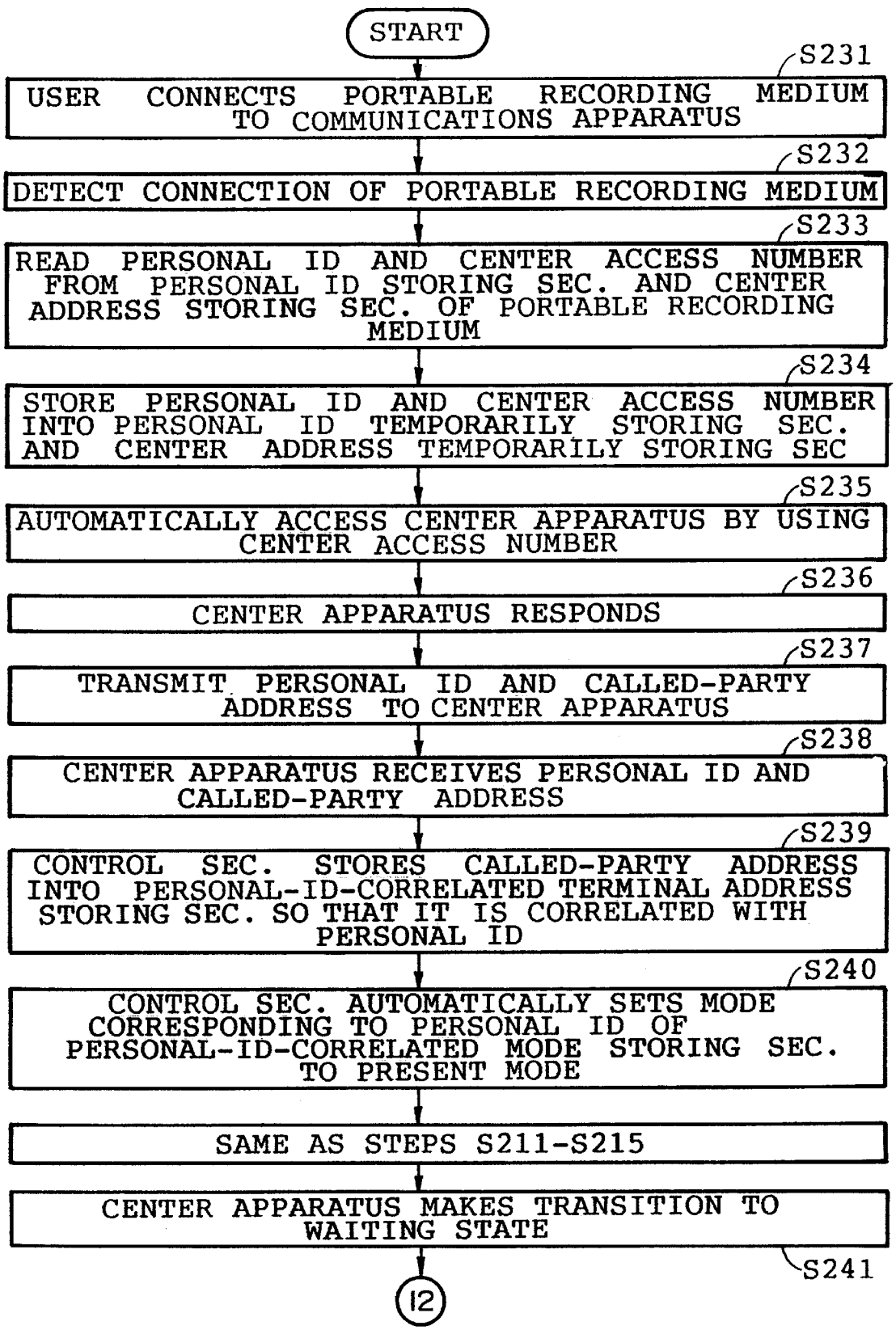
FIGS. 22 and 23 show an operation flow of the communications system of FIGS. 21A and 21B.
Figure 23:
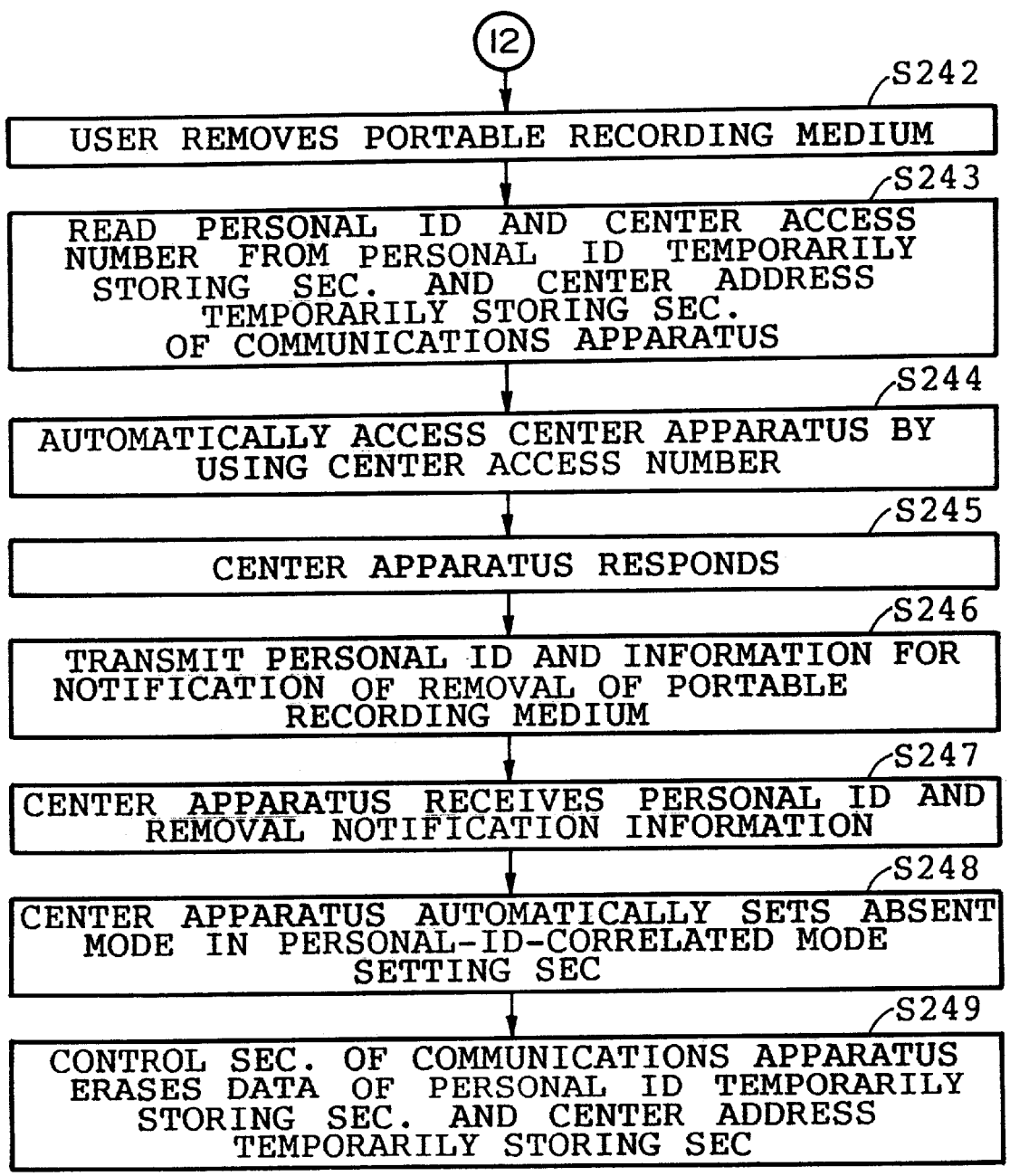

FIGS. 22 and 23 show an operation flow of this communications system.

First, a user connects the portable recording medium 111 that stores a personal ID and a center access number to the communications apparatus 112a (step S231). In response, in the communications apparatus 112a, the connection detecting section 122 detects the connection and informs the control section 124a of the detection (step S232). Upon the detection of the connection, the control section 124a reads the personal ID and the center access number from the personal ID storing section 114 and the center address storing section 115 of the portable recording medium 111 (step S233). The control section 124a stores the personal ID and the center access number into the personal ID temporarily storing section 126 and the center address temporarily storing section 127 of the communications apparatus 112a (step S234). Further, the control section 124a automatically accesses the center apparatus 113a via the line connection interface 120 based on the readout center access number (step S235). In the center apparatus 113a, the control section 130a responds, via the line connection interface section 128, to the access from the communications apparatus 112a (step S236). When the center apparatus 113a has responded, the communications apparatus 112a transmits the personal ID and the called-party address to the center apparatus 113a via the line connection interface section 20 (step S237). In the center apparatus 113a, the data receiving section 131 receives the personal ID and the called-party address via the line connection interface section 128 (step S238), and the control section 130a stores the called-party address into the personal-ID-correlated terminal address storing section 138 so that it is correlated with the personal ID (step S239). Further, the control section 130a automatically sets the mode corresponding to the personal ID of the personal-ID-correlated mode storing section 138 to a present mode (step S240). After the automatic mode setting, the same processing as steps S211–S215 of the ninth embodiment are performed. Upon completion of step S215, the center apparatus 113a makes a transition to a waiting state (step S241).

When the portable recording medium 111 is removed during the waiting state (step S242), in the communications apparatus 112a, the control section 124a reads the personal ID and the center access number from the personal ID temporarily storing section 126 and the center address temporarily storing section 127 (step S243), and automatically accesses the center apparatus 113a based on the readout center access number (step S244) When the center apparatus 113a has responded (step S245), the communications apparatus 112a transmits the personal ID and information for notification of the removal of the portable recording medium 111 via the data transmitting section 123 and the line connection interface section 120 (step S246). In the center apparatus 113a, the data receiving section 131 receives the personal ID and the removal notifying information (step S247). Upon the reception of the removal notifying information, the personal-ID-correlated mode storing section 138 automatically sets the mode corresponding to the personal ID to an absent mode (step S248). On the other hand, the control section 124a of the communications apparatus 112a that has transmitted the personal ID and the removal notifying information erases the data stored in the personal ID temporarily storing section 126 and the center address temporarily storing section 127 (step S249).

In addition, although a present mode is automatically transferred to an absent mode when the portable recording medium 111 is removed in this embodiment, it is possible to modify the configuration so that it can be selected whether transition of the mode is automatically implemented or manually set, in accordance with a manipulation of the communications apparatus 112a. For instance, in the case where a plurality of people register called-party addresses to the same telephone at a meeting room, that is, in the case where a plurality of people register called-party addresses to a single terminal, if the mode of the terminal is automatically transferred to the absent mode when the portable recording medium that is inserted into the terminal is removed therefrom, it is not possible to immediately receive a call that is designated to the terminal, but the call is put on hold, with the message guidance. On the other hand, according to the modified configuration, it is generally possible to transfer the modes automatically and is also possible to maintain the present mode when a portable recording medium is removed, instead of automatic transition to the absent mode, for instance, when a plurality of people register call-party addresses to one terminal and share the terminal.

Figure 24A:
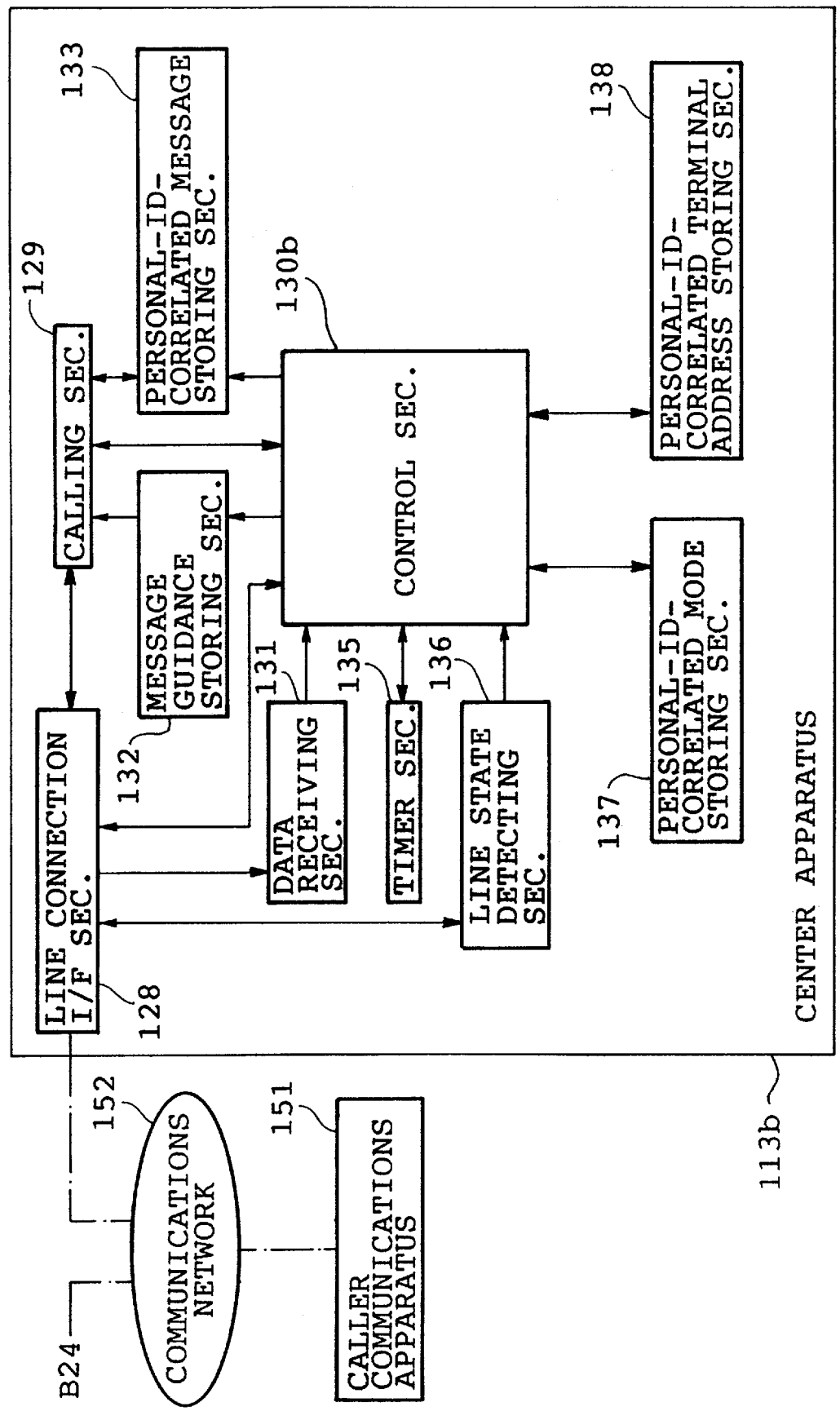
FIGS. 24A and 24B illustrate a block diagram showing the configuration of a communications system according to an eleventh embodiment of the invention (FIG. 24B is connected to FIG. 24A through line B24)
Figure 24B:
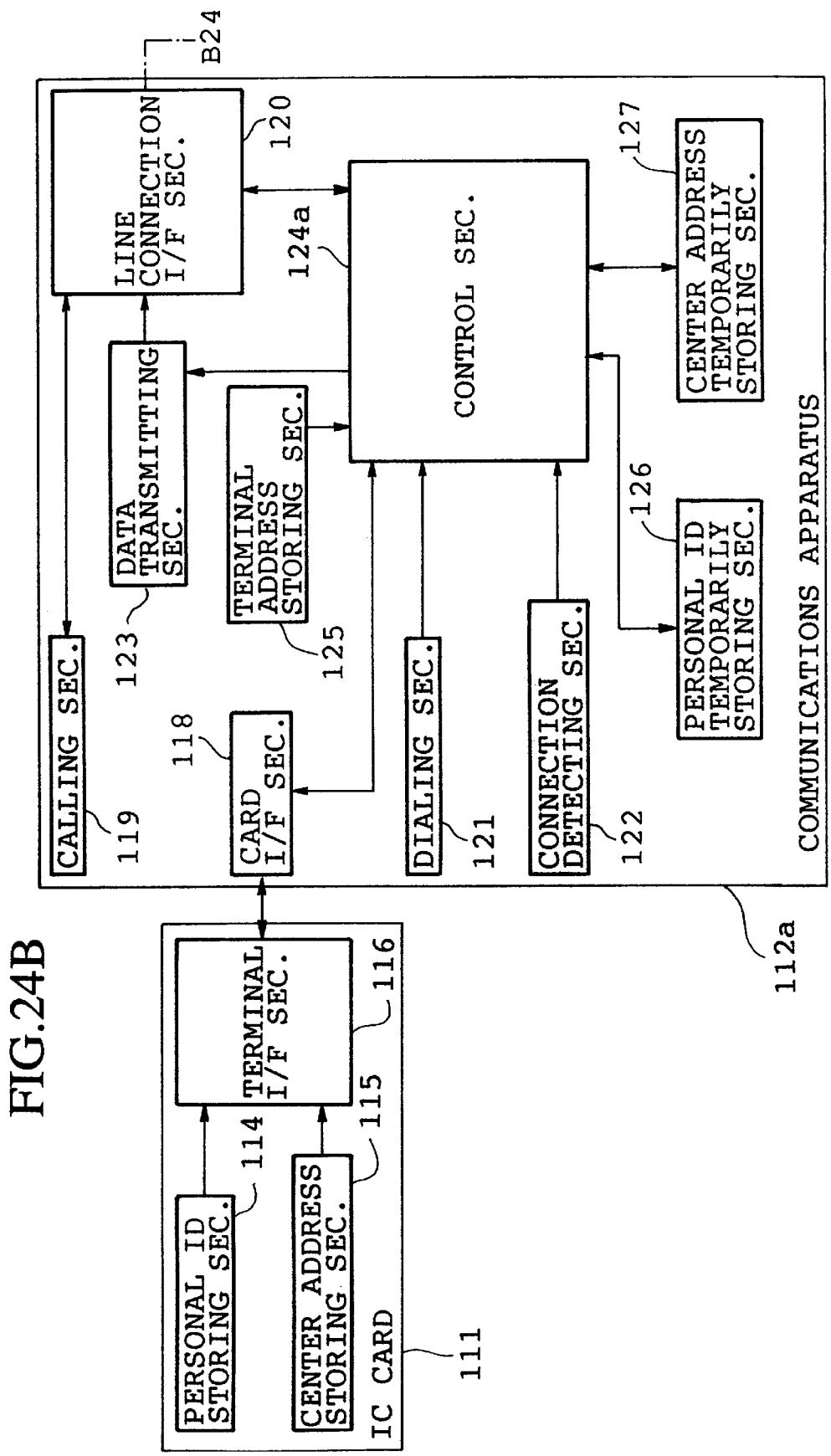

FIGS. 24A and 24B illustrate a block diagram showing the configuration of a communications system according to an eleventh embodiment of the invention. This embodiment is different from the tenth embodiment in the following points. The center apparatus 113b has a timer section 135 and a line state detecting section 136. in forwarding a call to a communications apparatus 112a, when a predetermined time has elapsed from the start of transfer calling without any response from the communications apparatus 112a, or if the line for calling the communications apparatus 112a is busy, the center apparatus 113b sets the mode corresponding to the related personal ID to an absent mode.

More specifically, in forwarding, to the communications apparatus 112a, a call to the center apparatus 113b with a telephone number corresponding to a personal ID, the timer section 135 measures the time from the transfer calling to a response from the communications apparatus 112a. During the call transfer, the line state detecting section 136 detects the state of the line for calling from the center apparatus 113b. When the time measurement by the timer 135 has been completed, or when the line state detecting section 136 detects that the calling line is busy or the communications apparatus 112a is in a state being incapable of call reception, a control section 130b performs an absent mode operation.

Figure 25:
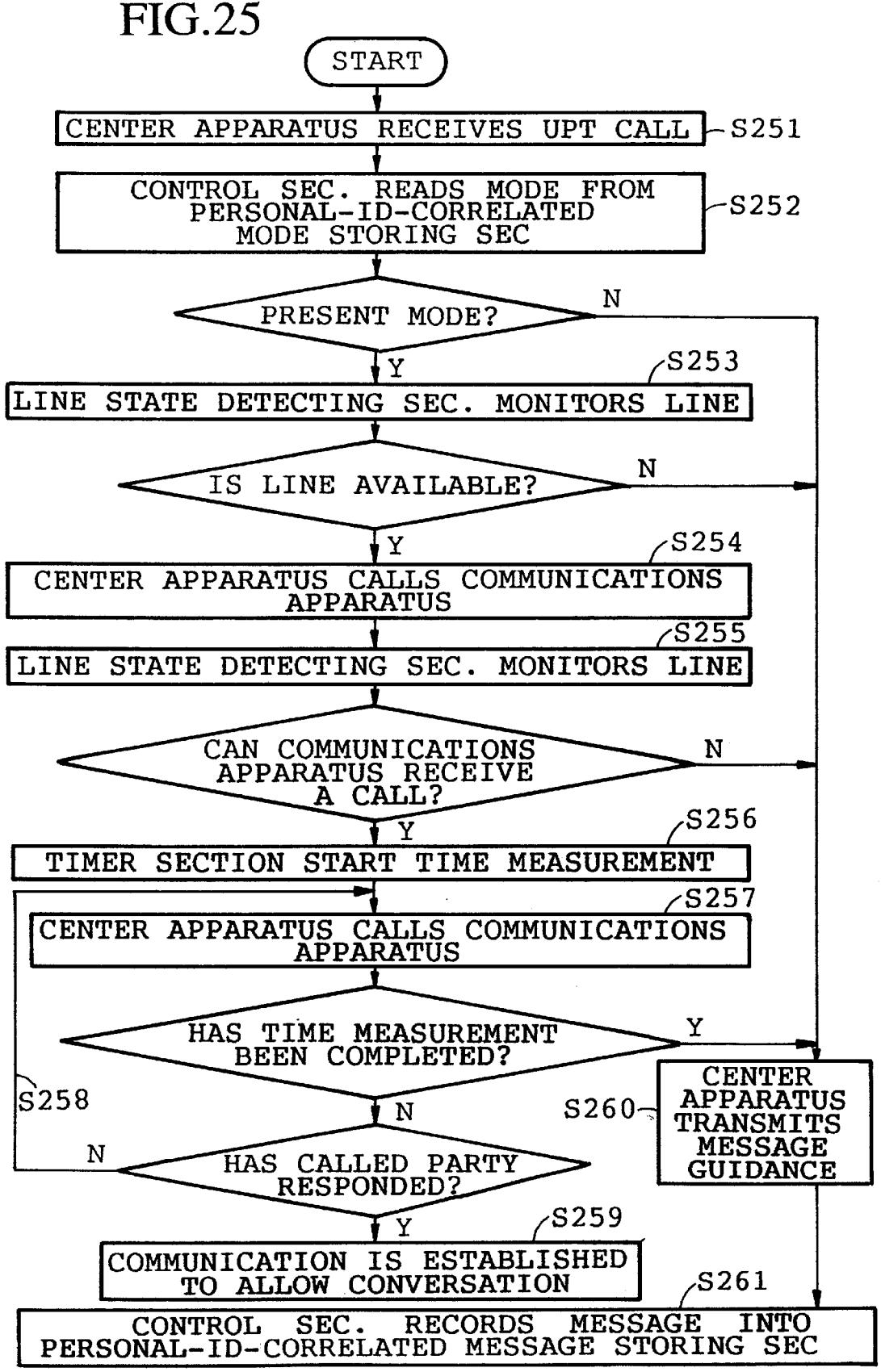
FIG. 25 shows an operation flow of the communications system of FIGS. 24A and 24B.

FIG. 25 shows an operation flow of this communications system.

When a call from a caller communications apparatus 151 is received by the center apparatus 113b (step S251), the control section 130b searches the personal-ID-correlated mode storing section 137 for a mode of a personal ID corresponding to the received UPT number (step S252).

If a called party (i.e., user) has set a present mode in the personal-ID-correlated mode storing section 137, the control section 130b controls the line state detecting section 136 to monitor whether a line for an outgoing call via the center apparatus 113b is available (step S253) If it is available, the control section 130b forwards the call to the communications apparatus 112a (step S254). The line state detecting section 136 continues to monitor the line (step S255). If the same communications apparatus 112a is in a state capable of call reception, the control section 130b controls the timer section 135 to start time measurement (step S256), and calls the called-party communications apparatus 112a (step S257) The calling is continued until the time measurement of the timer section 136 is completed or the called party responds before it (step S258). Connection is established to allow a conversation when the called party responds (step S259).

If it is found in step S252 that an absent mode is set, the control section 130b causes a message guidance to be transmitted to the caller from the message guidance storing section 132 (step S260), and records a message of the caller into the personal-ID-correlated message storing section 133 so that it is correlated with the personal ID of the called party (step S261).

The message guidance is transmitted and a message is recorded in the same manner as in steps S260 and S261 if no line is available for an outgoing call via the center apparatus 113b in step S253, the communications apparatus 112a is in a state being incapable of call reception in step S255 (for instance, it is busy), or the calling time measurement by the timer section 135 has been completed.

Figure 26A:
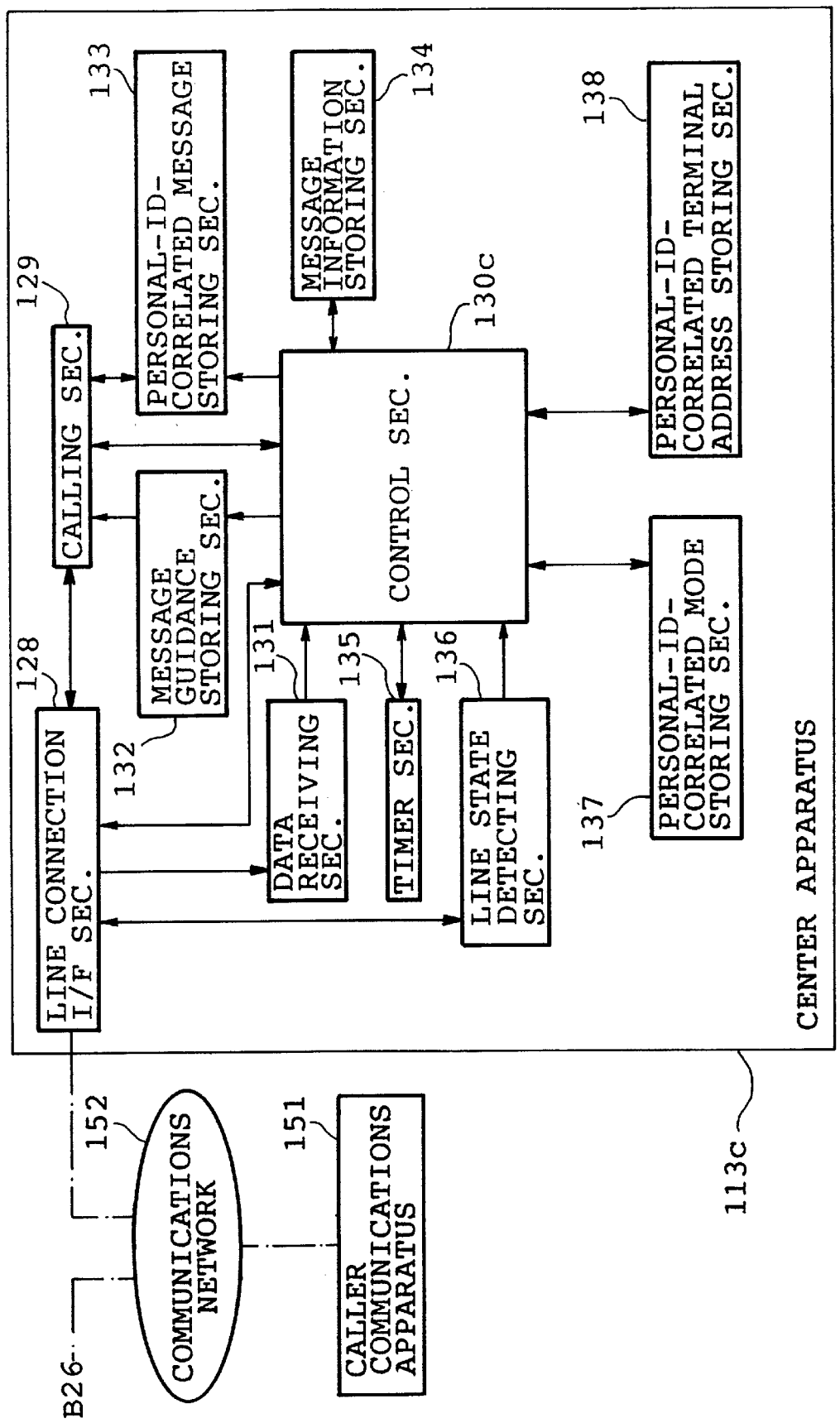
FIGS. 26A and 26B illustrate a block diagram showing the configuration of a communications system according to a twelfth embodiment of the invention (FIG. 26B is connected to FIG. 26A through line B26)
Figure 26B:
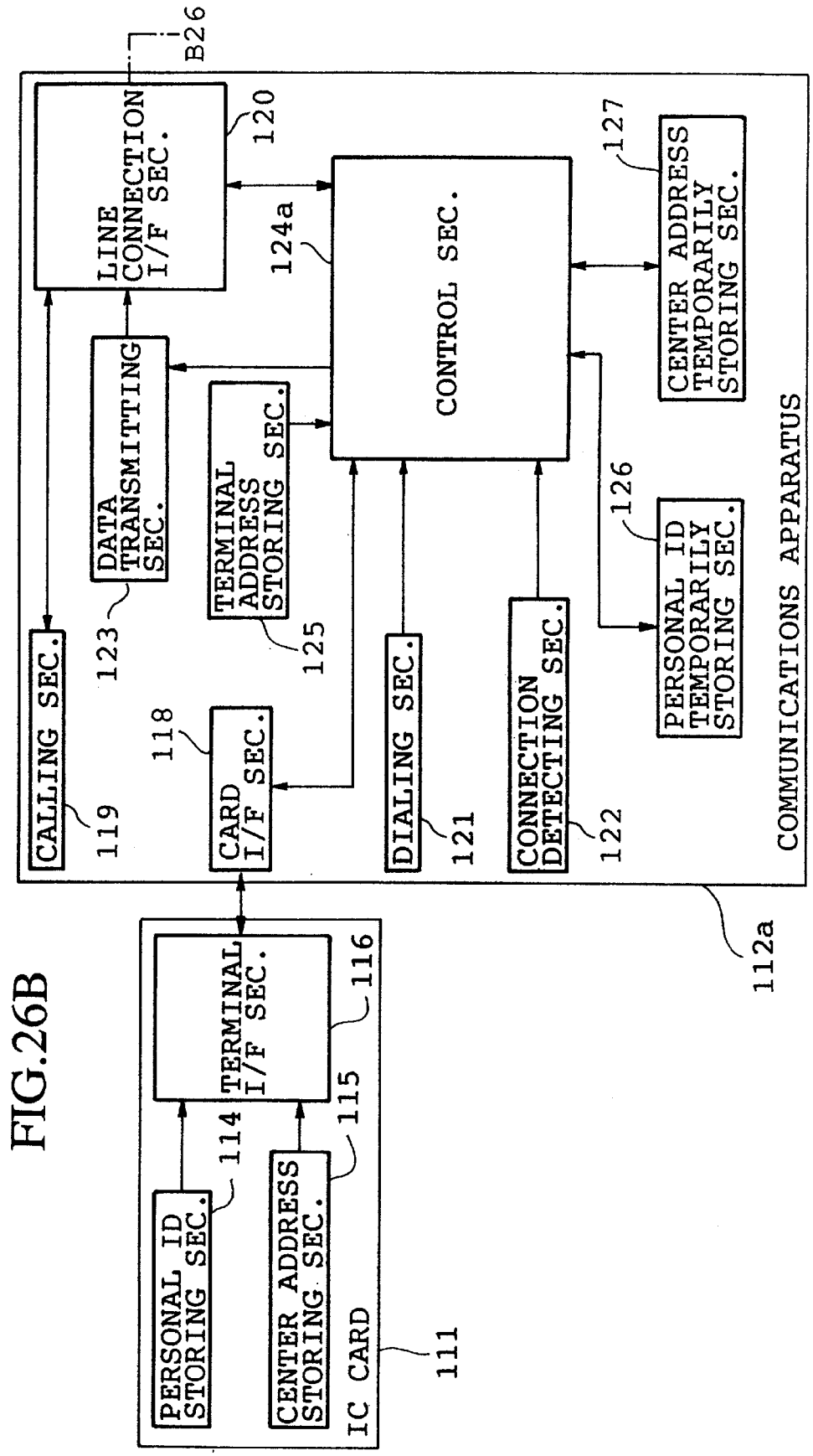

FIGS. 26A and 26B illustrate a block diagram showing the configuration of a twelfth embodiment of the invention. This embodiment is different from the eleventh embodiment in the following points. A center apparatus 113c has a message information storing section 134 for storing, for each personal ID, message information including existence of messages for a user represented by the personal ID, each message date and time, the number of messages, and telephone numbers corresponding to personal IDs of persons who left messages. When the center apparatus 113c is informed of a personal ID and a called-party address after the portable recording medium 111 is inserted into the card interface section 118, it transmits the above message information to a communications apparatus 112a that is represented by the called-party address.

More specifically, the message information storing section 134 stored, for each personal ID, message information including existence of messages for a user represented by the personal ID, each message date and time, the number of messages, and telephone numbers (UPT numbers) corresponding to personal IDs of persons who left messages. When the communications apparatus 112a automatically calls the center apparatus 113c with the portable recording medium 111 connected thereto, a control section 130c of the center apparatus 113c reads message information corresponding to the received personal ID from the message information storing section 134, and transmits it to the communication apparatus 112a. When the message information and messages have been acknowledged by the communications apparatus 112a, the control section 130c of the center apparatus 113c effects calling from the communications apparatus 112a to a person who left the message by using the telephone number corresponding to his personal ID.

Figure 27A:
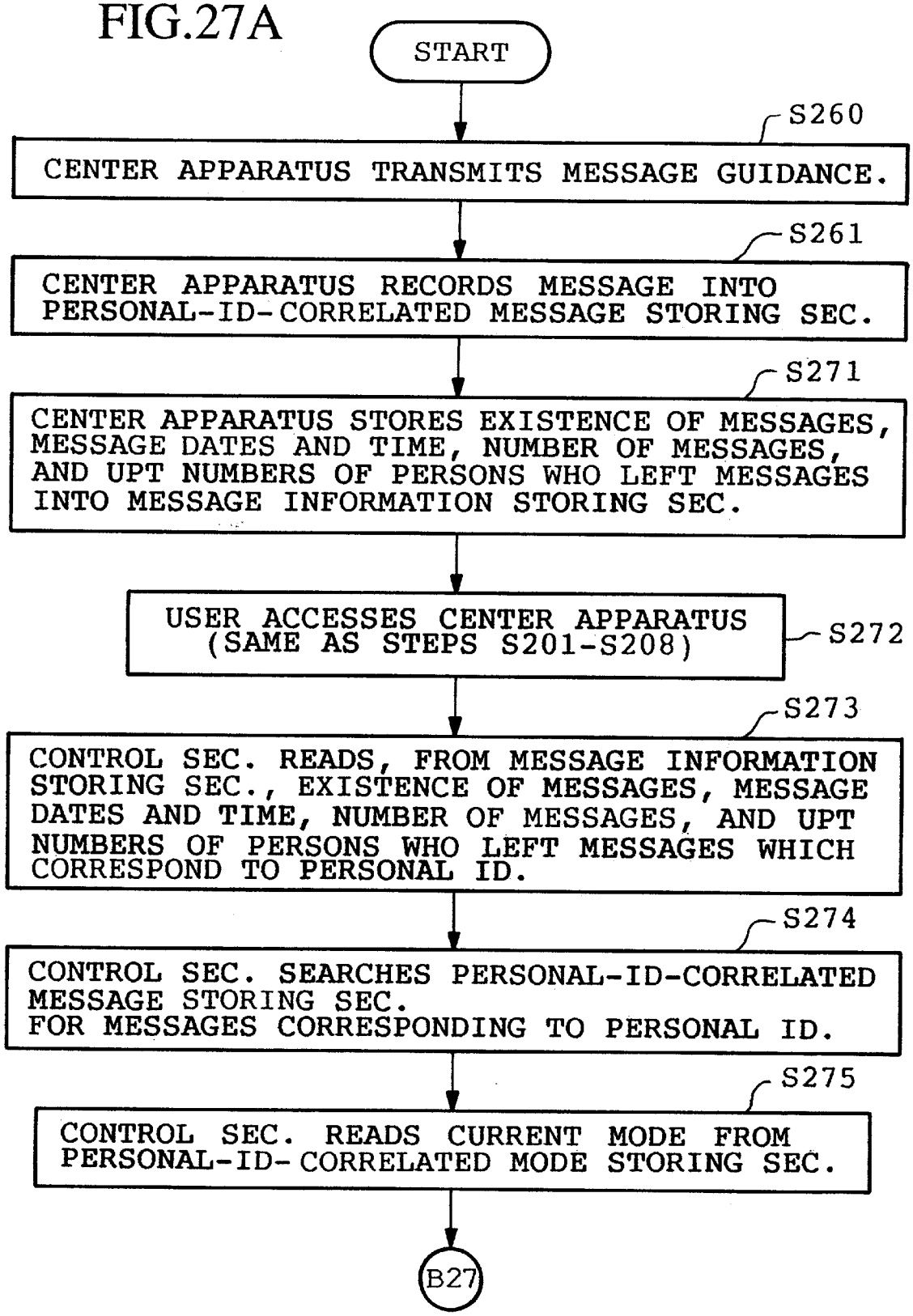
FIGS. 27A, 27B, and 28 show an operation flow of the communications system of FIGS. 26A and 26B.
Figure 27B:
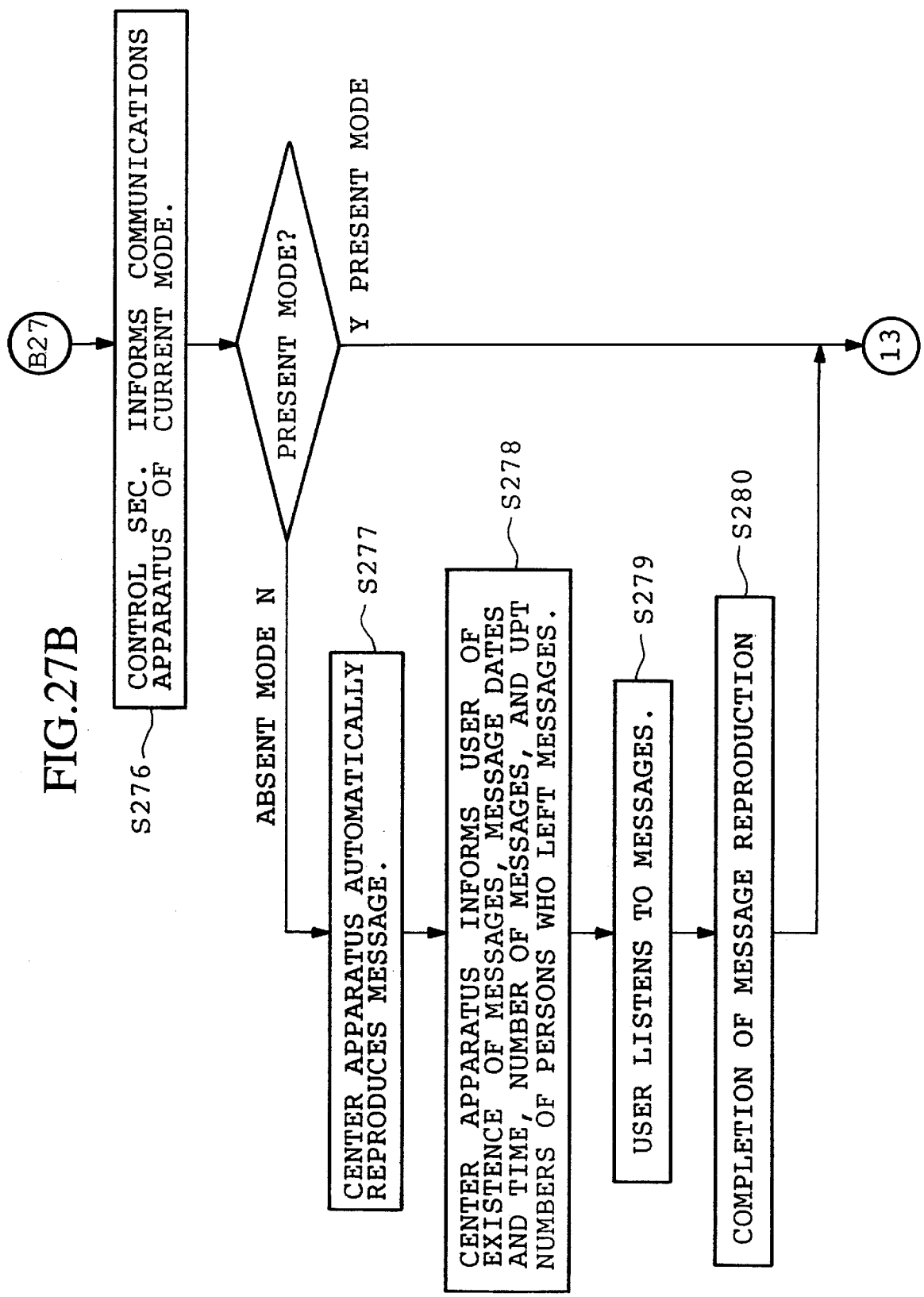
Figure 28:
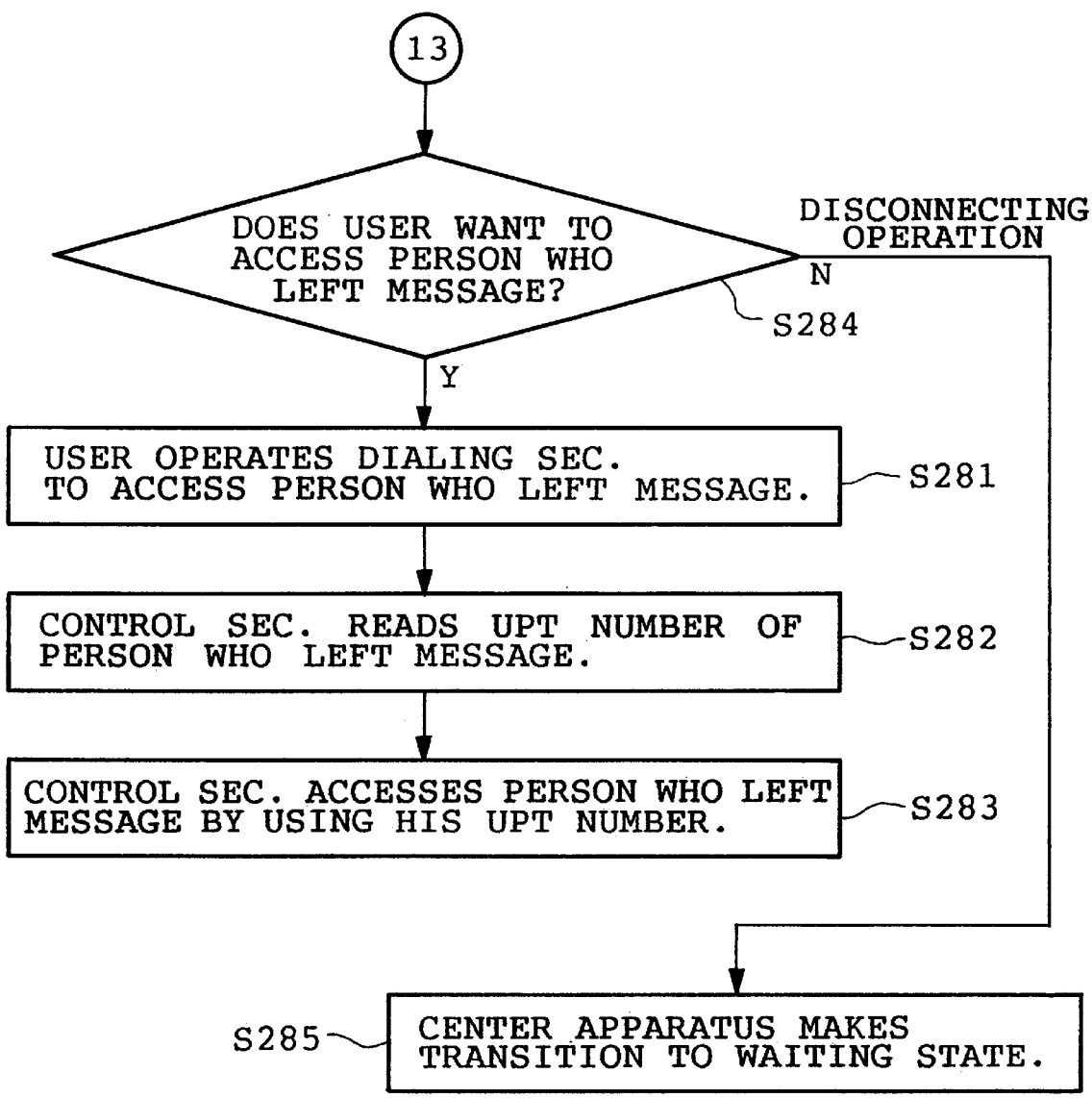

FIGS. 27A, 27B, and 28 show an operation flow of this communications system.

After transmitting a message guidance to a caller, the center apparatus 113c records a message of the caller (step S261), and stores, into the message information storing section 134, message information including existence of messages, each message date and time, the number of messages, and UPT numbers of persons who left messages (step S271). When a user accesses the center apparatus 113c from the communications apparatus 112a (step S272; same as steps S201–S208), the control section 130c reads message information corresponding to the personal ID from the message information storing section 134 (step S273), and searches the personal-ID-correlated message storing section 133 for messages corresponding to the personal ID (step S274). Further, the control section 130c reads a current mode from the personal-ID-correlated mode storing section 137 (step S275), and informs the communications apparatus 112a of the current mode (step S276).

If the current mode is an absent mode, the center apparatus 113c automatically reproduces the messages from the personal-ID-correlated message storing section 133 (step S277), and then informs the user of the message information via the calling section 129 (step S278). in this manner, the user who has accessed the center apparatus 113c can listen to the messages (step S279). After completion of the message reproduction (step S280), the user operates the dialing section 121 of the communications apparatus 112a if he wants to access a person who left a message (step S281). In response, the control section 130c of the center apparatus 113c reads the UPT number of the person who left the message (step S282), and automatically accesses him by using the readout UPT number (step S283). On the other hand, when the user who accessed the center apparatus 113c has performed a line disconnecting operation after listening to the messages (step S284), the center apparatus 113c makes a transition to a waiting state (step S285).

Figure 29A:
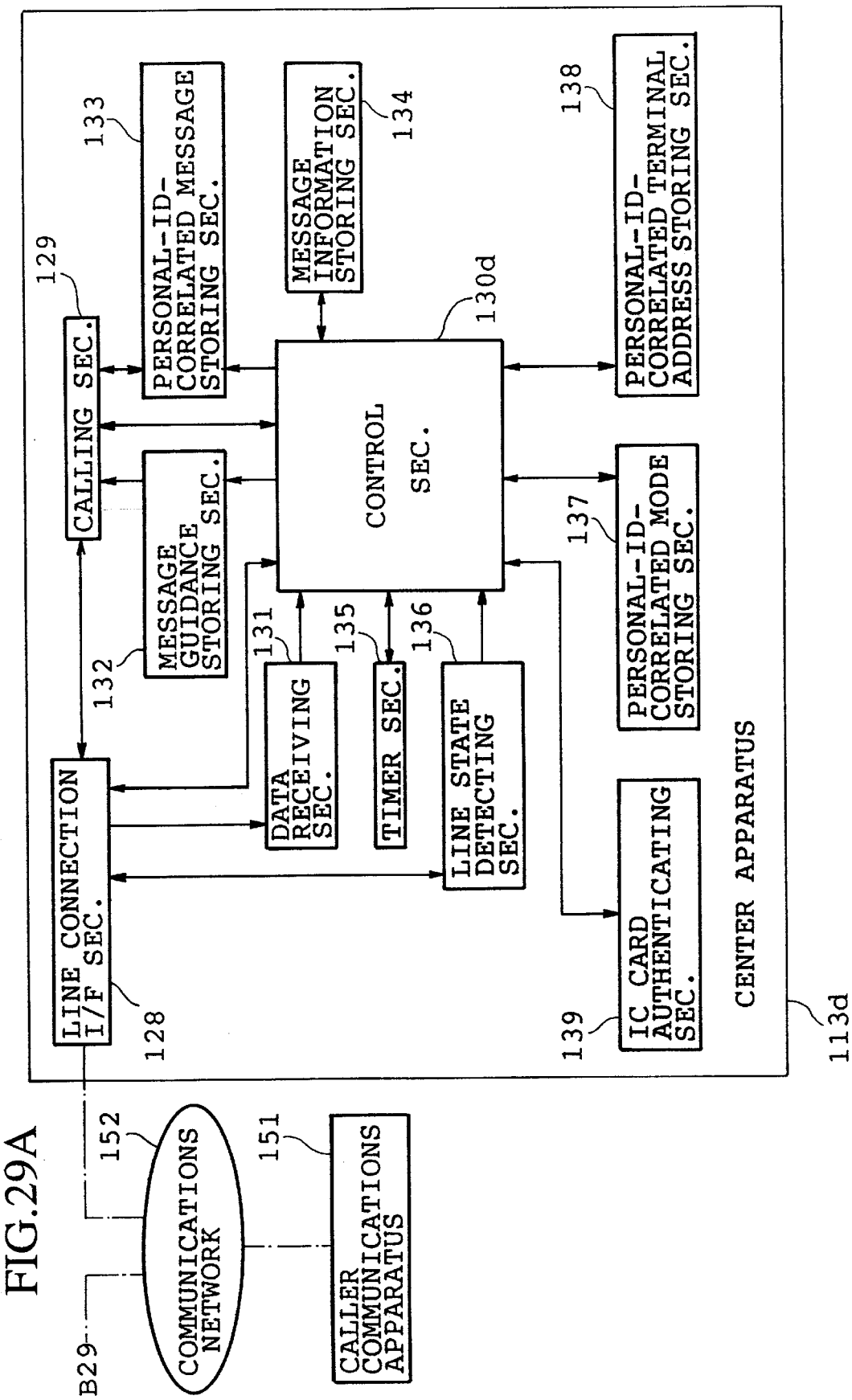

FIGS. 29A and 29B illustrate a block diagram showing the configuration of a communications system according to a thirteenth embodiment of the invention. This embodiment is different from the twelfth embodiment in that a center apparatus 113d has an IC card authenticating section 139 for judging of the legitimacy of a portable recording medium 111d that is inserted in an accessing communication apparatus 112d by performing processing with the portable recording medium 111d, and in that the portable recording medium 111d has an authentication control section 117 for the authentication.

Figure 30B:
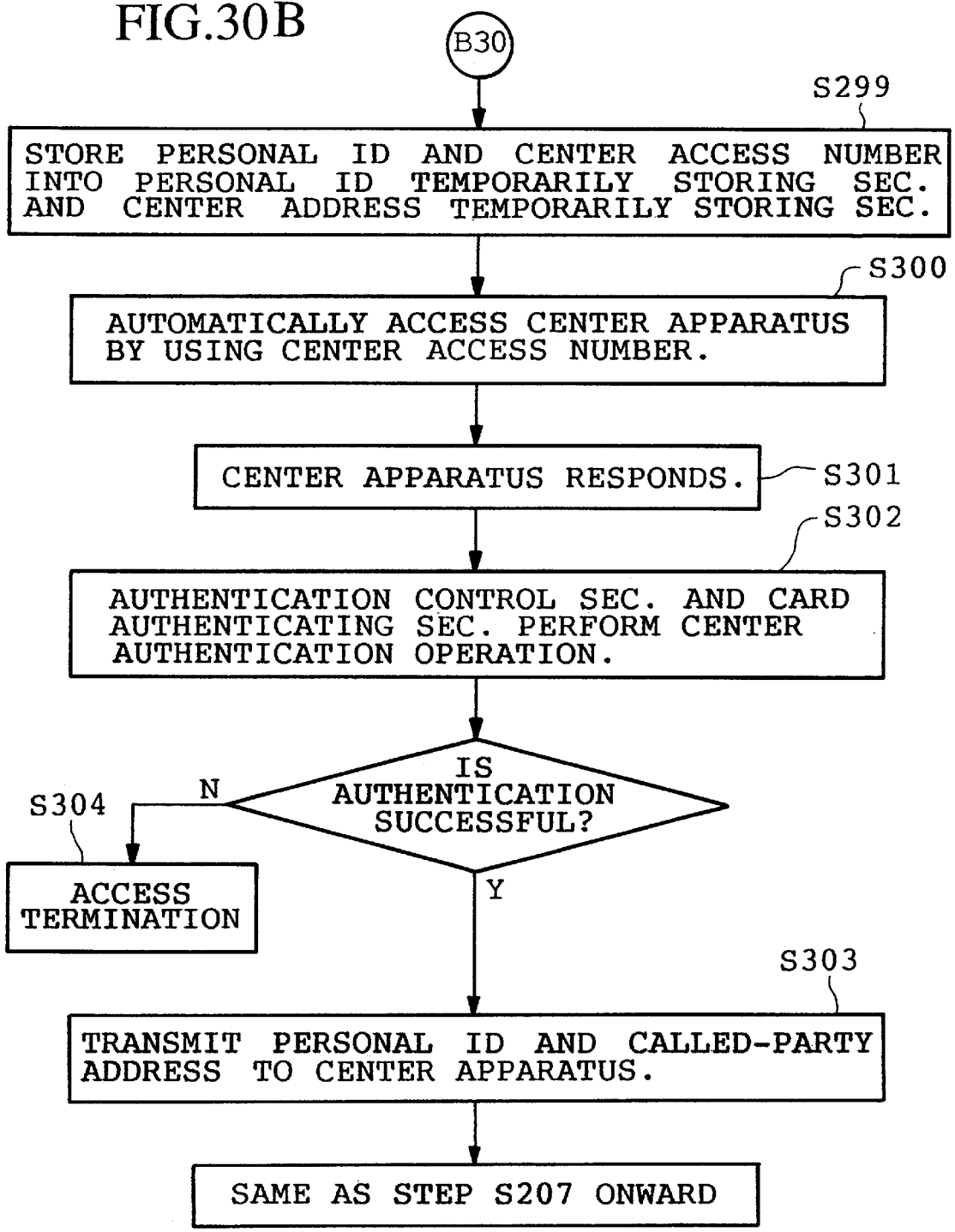

FIGS. 30A and 30B show an operation flow of this communications system.

A user connects a portable recording medium 111d that stores a personal ID and a center access number to a communications apparatus 112d (stop S291). Upon the connection of the portable recording medium 111d, the connection detecting section 122 detects it and informs a control section 124d of the detection (step S292). Upon the detection of the connection, the control section 124d makes a transition to a state of waiting for a code number (step S293).

When a code number has been input through the dialing section 121 (step S294), the control section 124d inputs the code number to the authentication control section 117 of the portable recording medium 111d (step S295). The authentication control section 117 checks the input code number by collating it with a code number stored therein (step S296). If they are not identical, the control section 124d again makes a transition to a state of waiting for input of a code number (step S297). If they are identical, the control section 124d reads a personal ID from the personal ID storing section 114 of the portable recording medium 111d, and also reads a center access number from its center address storing section 115 (step S298). The control section 124d stored the personal ID and the center access number into the personal ID temporarily storing section 126 and the center address temporarily storing section 127 of the communications apparatus 112d (step S299). Further, the control section 124d automatically calls the center apparatus 113d by using the readout center access number (step S300).

When the center apparatus has responded (step S301), a center authentication operation is performed between the authentication control section 117 of the portable recording medium 111d and the IC card authenticating section 139 of the center apparatus 113d (step S302) If the authentication operation has ended normally, the communications apparatus transmits the personal ID and a called-party address to the center apparatus 113d, and they are registered into the latter (step S303). If an authentication error occurs, the access is terminated (step S304).

As described above, the communications systems according to the ninth to thirteenth embodiments of the invention realize automatic access to the center apparatus by connection of the portable recording medium to the communications apparatus, automatic registration of a personal ID after reception of a response from the center apparatus, a simplified setting/canceling operation of a present/absent mode, and automatic recording of a message during an absent mode. Thus, conventionally needed cumbersome manipulations can be eliminated.

When a called party is in a state being capable of communication but incapable of response, a message is automatically recorded in the center apparatus. As a result, a caller can correctly send his message to the called party without calling the latter again. Even if the called party is in a state being incapable of communication, storage of the message in the center apparatus assures reliable transmission of the message, to thereby establish a successful message transmission system.

In the above communication systems, when a caller has a message recorded, a message date and time and his UPT number are also recorded automatically. Therefore, when a user accesses the center apparatus from the communications apparatus with the portable recording medium connected thereto, he can listen to information of existence of messages, each message date and time, the number of messages, and UPT numbers of callers, together with the messages themselves. Further, the user wants to communicate with a caller, he can access the caller by a simple manipulation on the communications apparatus by using the UPT number of the caller. That is, the user need not newly call the caller, i.e., the person who left a message.

In addition, by performing authentication between the portable recording medium and the communications apparatus and between the portable recording medium and the center apparatus, the security of communication can be improved. Thus, even if a user loses a card, has it stolen, or has some other similar problem, he need not worry about it.

FIG. 31 is a block diagram showing the configuration of a communications apparatus according to a fourteenth embodiment of the invention. As shown in FIG. 31, a communications apparatus 210 is constituted of a card 220 that has a card ID section 221 in which a card ID is registered, a dialing section 211 for allowing dial input, a card detecting section 212 for detecting card insertion, a power switch 213 for turning on/off the power of the communications apparatus 210, a card ID storing section 214 for storing a card ID even while the power switch 213 is in an off state, a card ID judging section 215 for comparing the card ID registered in the card ID section 221 and the card ID stored in the card ID storing section 214 to judge whether they coincide with each other, and a control section 216.

In addition, a personal ID or a personal telecommunication number, such as a UPT number, may also be used as a card ID.

Figure 33B:
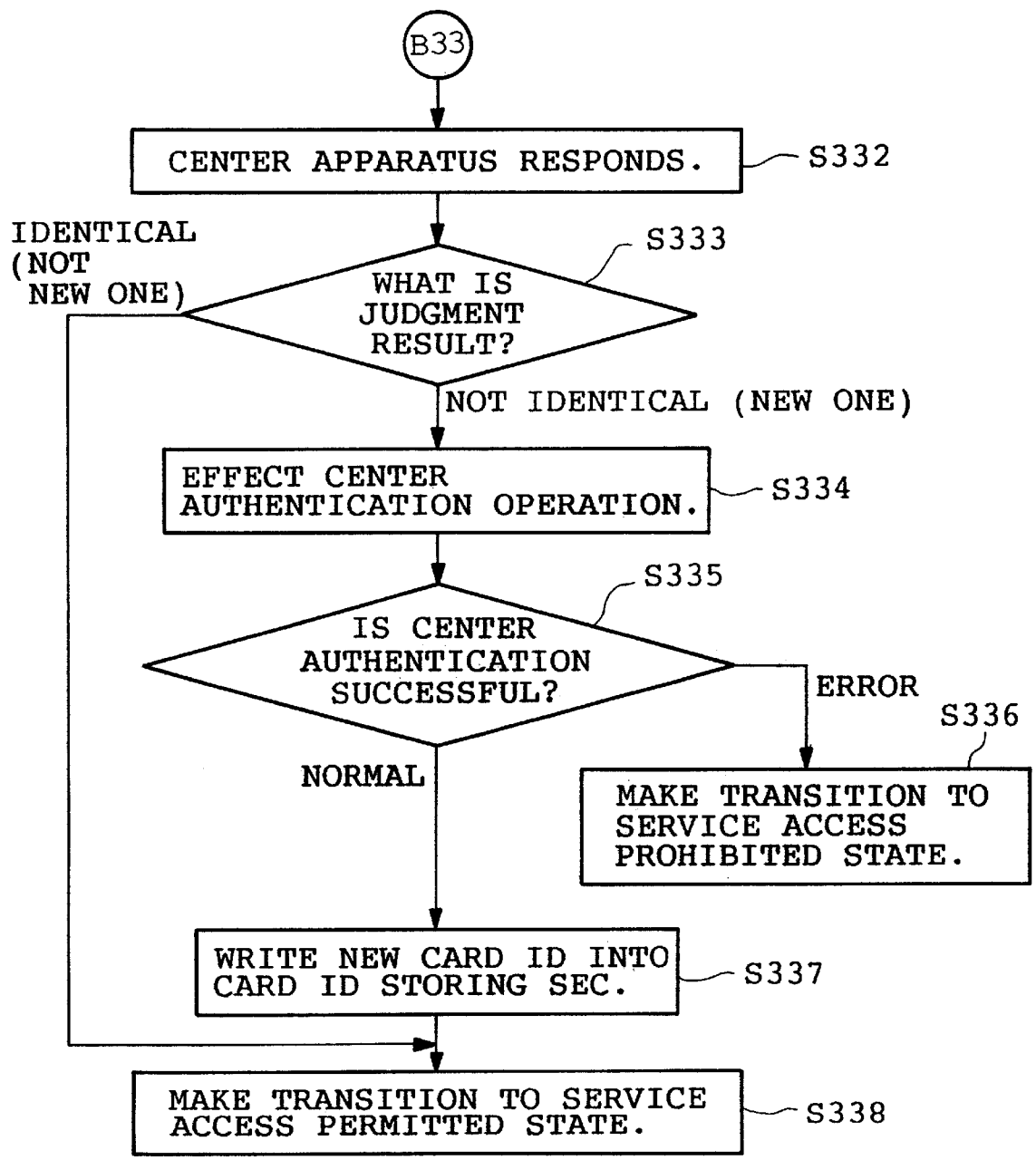

The operation of the communications apparatus of FIG. 31 will be hereinafter described with reference to a flowchart of FIGS. 33A and 33B. When the card 220 is inserted (step S322) during an on state of the power switch 213 of the communications apparatus 210 (step S321), or when the power switch 213 is turned on (step S324) after insertion of the card 220 (step S223) during an off state of the power switch 213, the card detecting section 212 detects insertion of the card 220 and informs it to the control section 216 (step S325). The control section 216 reads a card ID from the card ID section 221 (step S326), and informs it to the card ID judging section 215 (step S327). The card ID judging section 215 compares the informed card ID with a card ID that is stored in the card ID storing section 214 (step S328), and informs the control section 216 of a judgment result (step S329). Then, a user dials a number of the center apparatus 240 through the dialing section 211, to call it via the communications network 230 (step S330). When the center apparatus 240 has responded (step S331), the control section 216 transmits the card ID to the center apparatus 240 (step S332). If the inserted card 220 is a new one (step S333), the control section 216 causes signal exchange between the communications apparatus 210 and the center apparatus 240, to effect a center authentication operation with dial input (step S334), and judges of permission of a service access right. If the center authentication operation has ended normally (step S335), the control section. 216 writes the card ID of the inserted card 220 into the card ID storing section 214 (step S337), and makes a transition to a service access permitted state (step S338). If the inserted card 220 is not a new one (step S333), the control section 216 skips the center authentication operation to makes a direct transition to the service access permitted state (step S338). If an authentication error occurs in step S335, the control section 216 makes a transition to a service prohibited state (step S336).

Next, a communications apparatus according to a fifteenth embodiment of the invention will be described.

Figure 32:
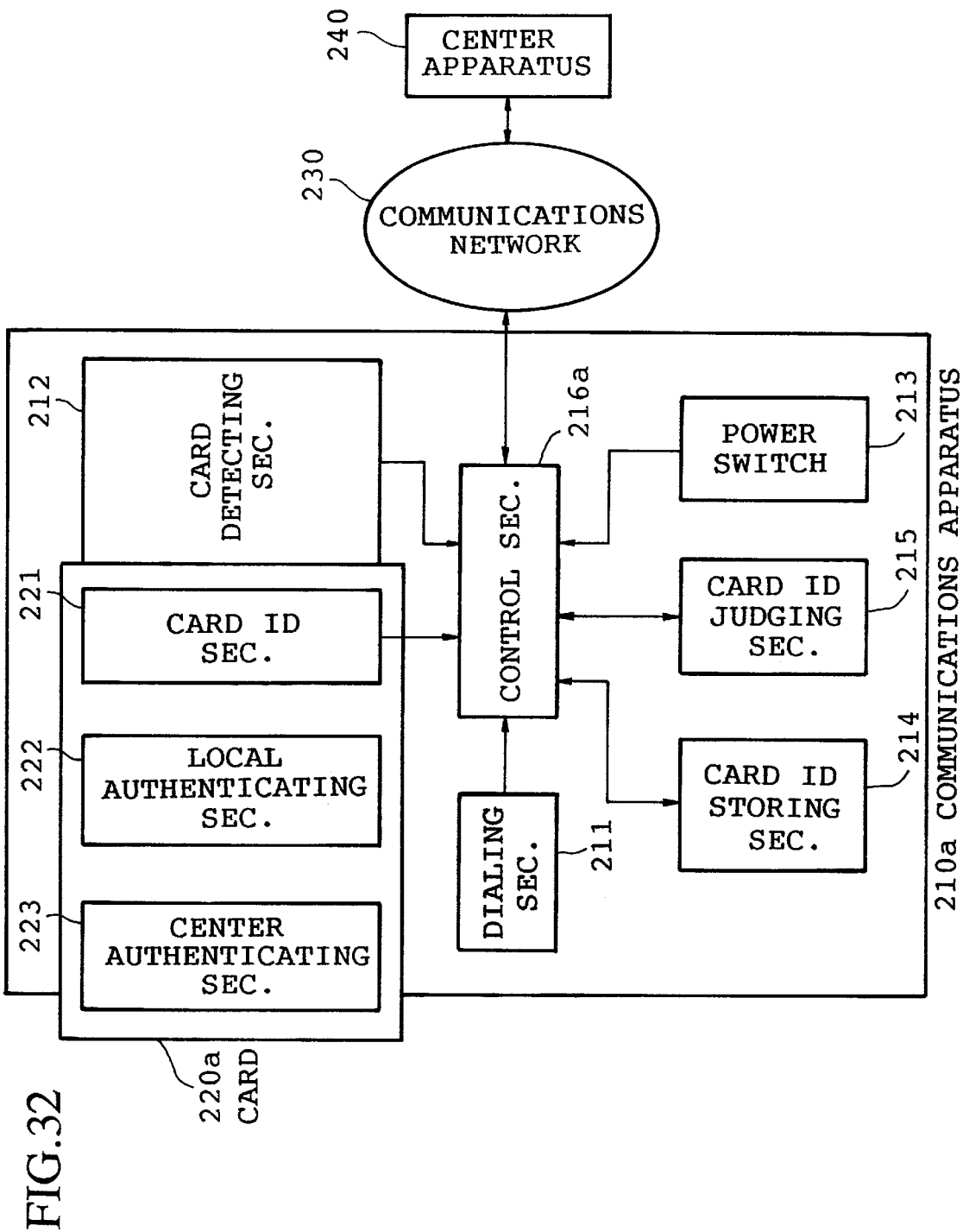
FIG. 32 is a block diagram showing the configuration of a communications apparatus according to a fifteenth embodiment of the invention.

FIG. 32 is a block diagram showing the configuration of a communications apparatus according to the fifteenth embodiment. This embodiment is different from the embodiment of FIG. 31 in that a card 220a has a local authenticating section 222 for collating code numbers and a center authenticating section 223 for performing a center authentication operation with the center apparatus 240.

Figure 34A:
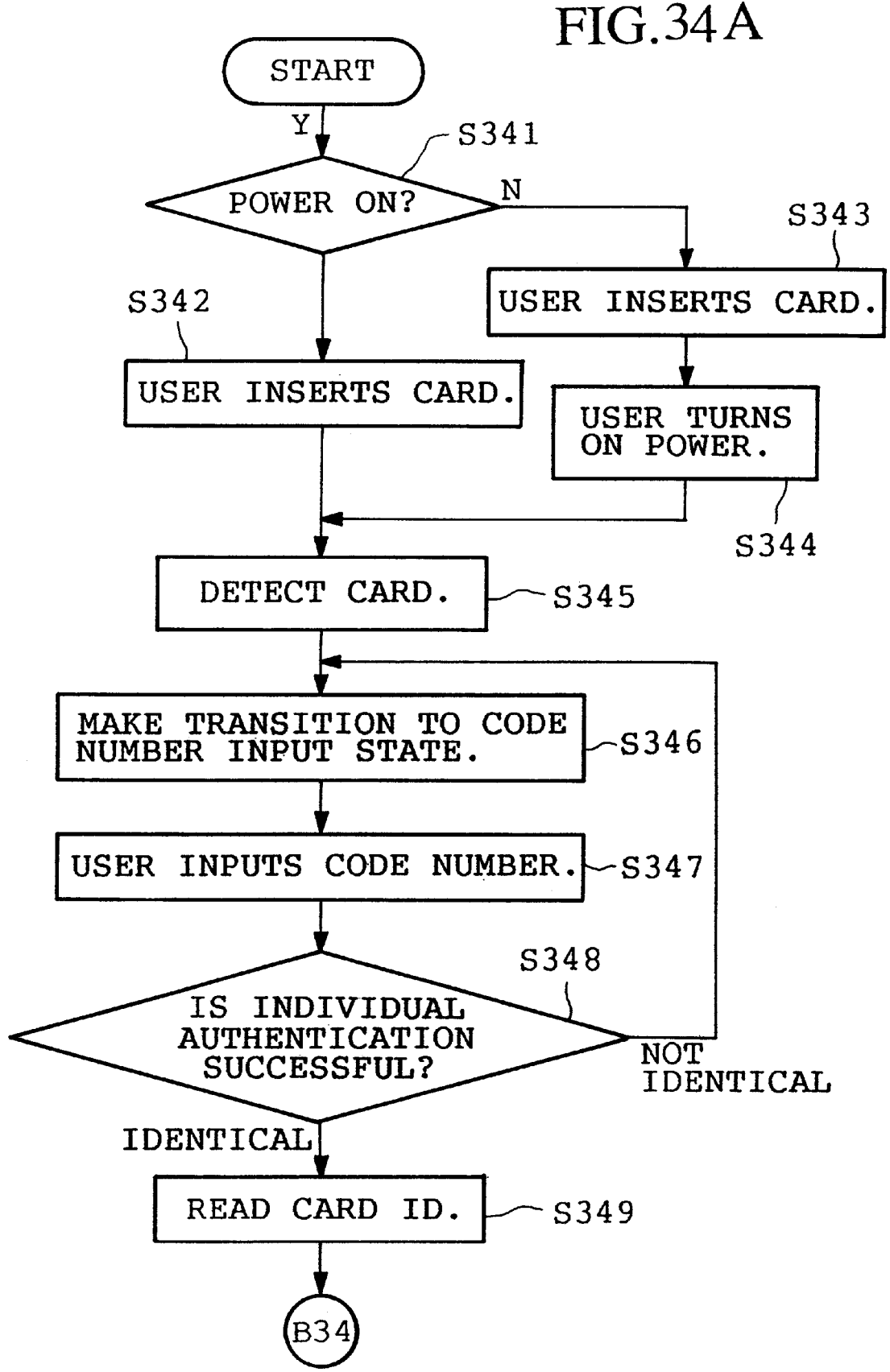
FIGS. 34A and 34B show an operation flow of the communications apparatus of FIG. 32.
Figure 34B:
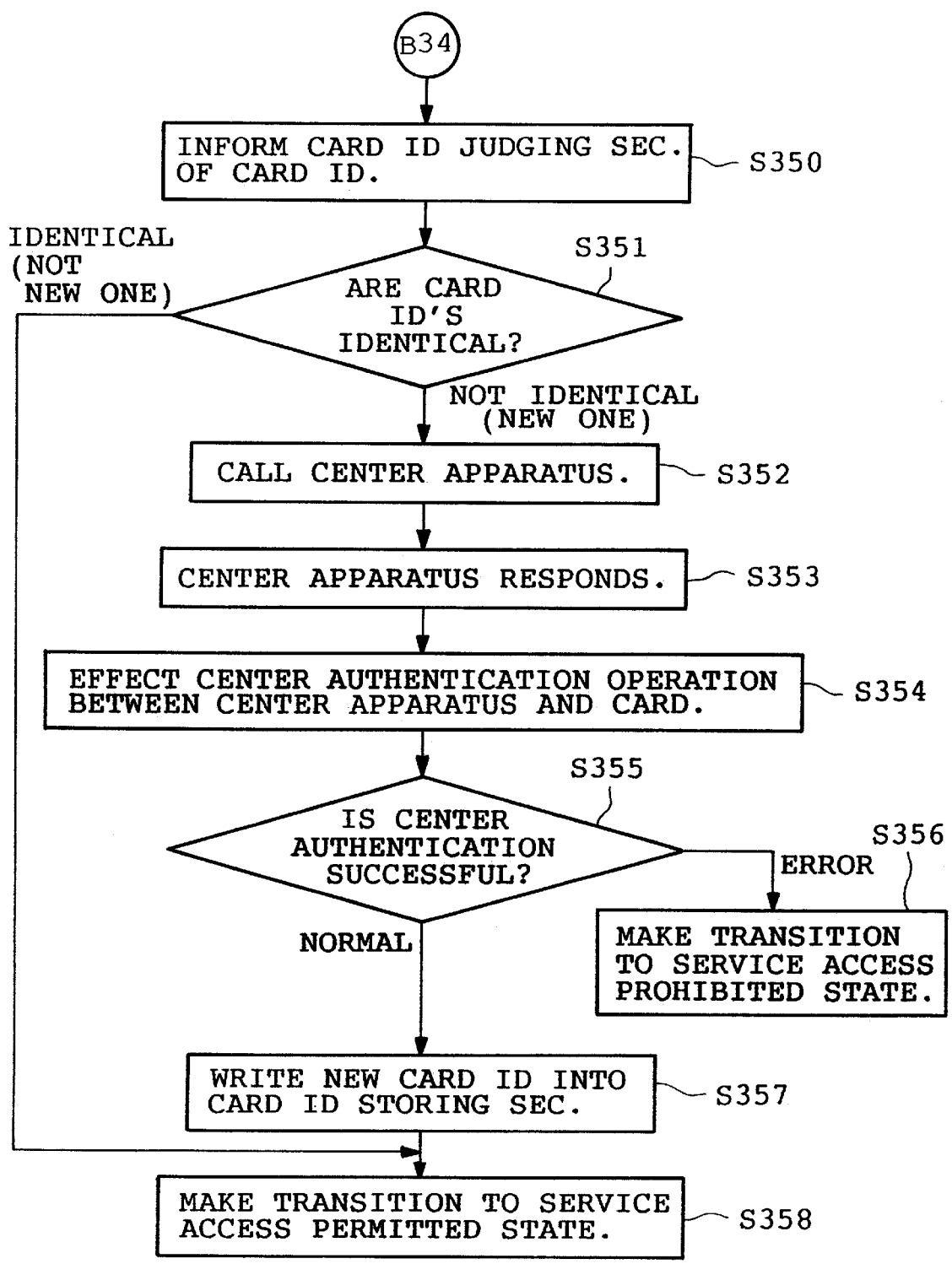

The operation of the communications apparatus of FIG. 32 will be hereinafter described with reference to a flowchart of FIGS. 34A and 34B. When a card 220a is inserted (step S342) during an on state of the power switch 213 of the communications apparatus 210a (step S341), or when the power switch 213 is turned on (step S344) after insertion of the card 220a (step S253) during an off state of the power switch 213, the card detecting section 212 detects insertion of the card 220a and informs it to a control section 216a (step S345). The communications apparatus 210a makes a transition to a state of waiting for input of a code number (step S346). A code number that is input through the dialing section 211 is supplied to the local authenticating section 222 via the control section 216a (step S347). The local authenticating section 222 performs a local authentication (individual authentication) operation by collating the input code number with a code number stored in the local authenticating section 222 (step S348). If they are not identical, the control section 216a makes a transition to the state of waiting for code number input (step S346). If they are identical, the control section 216a reads a card ID from the card ID section 221 of the card 220a (step S349), and informs it to the card ID judging section 215 (step S350). The card ID judging section 215 compares the informed card ID with a card ID that is stored in the card ID storing section 214 (step S351), and informs the control section 216a of a judgment result (step S352). If they are identical, the control section 216a judges that the card 220a is the same as a previously inserted card, that is, the card 220a is not a new one, and skips a center authentication operation to make a transition to a service access permitted state (step S358). If the card IDs are not identical, the control section 216a judges that the card 220a is a new one, and calls the center apparatus 240 in response to dial input through the dialing section 211 (step S352). When the center apparatus 240 has responded (step S353), a center authentication operation is performed between the center authenticating section 223 and the center apparatus 240 (step S354). If the center authentication operation has ended normally (step S355), the control section 216a stores the card ID of the card ID section 221 into the card ID storing section 214 (step S357), and makes a transition to the service access permitted state (step S358). If an authentication error occurs in step S355, the control section 216a makes a transition to a service prohibited state (step S356).

As described above, according to the fourteenth embodiment, the communications apparatus that is used in a card-inserted state is equipped with the card that stores a card ID, the card detecting section for detecting card insertion, the power switch for turning on/off the power, the card ID storing section for storing a card ID even while the power switch is in an off state, the card id judging section for comparing the card ID stored in the card and the card ID stored in the card ID storing section to judge whether they are identical, the dialing section for allowing dial input, and the control section. Therefore, by judging whether the inserted card is the same as a previously inserted one or is a new card by the card ID comparison, the center authentication operation can be skipped automatically if the inserted card is the same as the previously inserted one. This enables shortening of the time that is needed to establish an information access permitted state.

According to the fifteenth embodiment, since the card has the local authenticating section and the center authenticating section, the authentication function can be realized by processing between the communications apparatus and the card rather than between the communications apparatus and the center apparatus. This contributes to shortening of a manipulation time. Further, by performing the center authentication operation between the card and the center apparatus rather than between the communications apparatus and the center apparatus, no dial manipulation is needed during the center authentication operation. This improves the ease of operation as well as shortens the time that is needed to establish an information access permitted state. In addition, since no center access is needed for authentication of a card that is not new, the call charge for the authentication can be reduced.

Next, there will be described with reference to FIG. 35 an embodiment of a communications system in which a center function is added to a network exchange.

Figure 35:
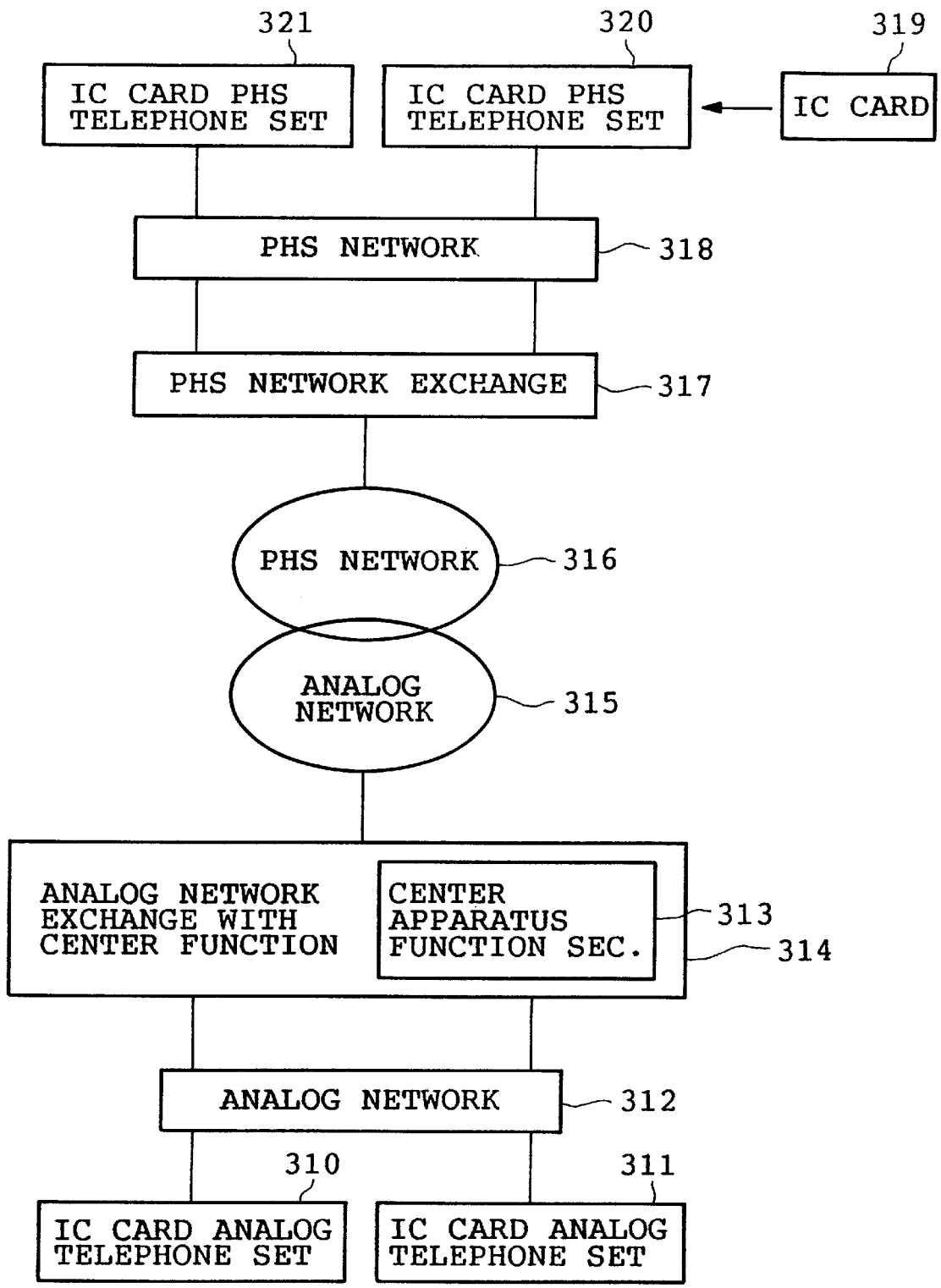
FIG. 35 is a block diagram showing an embodiment of a communication system in which a center function is added to a network exchange.
Figure 36:
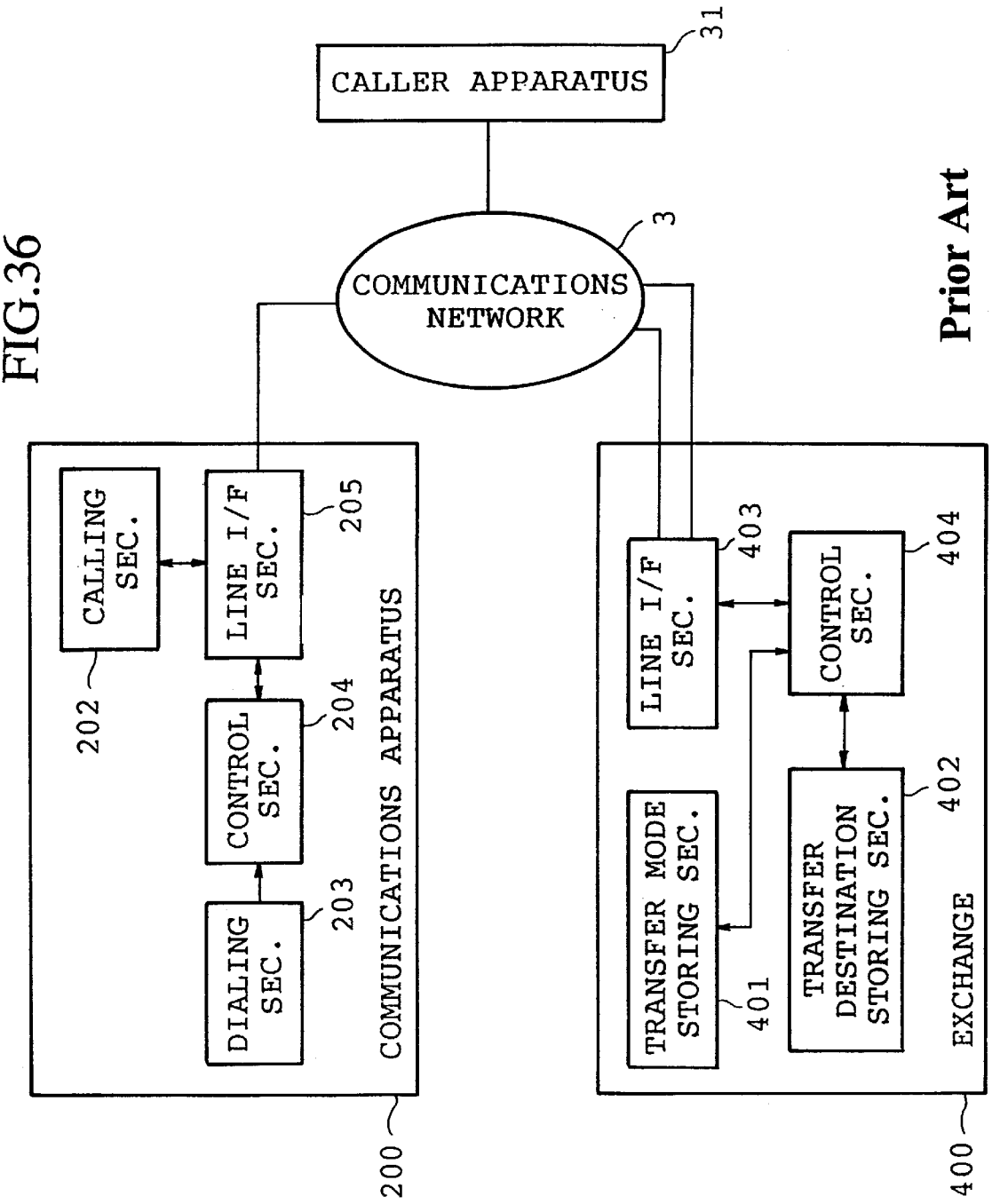
FIG. 36 is a block diagram showing the configuration of a conventional communications system which performs a call transfer service by means of a communications service of an exchange.

The communications system of FIG. 35 is constituted of IC card analog telephone sets 310 and 311 that are configured in the same manner as the communications apparatus 2 of FIG. 1, an analog network 312 to which the IC card analog telephone sets 310 and 311 are connected, and an analog network exchange 314 with a center function which exchange is connected to the analog network 312 and has a center apparatus function section 313 that has the same functions as the center apparatus 4 of FIG. 1. The exchange is connected to an analog network 315, which is in turn connected to a PHS (personal handyphone system) network 315. Each of the analog network 315 and the PHS network 316 has a function of establishing connection between apparatuses that are connected to the network. A PHS network exchange 317 is connected to both of the PHS network 316 and another PHS network 318. The PHS network 318 are to be connected to PHS telephone sets 320 and 321 via radio lines. An IC card 319 is configured in the same manner as the external portable recording medium 1 of FIG. 1. In this embodiment, the IC card 319 stores an access number of the center apparatus function section 313 that is incorporated in the analog network exchange 314. The IC card 319 is inserted into the IC card PHS telephone set 320, for instance. The IC card PHS telephone sets 320 and 321 are configured in the same manner as the communications apparatus 2 of FIG. 1. However, in this embodiment, position information that is stored in each of the IC card PHS telephone sets 320 and 321 relates to a base station of the associated PHS network 318, and is updated as the telephone set 320 or 321 is moved.

With the above configuration, when an IC card is inserted into one of the IC card analog telephone sets 310 and 311 and the IC card PHS telephone sets 320 and 321, the inserted telephone set accesses the center apparatus function section 313 of the analog network exchange 314. The center apparatus function section 313 receives a personal ID and terminal identification information such as a called-party number from the IC-card-inserted telephone set, and registers the received information. The called-party number that corresponds to the personal ID serves as a telephone number of the analog networks 312 and 315.

Similarly, it is also possible to add a center function to the PHS network exchange 317. In this case, each telephone set accesses a center apparatus function section of the PHS network exchange 317 upon insertion of an IC card. The center apparatus function section of the PHS network exchange 317 registers terminal identification information such as a called-party address of a telephone set in which the IC card is inserted. The registered called-party number that corresponds to a personal ID serves as a telephone number of the PHS networks 316 and 318.

As a modification of the above, center function may be added to both of the analog network exchange 314 and the PHS network exchange 317 so as to coexist.

What is claimed is:
1. A communications system comprising:
    a communications apparatus connected to a communications network, comprising:
        interface means into which an external portable recording medium storing personal identification information is to be inserted; and
        means for informing, when the external portable recording medium is inserted into the interface means, a center apparatus of the personal identification information stored in the inserted external portable recording medium and terminal identification information of the associated communications apparatus, wherein the terminal identification information at least includes information concerning a communication mode of the communications apparatus wherein the center apparatus manages communication with the communications apparatus, and comprises means for managing personal identification information and the terminal identification information of the communications apparatus that is used by a user who is represented by the personal identification information such that the personal identification information and the terminal identification information are correlated with each other, and means for informing a caller utilizing a different communication mode that the communication mode of the call is different from that of the communications apparatus.

2. The communications system according to claim 1, wherein the terminal identification information includes a called-party address for call transfer, and wherein the center apparatus comprises means for transferring the call using a number that is allocated to the user to the communications apparatus in which the external portable recording medium storing personal identification information of the user is inserted.

3. The communications system according to claim 1, wherein the center apparatus comprises means for informing both the caller and the user of a communication mode that enables mutual communication when the communication mode of the call from the caller is incompatible with that of the communications apparatus.

4. The communications system according to claim 1, wherein the terminal identification information includes information representing a location of the communications apparatus, and wherein the center apparatus comprises means for managing the location of the communications apparatus.

5. The communications system according to claim 1, wherein the communications apparatus comprises means for reading a center access number from the external portable recording medium that is inserted in the interface means, and for automatically accessing the center apparatus by using the readout center access number.

6. The communications system according to claim 1, wherein the communications apparatus comprises means for judging legitimacy of the user through processing with the external portable recording medium being inserted in the interface means based on user judgment data that is stored in the external portable recording medium and a code number that is inputted by the user.

7. The communications system according to claim 5, wherein the center apparatus comprises means for judging legitimacy of the external portable recording medium being inserted in the communications apparatus by performing processing with the external portable recording medium.

8. The communications system according to claim 1, wherein the communications apparatus comprises means for transmitting, to the center apparatus, called-party information of a transfer destination together with a transfer call command and the personal identification information, and wherein the center apparatus comprises means for effecting a transfer call based on the transfer call command and the called-party information that have been received from the communications apparatus, and a call-charge management section for performing call-charge management by storing call records such that the call records are correlated with the personal identification information.

9. A communications system according to claim 8, wherein the communications apparatus comprises:

means for storing dial information that is input when the external portable recording medium is inserted in the interface means;

means for automatically accessing the center apparatus by reading a center access number from the external portable recording medium being inserted in the interface means when an off-hook operation is performed after the input of the dial information; and means for transmitting, to the center apparatus, the dial information that is stored in the dial information storing means as the called-party information.

10. A communications system according to claim 8, wherein the communications apparatus comprises:

means for automatically accessing the center apparatus by reading a center access number from the external portable recording medium being inserted in the interface means when an off-hook operation is performed without any dial input operation when the external portable recording medium is inserted in the interface means; and means for transmitting, to the center apparatus, an information access number that is read from the external portable recording medium being inserted in the interface means as the called-party information.

11. The communications system according to claim 10, wherein the communications apparatus comprises means for judging whether the external portable recording medium being inserted in the interface means is for information access.

12. A communications apparatus connected to a communications network, comprising:

interface means into which an external portable recording medium storing personal identification information is to be inserted; and control means for transmitting, when the external portable recording medium is inserted into the interface means, the personal identification information stored in the external portable recording medium and terminal identification information of the communications apparatus, which at least includes information concerning a communication mode of the communications apparatus, to one of a center apparatus connected to the communications network and a center function processing section provided in an exchange that belongs to the communications network, for managing communication of the communications apparatus and for informing a caller of an incoming call utilizing a different communication mode that the communication mode of the call is different from that of the communications apparatus.

13. The communications apparatus according to claim 12, wherein the terminal identification information includes at least one of a called-party address of call transfer, the communication mode of the communications apparatus, and information indicating a location of the communications apparatus.

14. The communications apparatus according to claim 12, further comprising accessing means for automatically accessing one of the center apparatus and the center function processing section by reading a center access number from the external portable recording medium being inserted in the interface means.

15. A communications system comprising:

a communications apparatus connected to a communications network, comprising:

interface means into which an external portable recording medium storing personal identification information is to be inserted; and means for transmitting, when the external portable recording medium is inserted into the interface means, the personal identification information stored in the external portable recording medium and terminal identification information of the associated communications apparatus to a center function processing section, wherein the terminal identification information at least includes information concerning a communication mode of the communications apparatus; and an exchange provided in the communications network, comprising the center function processing section for managing communication of the communications apparatus so as to manage the personal identification information and the terminal identification information of the communications apparatus to be used by a user who is represented by the personal identification information and means for informing a caller utilizing a different communication mode that the communication mode of the call is different from that of the communications apparatus.

* * * * *